US009333883B2

(12) United States Patent
Abe et al.

(10) Patent No.: US 9,333,883 B2
(45) Date of Patent: May 10, 2016

(54) TIP-UP/DIVE-DOWN TYPE RECLINING SEAT FOR VEHICLE

(71) Applicant: TS TECH Co., Ltd., Saitama (JP)

(72) Inventors: Hirohisa Abe, Tochigi (JP); Toshiyuki Tsujibayashi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 61 days.

(21) Appl. No.: 13/957,626

(22) Filed: Aug. 2, 2013

(65) Prior Publication Data

US 2014/0306479 A1 Oct. 16, 2014

Related U.S. Application Data

(63) Continuation of application No. 13/735,384, filed on Jan. 7, 2013, now abandoned, which is a continuation of application No. 13/529,538, filed on Jun. 21, 2012, now abandoned, which is a continuation of application (Continued)

(30) Foreign Application Priority Data

Dec. 28, 2005 (JP) ................................. 2005-379045
Jan. 6, 2006 (JP) ................................. 2006-001869

(51) Int. Cl.
*B60N 2/02* (2006.01)
*B60N 2/30* (2006.01)

(52) U.S. Cl.
CPC ............ *B60N 2/3013* (2013.01); *B60N 2/3009* (2013.01); *B60N 2/3045* (2013.01); *B60N 2/3075* (2013.01)

(58) Field of Classification Search
CPC .... B60N 2/3011; B60N 2/2356; B60N 2/305; B60N 2/3065; B60N 2/309; B60N 2002/445; A47C 1/0355

USPC .......... 296/65.09, 65.03, 65.05, 65.01, 65.16; 297/15, 331, 334, 341, 344.1, 354.12, 297/366, 367 P, 367 R, 378.1, 378.12
See application file for complete search history.

(56) References Cited

U.S. PATENT DOCUMENTS 5,482,349 A * 1/1996 Richter et al. ................... 297/15
5,527,087 A * 6/1996 Takeda et al. .................... 297/15
(Continued)

FOREIGN PATENT DOCUMENTS

CA            2111725 A1    6/1995
DE       103 55 819 A1    6/2005
(Continued)

OTHER PUBLICATIONS

European Search Report issued for EP 06843781.3 (Sep. 23, 2009).

*Primary Examiner* — Kiran B Patel
(74) *Attorney, Agent, or Firm* — Drinker Biddle & Reath LLP

(57) ABSTRACT

A vehicle seat includes reclining lock mechanisms for releasably locking a seat back, a first releasing mechanism for unlocking the reclining lock mechanisms and causing the seat back to be pivotable forward and rearward, the first releasing mechanism including a collapsible link bar member, a braking link having a laterally projecting induction pin, a first link plate, and a first operating lever, a tipping-up lock mechanism for releasably locking a seat cushion, the tipping-up lock mechanism including cutout teeth provided at the seat cushion, and a latch and a cam member which are supported to the seat back, and a second releasing mechanism for unlocking the tipping-up lock mechanism and causing the seat cushion to be pivotable, the second releasing mechanism including a recess portion formed in the latch for allowing the cam member to be swung up, a second link plate, and a second operating lever.

8 Claims, 44 Drawing Sheets

Related U.S. Application Data

No. 13/288,406, filed on Nov. 3, 2011, now abandoned, which is a continuation of application No. 12/159,462, filed as application No. PCT/JP2006/326412 on Dec. 28, 2006, now abandoned.

(56) References Cited

U.S. PATENT DOCUMENTS

| | | | |
|---|---|---|---|
| 6,113,191 A * | 9/2000 | Seibold | 297/378.1 |
| 6,139,104 A | 10/2000 | Brewer | |
| 6,234,553 B1 * | 5/2001 | Eschelbach et al. | 296/65.14 |
| 6,270,141 B2 * | 8/2001 | Moon et al. | 296/65.17 |
| 6,375,255 B1 * | 4/2002 | Maruta et al. | 297/15 |
| 6,595,588 B2 * | 7/2003 | Ellerich et al. | 297/331 |
| 6,695,405 B2 * | 2/2004 | Senseby et al. | 297/378.1 |
| 7,290,822 B2 * | 11/2007 | Villeminey | 296/65.09 |
| 7,537,260 B2 * | 5/2009 | Epaud | 296/65.09 |
| 7,588,282 B2 * | 9/2009 | Kolena et al. | 296/65.09 |
| 7,648,202 B2 * | 1/2010 | Bokelmann et al. | 297/341 |
| 7,717,489 B2 * | 5/2010 | Mitsuhashi | 296/65.09 |
| 7,850,220 B2 * | 12/2010 | Holdampf | 296/65.13 |
| 8,038,206 B2 * | 10/2011 | Ito et al. | 297/15 |
| 8,287,024 B2 * | 10/2012 | Sayama | 296/65.03 |
| 8,297,678 B2 * | 10/2012 | Nakao et al. | 296/65.09 |
| 8,408,628 B2 * | 4/2013 | Yamazaki et al. | 296/65.05 |
| 8,424,969 B2 * | 4/2013 | Kammerer | 297/329 |
| 2001/0052718 A1 * | 12/2001 | Sugiura et al. | 297/15 |
| 2004/0100115 A1 * | 5/2004 | Rhodes et al. | 296/65.09 |
| 2004/0100117 A1 * | 5/2004 | Rhodes et al. | 296/66 |
| 2005/0285424 A1 * | 12/2005 | Yokoyama et al. | 296/37.14 |
| 2006/0066123 A1 * | 3/2006 | Tsujibayashi et al. | 296/65.09 |
| 2006/0066144 A1 * | 3/2006 | Tsujibayashi et al. | 297/378.14 |
| 2006/0214459 A1 * | 9/2006 | Kammerer et al. | 296/65.09 |
| 2006/0214477 A1 * | 9/2006 | Fukada et al. | 297/15 |
| 2007/0046074 A1 * | 3/2007 | Satta et al. | 297/15 |
| 2007/0126253 A1 * | 6/2007 | Nabil et al. | 296/65.09 |
| 2007/0273172 A1 * | 11/2007 | McLaughlin et al. | 296/66 |
| 2007/0278833 A1 * | 12/2007 | Park et al. | 297/15 |
| 2008/0100112 A1 * | 5/2008 | Hausler et al. | 297/331 |
| 2008/0169668 A1 * | 7/2008 | Muramatsu | 296/37.14 |
| 2009/0256379 A1 * | 10/2009 | Yamada et al. | 296/65.08 |
| 2009/0273211 A1 * | 11/2009 | Hancock et al. | 297/13 |
| 2009/0295185 A1 * | 12/2009 | Abe et al. | 296/65.09 |
| 2010/0007167 A1 * | 1/2010 | Ito et al. | 296/66 |
| 2010/0052370 A1 * | 3/2010 | Fujisawa et al. | 297/15 |
| 2010/0207418 A1 * | 8/2010 | Sayama | 296/65.09 |
| 2010/0207420 A1 * | 8/2010 | Sayama | 296/66 |
| 2010/0207421 A1 * | 8/2010 | Sayama | 296/66 |
| 2011/0001344 A1 * | 1/2011 | Sayama | 297/344.1 |
| 2011/0012416 A1 * | 1/2011 | Sayama | 297/378.13 |
| 2011/0204670 A1 * | 8/2011 | Abe et al. | 296/65.09 |
| 2014/0306479 A1 * | 10/2014 | Abe et al. | 296/65.09 |

FOREIGN PATENT DOCUMENTS

| | | |
|---|---|---|
| EP | 1 407 923 A1 | 4/2004 |
| EP | 1 854 659 A1 | 11/2007 |
| FR | 2 571 005 A1 | 4/1986 |
| FR | 2 851 211 A1 | 8/2004 |
| JP | 2002-362202 A | 12/2002 |
| JP | 2003-011707 A | 1/2003 |
| JP | 2005-212554 A | 8/2005 |
| WO | WO 02/100679 A1 | 12/2002 |

* cited by examiner

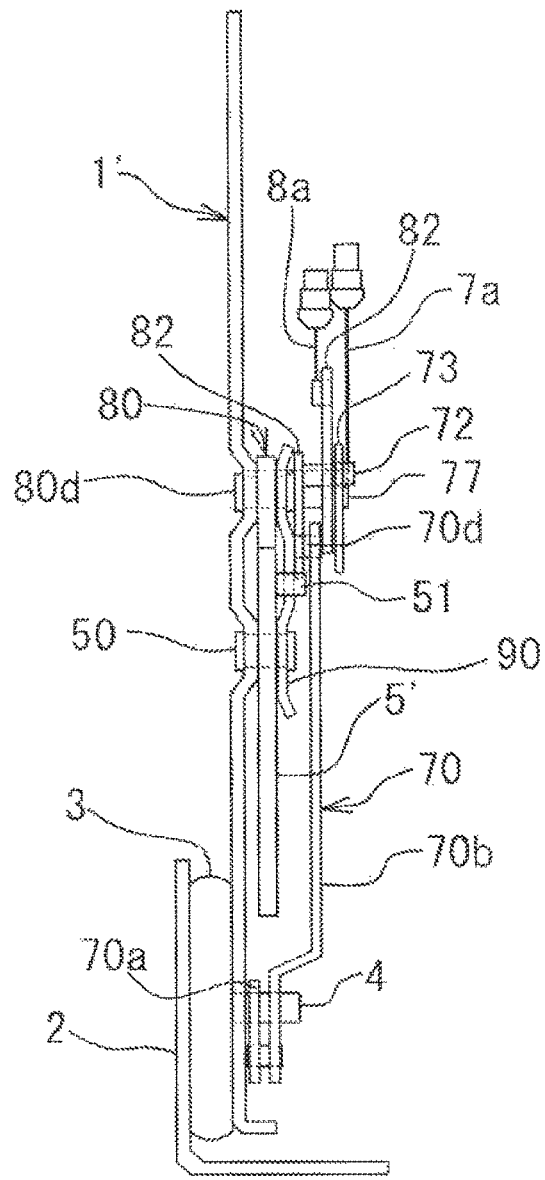

Fig. 1 9 a
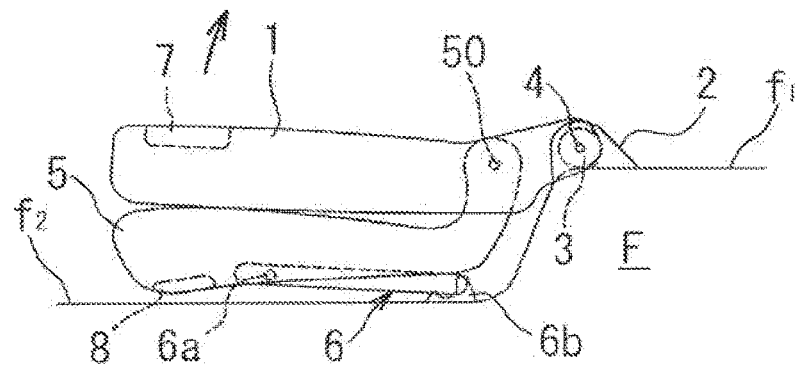
Fig. 1 9 b
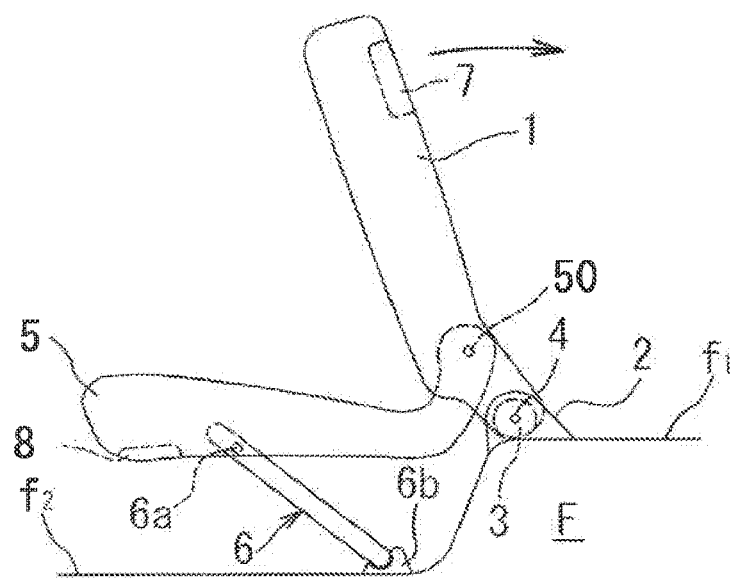

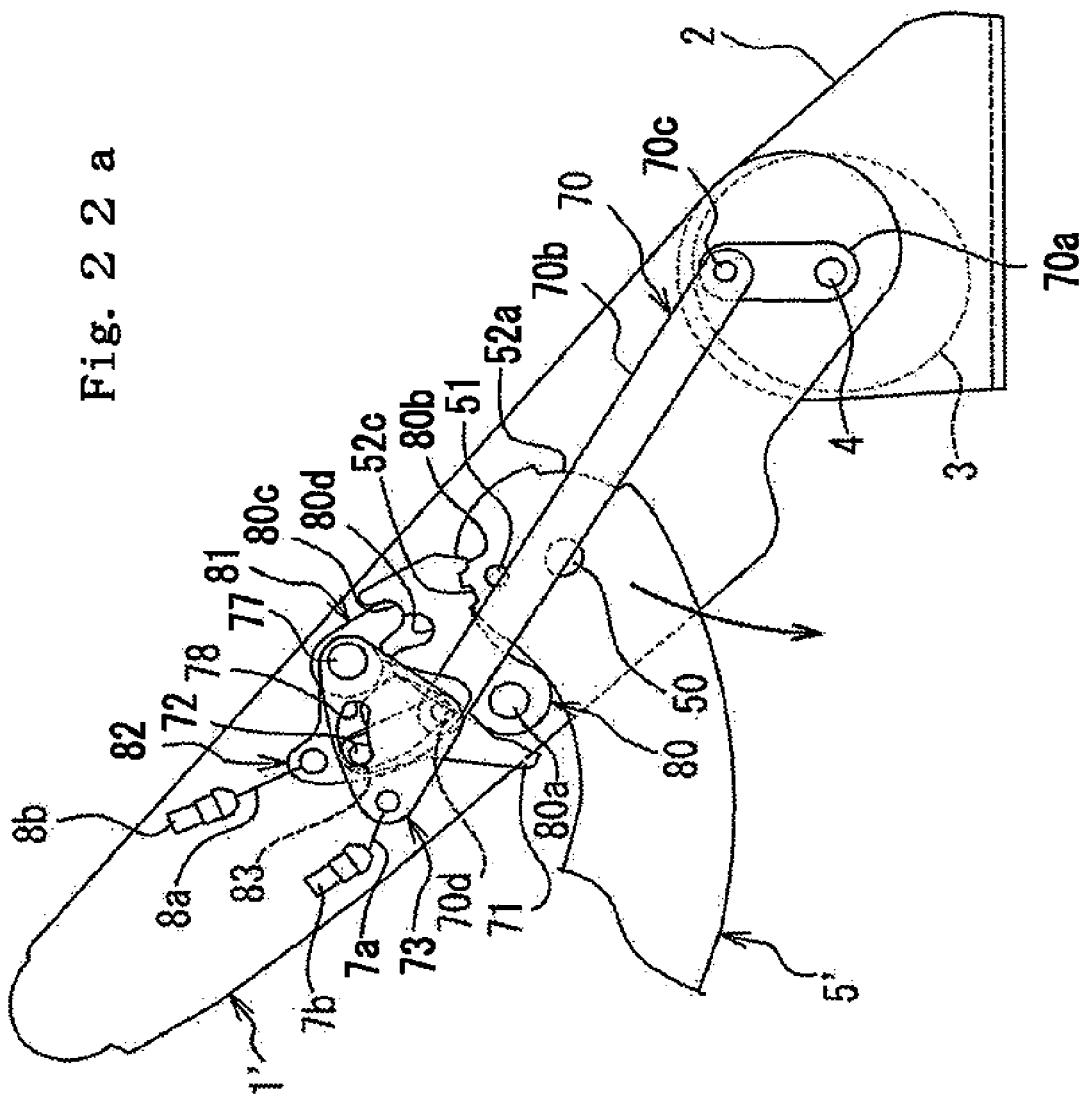

TIP-UP/DIVE-DOWN TYPE RECLINING SEAT FOR VEHICLE

CROSS REFERENCE TO RELATED APPLICATIONS

This application is a continuation of U.S. application Ser. No. 13/735,384, filed Jan. 7, 2013, which is a continuation U.S. application Ser. No. 13/529,538, filed Jun. 21, 2012, now abandoned, which is a continuation of U.S. application Ser. No. 13/288,406, filed on Nov. 3, 2011, now abandoned, which is a continuation of U.S. application Ser. No. 12/159,462, filed on Jul. 29, 2009, now abandoned, the entireties of which are incorporated herein by reference.

FIELD OF THE INVENTION

The present invention relates to a tip-up/dive-down type reclining seat for a vehicle, which includes a seat back adapted to be pivoted forward and rearward and a seat cushion adapted to be tipped up. The vehicle seat is provided with reclining lock means for releasably locking the seat back so as to prevent the pivotal movement of the seat back and for allowing an angle of the seat back to be adjusted, and tipping-up lock means for releasably locking the seat cushion so as to prevent the tipping-up movement of the seat cushion, and is adapted to be dived down and then stored in a space on a lower step portion of a vehicle body floor.

BACKGROUND OF THE INVENTION

There is known a tip-up/dive-down type seat for a vehicle, which includes a seat back, a seat cushion capable of being tipped up to the seat back in a substantially vertical posture and tipping-up lock means for releasably locking the seat cushion (Japanese Patent Application Laid-Open Publication No. 2005-212554). The entire seat can be dived down in a condition where the seat cushion is tipped up and the tipping-up lock means is maintained in a locked-state, and then stored in a space on a lower step portion of a vehicle body floor. Moreover, the entire seat can be returned to a used position from the dived down position in a condition where the tipping-up lock means is maintained in an unlocked-state.

The tip-up/dive-down type vehicle seat is not provided with reclining lock means for releasably locking the seat back, which can cause the seat back to be maintained in a substantially vertical posture, allow the seat back to be angularly adjusted and allow the seat back to be brought into a condition where it is allowed to be pivoted forward and releasably locked. In this vehicle seat, the seat back is provided at one side thereof with a latch. The latch is engaged with a striker lock mounted to a side panel of a vehicle body, whereby the seat back is maintained in the substantially vertical posture. The seat cushion can be tipped up to the seat back maintained in the substantially vertical posture.

SUMMARY OF THE INVENTION

It is an object of the present invention to provide a vehicle seat which is provided with reclining lock means for releasably locking a seat back and preventing pivotal movement of the seat back, and tipping-up lock means for releasably locking a seat cushion and preventing tipping-up movement of the seat cushion.

It is another object of the present invention to provide a vehicle seat in which, when reclining lock means is unlocked, tipping-up lock means is also unlocked, which can be dived down and stored, which can be returned to a used position from a dived-down position while allowing the tipping-up lock means and the reclining lock means to be unlocked, and which can be dived down in a condition where a tipped-up posture of a seat cushion is maintained by the tipping-up lock means and the reclining lock means is unlocked.

It is still another object of the present invention to provide a vehicle seat provided with tipping-up lock means which can cause a seat cushion to be positively locked in a tipped-up posture and can be positively unlocked at the time when the seat cushion is to be tipped up.

It is yet another object of the present invention to provide a vehicle seat provided with a stand leg portion which is pivotally supported to a lower portion of a seat cushion of the vehicle seat, can be stored synchronously with tipping-up movement of the seat cushion or diving-down movement of the vehicle seat and can be developed synchronously with returning of the seat cushion or the vehicle seat to a used position It is still another object of the present invention to provide a vehicle seat in which a seat cushion of the vehicle seat can be pivoted from a used position to a tipped-up position and a middle position between the used position and the tipped-up position and which is provided with tipping-up lock means for releasably locking the seat cushion in the used, middle and tipped-up positions.

In accordance with one aspect of the present invention, there is provided a tip-up/dive-down type reclining seat for a vehicle, the vehicle including a vehicle body floor having an upper step portion and a lower step portion. The tip-up/dive-down type reclining seat comprises a seat back including a pair of first spaced apart side brackets, a seat cushion including a pair of second spaced apart side brackets, a pair of third spaced apart base brackets mounted on the upper step portion, reclining lock means for releasably locking the seat back, the reclining lock means including a pair of reclining lock mechanisms each provided between a lower end portion of corresponding one of the first spaced apart side brackets and corresponding one of the third spaced apart base brackets, so that when the reclining lock mechanisms are locked, the seat back can be locked in a substantially vertical posture, and when the reclining lock mechanism are unlocked, the seat back is allowed to be pivoted forward and rearward and angularly adjusted, the reclining lock mechanisms including actuating shafts coupled to each other through a connecting shaft, the reclining lock mechanism being adapted to be unlocked when the actuating shafts are rotated, and adapted to be locked when the actuating shafts are rotated back, the seat cushion being pivotally supported at rear portions of the second spaced apart side brackets thereof to portions of the first spaced apart side brackets which are adjacent lower end portions of the first spaced apart side brackets, by first support pins, so that the seat cushion is adapted to be tipped up, a stand leg portion pivotally supported to forward portions of the second spaced apart side brackets and adapted to be releasably engaged with respect to the lower step portion of the vehicle body floor so as to stand from the lower step portion, tipping-up lock means on at least one of the first spaced apart side brackets and at least one of the second spaced apart side brackets for releasably locking the seat cushion in a tipped-up position, at which the seat cushion becomes opposed to the seat back in a substantially vertical posture, and a used position at which the seat cushion becomes a substantially horizontal posture, first releasing means on the at least one of the first spaced apart side brackets and the at least one of the second spaced apart side brackets for unlocking the reclining lock means, and second releasing means on the at least one of the first spaced apart side brackets and the at least one of the second spaced apart side brackets for unlocking the tipping-up lock means. An entire vehicle seat in a condition where the seat cushion is located at the tipped-up position or in a condition where the seat back is pivoted forward with respect to the seat cushion in the used position can be dived down and stored in a space on the lower step portion of the vehicle body floor.

In a preferred embodiment of the present invention, a stopper pin is provided at the at least one of the second spaced apart side brackets so as to be arranged upward of corresponding one of the first support pins, the first releasing means includes a collapsible link bar member coupled at a lower end portion thereof to corresponding one of the actuating shafts of the reclining lock mechanisms, a braking link having a laterally projecting induction pin provided at an upper end thereof and swingably supported at a middle portion thereof to an upper end portion of the collapsible link bar member by a second support pin, the braking link being adapted to stoppingly engaged with the stopper pin from a downward direction, a first link plate swingably supported at a rearward portion thereof to the at least one of the first spaced apart side brackets by a third support pin and having a circular arc-shaped guide hole extending around the second support pin of the braking link, the induction pin of the braking link being inserted through the guide hole of the first link plate, and a first operating lever coupled to a forward portion of the first link plate via a first wire cable, so that when the first operating lever is pull-operated, the first link plate, the braking link and the collapsible link bar member are pulled up, whereby the reclining lock mechanisms are unlocked and, when the first operating lever is released from a pulled-state, the first link plate, the braking link and the collapsible link bar member come down by gravity, whereby the reclining lock mechanisms are locked, the at least one of the second spaced apart side brackets includes a rear portion having a substantially semicircular arc-shaped edge extending about a first support pin of the at least one of the second side brackets, the tipping-up lock means includes first and second spaced apart cutout teeth provided at the substantially semicircular arc-shaped edge, the first cutout tooth serving as means to facilitate causing of the seat cushion to be locked in the used position and the second cutout tooth serving as means to facilitate causing of the seat cushion to be locked in the tipped-up position, a latch swingably supported at a forward portion thereof to the at least one of the first spaced apart side brackets by a fourth support pin, the latch having a projecting tooth provided at a lower edge of a rearward portion thereof, the projecting tooth being adapted to be selectively and releasably engaged with the first and second cutout teeth, and an engaging step portion formed in an upper region of the rearward portion of the latch, and a cam member having a cam body and a lower portion extending downward from the cam body, the cam member being swingably supported to the at least one of the first spaced apart side brackets by the third support pin of the first link plate with the lower portion thereof being releasably abutted against the engaging step portion of the latch and the second releasing means includes a recess portion formed in the upper region of the rearward portion of the latch and continuing from an edge of the engaging step portion, the recess portion having a depth which is not less than a height of an engaged region between the projecting tooth of the latch and each of the cutout teeth and allows the projecting tooth of the latch to be escapingly disengaged from each of the cutout teeth, a second link plate supported at a rearward portion thereof to the at least one of the first spaced apart side brackets by the third support pin of the first link plate so as to be swingable together with the cam member, the second link plate being formed with an opening hole including hole receiving the induction pin of the braking link, the opening hole having a middle hole edge region against which the induction pin of the braking link is adapted to be engagingly abutted when the entire vehicle seat is located at a used position of the entire vehicle seat, a lower hole edge region toward which the induction pin of the braking link is adapted to be escapingly moved from the middle hole edge region when the seat cushion is tipped up, and an upper hole edge region toward which the induction pin of the braking link is adapted to be escapingly moved when the seat cushion is in the tipped-up condition and the reclining lock means is unlocked, and a second operating lever coupled to a forward portion of the second link plate via a second wire cable, so that when the second operating lever is pull-operated, the cam member is swung up in such a manner that the lower portion of the cam member is disengaged from the engaging step portion of the latch and slips into the recess portion of the latch, and as the cam member is swung up, the latch is swung up in such a manner that the projecting tooth of the latch is disengaged from any one of the first and second cutout teeth and when the second operating lever is released from a pulled-state, the second link plate, the cam member, and the latch come down by gravity, whereby the projecting tooth of the latch is engaged with any one of the first and second cutout teeth.

In the vehicle seat constructed as discussed above, when the entire vehicle seat is located at the used position thereof and the reclining lock means and the tipping-up lock means are in locked-states, the braking link is stoppingly abutted at the lower end portion thereof against the stopper pin and the induction pin of the braking link is located at the rear end portion of the guide hole formed in the first link plate, so that the used position of the entire vehicle seat is determined.

When the entire vehicle seat is located at the used position thereof and the first operating lever is pull-operated, the first link plate is swung up around the third support pin and the cam member is also swung up together with the swinging-up of the first link plate in such a manner that the lower portion of the cam member is disengaged from the engaging step portion of the latch and slips into the recess portion having the depth which is not less than the engaging region between the projecting tooth of the latch and each of the cutout teeth of the at least one of the second spaced apart side brackets, whereby the latch is swung up in such a manner that the projecting tooth of the latch is disengaged from any one of the cutout teeth and the seat cushion is brought to a condition where the seat cushion is allowed to be tipped up toward the seat back in the substantially vertical posture.

When the tipping-up lock means is unlocked by the second releasing means, the induction pin of the braking link is escapingly moved away from the middle hole edge region of the opening hole of the second link plate, so that even if the induction pin of the braking link is inserted through the second link plate, the second link plate is not pulled up by the induction pin and the reclining lock means is not unlocked.

When the seat cushion is tipped up and the second operating lever is released from the pulled-state, the second link plate, the cam member and the latch come down by gravity and the lower portion of the cam member is engagingly abutted against the engaging step portion of the latch, whereby engagement of the projecting tooth of the latch and any one of the cutout teeth of the at least one of the second side brackets is maintained. Thus, the seat cushion is maintained in the tipped-up posture by the tipping-up lock means.

When the second operating lever is pull-operated in order that the seat cushion is returned to the used position thereof, the tipping-up lock means is unlocked as discussed above. Thus, the seat cushion is brought to the condition where it is allowed to be pivoted toward the used position thereof.

In a condition where the entire vehicle seat is located at the used position thereof and the reclining lock means and the tipping-up lock means are locked, when the first operating lever is pull-operated, the first link plate is swung up around the third support pin. At this time, the induction pin of the braking link is located at the rearward end of the guide hole formed in the first link plate and abutted against the middle hole edge region of the opening hole formed in the second link plate, the second link plate is also swung up synchronously with the swinging-up of the first link plate.

When the first link plate is swung up, the induction pin of the braking link is drawn up through the guide hole and the link bar member coupled at the lower end portion thereof to the corresponding one of the actuating shafts of the reclining lock mechanisms is drawn up, whereby the reclining lock means is unlocked and the tipping-up lock means is also unlocked since the second link plate is swung up as discussed above.

In the condition where the reclining lock means and the tipping-up lock means are unlocked, the seat back can be angularly adjusted rearward. When the first operating lever is released from the pulled-condition after the seat back is angularly adjusted rearward, the first link plate, the braking link, the link bar member, second link plate, the cam member, and the latch come down by gravity. Thus, the entire vehicle seat is maintained in the used position thereof.

Moreover, the seat back is pivoted forward and the entire vehicle seat can be then dived down and stored in the space on the lower step portion of the vehicle body floor. In this case, the first link plate, the braking link, the link bar member, the second link plate, the cam member and the latch cannot come down by gravity during the forward pivotal movement of the seat back, so that the reclining lock means and the tipping-up lock means are maintained in the locked-states. When the entire vehicle seat is to be dived down and stored in the space on the lower step portion of the vehicle body floor, a person causes the seat back to be pivoted forward by a certain extent while holding the seat back with his/her hand, causes his/her hand to be removed from the seat back to the seat cushion and can lift the seat cushion down in the space on the lower step portion of the vehicle body floor.

In the condition where the entire vehicle seat is dived down, the reclining lock means and the tipping-up lock means are unlocked, so that the person can cause the entire vehicle seat to be easily returned to the used position thereof by lifting up the entire vehicle seat while holding the seat back with his/her hand.

When the seat cushion is locked in the tipped-up position by the tipping-up lock means, the stopper pin provided at the at least one of the second side brackets is separated from the lower end portion of the braking link and the induction pin of the braking link comes down by gravity and located at the forward end portion of the guide hole formed in the first link plate.

When the first operating lever is pull-operated in order that the seat cushion is dived down together with the seat back from the tipped-up position, the first link plate is swung up and the induction pin of the braking link which is located at the forward end of the guide hole is drawn up by the first link plate, so that the reclining lock means is unlocked as discussed above.

Even if the reclining lock means is unlocked, the tipping-up lock means is maintain in the locked-state, since the second link plate has the opening hole which allows the induction pin of the braking link to be escapingly moved when the seat cushion is located at the tipped-up position and the reclining lock means is unlocked, and the second link plate is not swung up. The tipping-up lock means is maintained in the locked-state, so that the seat cushion is not pivoted with respect to the seat back and can be dived down together with the seat back and the entire vehicle seat can be then stored in the space on the lower step portion of the vehicle body floor.

In the case where the entire vehicle seat is to be dived down and stored in the space on the lower step portion of the vehicle body floor, the person causes the seat back to be pivoted forward by a certain extent while holding the seat back with his/her hand, causes his/her hand to be removed from the seat back to the seat cushion and can lift the seat cushion down in the space on the lower step portion of the vehicle body floor, as discussed above.

In a preferred embodiment of the present invention, an angle of the cam member with respect to the latch is set in such a manner that an angle between a reference line connecting an axial center of the fourth support pin of the latch and an abutment point of the cam member against the engaging step portion of the latch, and a line connecting an axial center of the second support pin of the cam member and the abutment point is kept to be an acute angle, so that engagement between the projecting tooth of the latch and any one of the first and second cutout teeth can be maintained by the angle of the cam member relative to the latch.

In this case, the angle of the cam member with respect to the latch is set in such a manner that the angle between the reference line connecting the axial center of the fourth support pin of the latch and the abutment point of the cam member against the engaging step portion of the latch, and the line connecting the axial center of the second support pin of the cam member and the abutment point is kept to be the acute angle, so that the cam functions as a prop with respect to the engaging step portion of the latch and the latch is held by the cam member so as to be unable to swing. Therefore, even if the person unintentionally tries to cause the seat cushion to be pivoted upward, the engagement between the projecting tooth of the latch and each of the cutout teeth of the at least one of the second side brackets.

In a preferred embodiment of the present invention, the lower portion of the cam member is formed into a substantially semielliptical shape, the engaging step portion of the latch is formed so as to have a substantially J-shape which allows the lower portion of the cam member to be easily abutted against the engaging step portion of the latch, and the recess portion of the latch is formed so as to have a substantially U-shape which has a depth larger than the height of the engaged region between the projecting tooth and each of the cutout teeth and fits the lower portion of the cam member.

In this case, the lower portion of the cam member is formed into the substantially semielliptical shape, the engaging step portion of the latch is formed so as to have the substantially J-shape which allows the lower portion of the cam member to be easily abutted against the engaging step portion of the latch, and the recess portion of the latch is formed so as to have the substantially U-shape which has the depth larger than the height of the engaged region between the projecting tooth and each of the cutout teeth and fits the lower portion of the cam member. Therefore, when the second operating lever is pull-operated, the cam member is swung up in such a manner that the lower portion of said cam member is disengaged from the engaging step portion of the latch and slips into the recess portion of the latch, whereby the latch is considerably swung up, so that the projecting tooth of the latch can be positively disengaged from each of the cutout teeth of the at least one of the second side brackets.

In a preferred embodiment of the present invention, the stand leg portion is typically urged toward a stored position under the seat cushion by a spring which is retained at one end thereof to an upper end region of the stand leg portion and retained at the other end thereof to the at least one of the second spaced apart side brackets and the vehicle seat further includes a third wire cable which is coupled at one end portion thereof to the upper region of the stand leg portion and coupled at the other end portion to the seat back, so that when the tipping-up lock means is unlocked and the seat cushion to be tipped up, the third wire cable is pushed so as to overcome an action of the spring and allow the stand leg portion to be pivoted toward a developed position and as the seat cushion is pivoted toward the tipped-up position, the action of the spring is exerted on the third wire cable.

In this case, the stand leg portion 6 can be pivoted toward the stored position synchronously with the tipping-up movement of the seat cushion and diving-down movement of the entire vehicle seat, and can be pivoted toward the developed position synchronously with returning of the entire seat toward the used position of the entire vehicle seat or returning of the seat cushion toward the first used position.

According to a further aspect of the present invention, there is provided a tip-up/dive-down type reclining seat for a vehicle, the vehicle including a vehicle body floor having an upper step portion and a lower step portion. The tip-up/dive-down type reclining seat comprises a seat back including a pair of first spaced apart side brackets, a seat cushion including a pair of second spaced apart side brackets, a pair of third spaced apart base brackets mounted on the upper step portion, reclining lock means for releasably locking the seat back, the reclining lock means including a pair of reclining lock mechanisms each provided between a lower end portion of corresponding one of the first spaced apart side brackets and corresponding one of the third spaced apart base brackets, so that when the reclining lock mechanisms are locked, the seat back can be locked in a substantially vertical posture, and when the reclining lock mechanism are unlocked, the seat back is allowed to be pivoted forward and rearward and angularly adjusted, the reclining lock mechanisms including actuating shafts coupled to each other through a connecting shaft, the reclining lock mechanism being adapted to be unlocked when the actuating shafts are rotated, and adapted to be locked when the actuating shafts are rotated back, the seat cushion being pivotally supported at rear portions of the second spaced apart side brackets thereof to portions of the first spaced apart side brackets which are adjacent lower end portions of the first spaced apart side brackets, by first support pins, so that the seat cushion is adapted to be tipped up, a stand leg portion pivotally supported to forward portions of the second spaced apart side brackets and adapted to be releasably engaged with respect to the lower step portion of the vehicle body floor so as to stand from the lower step portion, tipping-up lock means on at least one of the first spaced apart side brackets and at least one of the second spaced apart side brackets for releasably locking the seat cushion in a tipped-up position, at which the seat cushion becomes opposed to the seat back in a substantially vertical posture, a used position at which the seat cushion becomes a substantially horizontal posture, and a middle position between the tipped-up position and the used position, first releasing means on the at least one of the first spaced apart side brackets and the at least one of the second spaced apart side brackets for unlocking the reclining lock means, and second releasing means on the at least one of the first spaced apart side brackets and the at least one of the second spaced apart side brackets for unlocking the tipping-up lock means, wherein an entire vehicle seat in a condition where the seat cushion is located at the tipped-up position or in a condition where the seat back is pivoted forward with respect to the seat cushion in the used position can be dived down and stored in a space on the lower step portion of the vehicle body floor.

In a preferred embodiment of the present invention, a stopper pin is provided at the at least one of the second spaced apart side brackets so as to be arranged upward of corresponding one of the first support pins, the first releasing means includes a collapsible link bar member coupled at a lower end portion thereof to corresponding one of the actuating shafts of the reclining lock mechanisms, a first braking link having a laterally projecting induction pin provided at an upper end thereof and swingably supported at a middle portion thereof to an upper end portion of the collapsible link bar member by a second support pin, the first braking link being adapted to be stoppingly at a lower portion thereof abutted the stopper pin from a downward direction, a first link plate swingably supported at a rearward portion thereof to the at least one of the first spaced apart side brackets by a third support pin and having a circular arc-shaped guide hole extending around the second support pin of the braking link and a substantially L-shaped control hole, the induction pin of the braking fink being inserted through the guide hole of the first link plate, a second braking fink pivotally supported at a middle portion thereof to the first fink plate, the second braking link being adapted to be stoppingly abutted at a lower portion thereof against the stopper pin from a direction opposite to the direction from which the lower portion of the first braking link is abutted against the stopper pin, an elongated bar pivotally supported to an upper end of the second braking link and having a wire retaining pin which is provided at a free end of the elongated bar and inserted through the substantially L-shaped control hole of the first link plate, the substantially L-shaped control hole having a vertical hole portion and a horizontal hole portion, and a first operating lever coupled to the wire-retaining pin via a first wire cable, so that when an entire vehicle seat is located at a used position thereof, the first braking link is abutted at the lower portion thereof against the stopper pin with the induction pin being located at a rear end portion of the guide hole and the second braking link is abutted at the lower portion thereof against the stopper pin with the wire retaining pin being located in the horizontal hole portion and, when the seat cushion is pivoted to the middle position, the stopper pin is separated from the stopper pin and the first braking link comes down by gravity in such a manner that the induction pin is moved toward a forward end of the guide hole, and the stopper pin kicks up the second braking link in such a manner that the wire retaining pin is moved toward a connecting hole portion between the horizontal hole and the vertical hole portion and, when the seat cushion is pivoted to the tipped-up position, the stopper pin is separated from the second braking link and the second braking link comes down by gravity in such a manner that the wire retaining pin is moved toward the horizontal hole portion, the at least one of the second spaced apart side brackets includes a rear portion having a substantially semicircular arc-shaped edge extending about a first support pin of the at least one of the second side brackets, the second releasing means includes first, second and third spaced apart cutout teeth provided at the substantially semicircular arc-shaped edge, the first cutout tooth serving as means to facilitate causing of the seat cushion to be locked in the used position, the second cutout tooth serving as means to facilitate causing of the seat cushion to be locked in the tipped-up position, and the third cutout tooth serving as means to facilitate causing of the seat cushion to be locked in the middle position, a latch swingably supported at a forward portion thereof to the at least one of the first spaced apart side brackets by a fourth support pin, the latch having a projecting tooth provided at a lower edge of a rearward portion thereof, the projecting tooth being adapted to be selectively and releasably engaged with the first, second and third cutout teeth, and an engaging step portion formed in an upper region of the rearward portion of the latch, and a cam member having a cam body and a lower portion extending downward from the cam body, the cam member being swingably supported to the at least one of the first spaced apart side brackets by the third support pin of the first link plate with the lower portion thereof being releasably abutted against the engaging step portion of the latch, and the second releasing means includes a recess portion formed in the upper region of the rearward portion of the latch and continuing from an edge of the engaging step portion, the recess portion having a depth which is not less than a height of an engaged region between the projecting tooth of the latch and each of the cutout teeth and allows the projecting tooth of the latch to be escapingly disengaged from each of the cutout teeth, a second link plate supported at a rearward portion thereof to the at least one of the first spaced apart side brackets by the third support pin of the first link plate so as to be swingable together with the cam member, the second link plate being formed with an opening hole including hole receiving the induction pin of the braking link, the opening hole having a middle hole edge region against which the induction pin of the braking link is adapted to be engagingly abutted when the entire vehicle seat is located at a used position of the entire vehicle seat, a lower hole edge region toward which the induction pin of the braking link is adapted to be escapingly moved from the middle hole edge region when the seat cushion is tipped up, and an upper hole edge region toward which the induction pin of the braking link is adapted to be escapingly moved when the seat cushion is in the tipped-up condition and the reclining lock means is unlocked, and a second operating lever coupled to a forward portion of the second link plate via a second wire cable, wherein when the entire vehicle seat is located at the used position of the vehicle seat and the second operating lever is pull-operated in order that the entire vehicle seat is allowed to be dive down, the first link plate is swung up by the wire retaining pin which is located in the horizontal hole portion of the control hole, the second link plate is swung up by the induction pin which is located at a rear end of the guide hole and the middle hole edge region of the opening hole, the link bar member is drawn up through the first braking link, and the cam member is swung up in such a manner that the lower portion of the cam member is disengaged from the engaging step portion of the latch and slips into the recess portion of the latch, whereby the latch is swung up in such a manner that the projecting tooth of the latch is disengaged from any one of the first, second and third cutout tooth, wherein when the entire vehicle seat is located at the used position of the vehicle seat and second operating lever is pull-operated in order that the seat cushion is allowed to be tipped up, the second ink plate is swung up, the cam member is swung up in such a manner that the lower portion of the cam member is disengaged from the engaging step portion of the latch and slips into the recess portion of the latch, whereby the latch is swung up in such a manner that the projecting tooth of the latch is disengaged from any one of the first, second and third cutouts, and the induction pin of the first braking link is escapingly moved toward the upper hole edge region of the opening hole, so that the first link plate is not swung up and is idly operated so as not to unlock the reclining lock means, wherein when the seat cushion is located at the tipped-up position and the first operating lever is pull-operated in that the entire vehicle seat is allowed to be dive down, the first link plate is swung up by the wire retaining pin which is located at the horizontal hole portion of the control hole, and the link bar member is drawn up by the first braking link whose induction pin is located at a forward end of the guide hole, whereby the reclining lock means is unlocked, and the induction pin is escapingly moved to the upper hole edge region of the opening hole from the lower hole edge region of the opening hole, so that the second link plate is not swung up and is idly operated so as not to unlock the tipping-up lock means, wherein when the seat cushion is located at the middle position and the first operating lever is pull-operated, the wire retaining pin which is located at the connecting hole portion between the horizontal hole portion and the vertical hole portion of the control hole is moved toward the horizontal hole portion, so that the first link plate is not swung up and is idly operated so as not to unlock the reclining lock means, so that the vehicle seat cannot be dived down, and wherein after the seat back is angularly adjusted rearward or the seat cushion is pivoted to the middle position or the tipped-up position, the first and second operating lever are released from the pulled-states, the first and second link plates, the first and second braking link, the link bar member, the cam member and the latch come down by gravity, whereby the reclining lock means and the tipping-up lock means are locked and when the entire vehicle seat is dive down, the first and second braking link, the link bar member, the cam member and the latch cannot come down by gravity, so that the reclining lock means and the tipping-up lock means are maintained in unlocked-states.

BRIEF DESCRIPTION OF THE DRAWINGS

FIGS. 19a and 19b are each a schematic side view of the vehicle seat, which is of assistance in explaining returning of the vehicle seat in the stored-condition to a used position;

FIG. 22a is an explanatory view of the tipping-up lock means at the time of the diving-down movement of the vehicle seat;

FIG. 32 is a schematic fragmentary side view which is of assistance in explaining an unlocked-condition of the tipping-up lock means;

FIG. 33 is a schematic side view which is of assistance in explaining an angularly rearward adjusting operation of the vehicle seat according to the second embodiment;

DETAILED DESCRIPTION OF THE PREFERRED EMBODIMENTS

Figure 1:
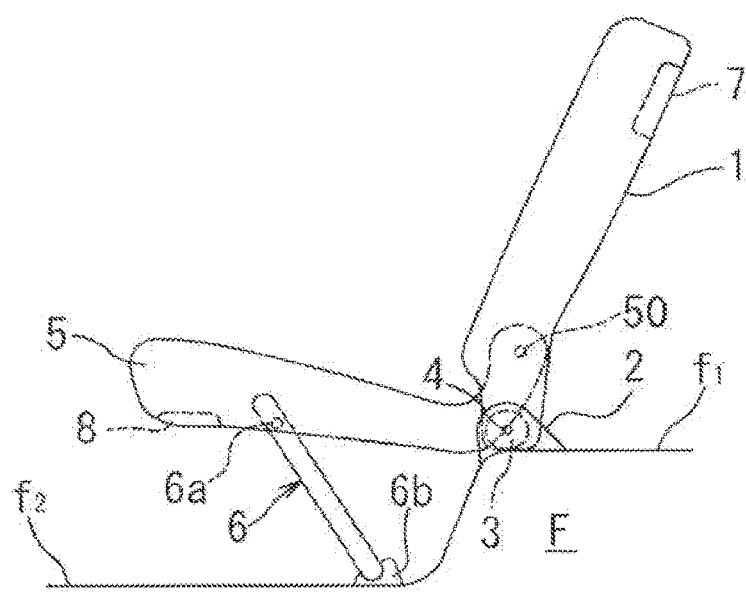
FIG. 1 is a schematic side view of a tip-up/dive-down type reclining seat for a vehicle according to each of first and second embodiments of the present invention.

Referring to FIG. 1, there is illustrated a vehicle seat according to a first embodiment of the present invention. The vehicle seat includes a seat back 1 adapted to be pivoted forward and rearward and having a pair of spaced apart side brackets serving as side frame sections of a seat back frame for the seat back 1, a seat cushion 5 pivotally supported to the seat back 1 so as to be capable of being tipped up, reclining lock means including first and second reclining lock mechanisms for releasably locking the seat back 1 and preventing the pivotal movement of the seat back 1 (only first reclining mechanism 3 is shown in FIG. 1), the first and second reclining mechanisms being constructed in the same manner, first releasing means for unlocking the first and second reclining lock mechanisms 3 and allowing the seat back to be brought to a condition where the seat back is allowed to be pivoted forward and rearward, tipping-up lock means for releasably locking the seat cushion 5 and preventing the tipping-up movement of the seat cushion, and second releasing means for unlocking the tipping-up means and allowing the seat cushion to be brought to a condition where the seat cushion is allowed to be tipped up. The reclining lock mechanisms 3 are provided between lower end portions of the spaced apart side brackets of the seat back 1 and a pair of spaced apart base brackets 2 mounted on an upper step portion $f_1$ of a vehicle body floor F so as to stand up from the upper step portion f1, so that the seat back 1 is allowed to be releasably locked with respect to the vehicle body floor F by the reclining lock mechanisms 3. As the reclining lock mechanisms 3, there may be employed reclining lock mechanisms which have actuating shafts 4 coupled to each other through a connecting shaft (not shown) which is connected at both ends thereof to the actuating shafts 4, whereby the reclining lock mechanisms are adapted to be synchronously actuated and can carry out unlocking operation by rotation of the actuating shafts 4 and locking operation by rotating-back of the actuating shafts 4 (refer to, for example, Japanese Patent Application Laid-Open No. 2004-173922 incorporated herein as a reference).

The seat cushion 5 includes a pair of spaced apart side brackets serving as side frame sections of a seat cushion frame for the seat cushion 5. The spaced apart side brackets of the seat cushion 5 are coupled at rear end portions thereof to portions of the side brackets of the seat back 1, which are adjacent the lower end portions of the spaced apart side brackets of the seat back 1, by support pins 50, so that the seat cushion 5 is pivotally supported to the seat back 1 so as to be allowed to be tipped up. The vehicle seat further includes a substantially U-shaped stand leg portion 6 in outline which is pivotally connected at upper end regions of spaced apart vertical portions thereof to lower regions of forward portions of the side brackets of the seat cushion 5 by support pins 6a. A receiving base 6b for receiving and engaging a lower horizontal portion of the stand leg portion 6 is mounted on a lower step portion $f_2$ of the vehicle body floor F. The stand leg portion 6 is adapted to be releasably engaged at the lower horizontal portion thereof with the receiving base 6b so as to obliquely stand up from the lower step portion $f_2$ of the vehicle body floor F, whereby when the seat cushion is located at a first used position at which the seat cushion 5 becomes a substantially horizontal posture, the seat cushion 5 is horizontally supported by the stand leg portion 6 which is releasably engaged with the receiving base 6b.

Figure 2:
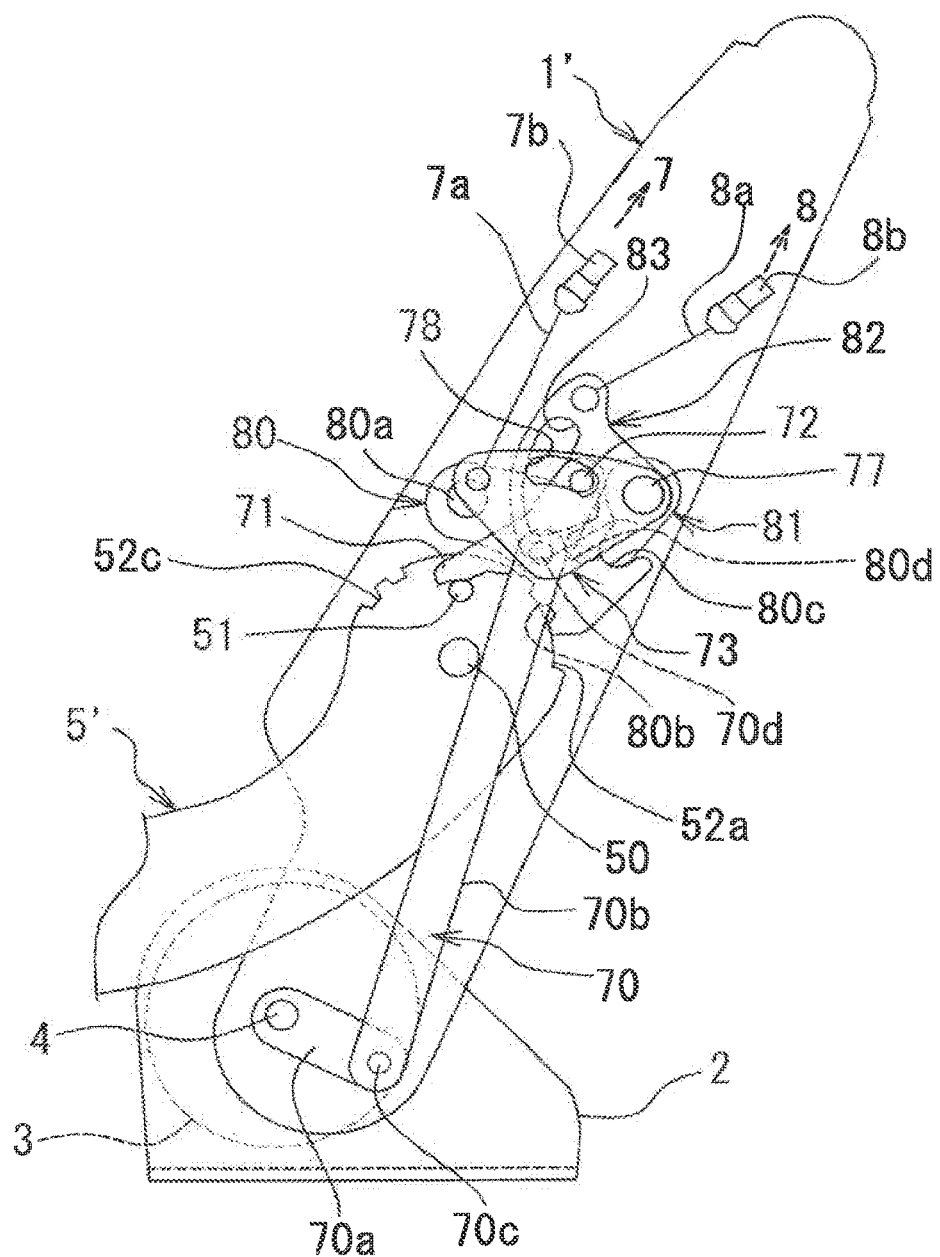
FIG. 2 is a schematic side view illustrating reclining lock means, tipping-up lock means, and first and second releasing means which are provided at the reclining seat according to the first embodiment.
Figure 3:
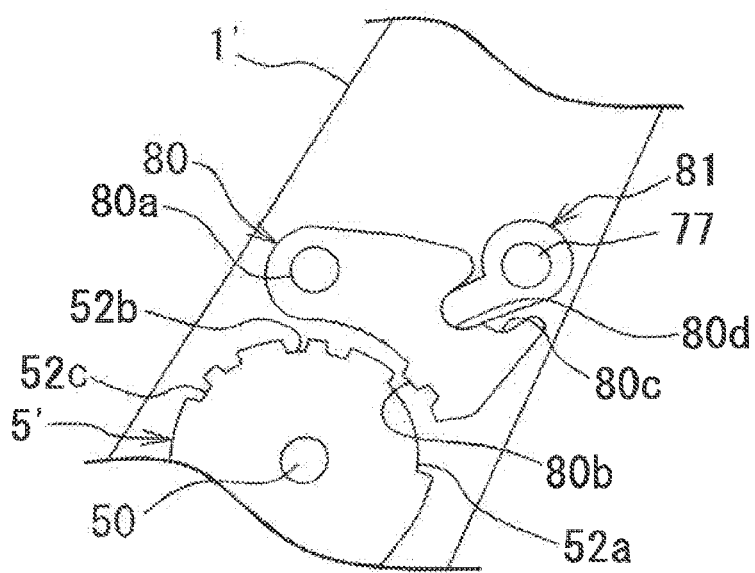
FIG. 3 is a schematic front view illustrating the reclining lock means, the tipping-up lock means, and the first and second releasing means.
Figure 3:
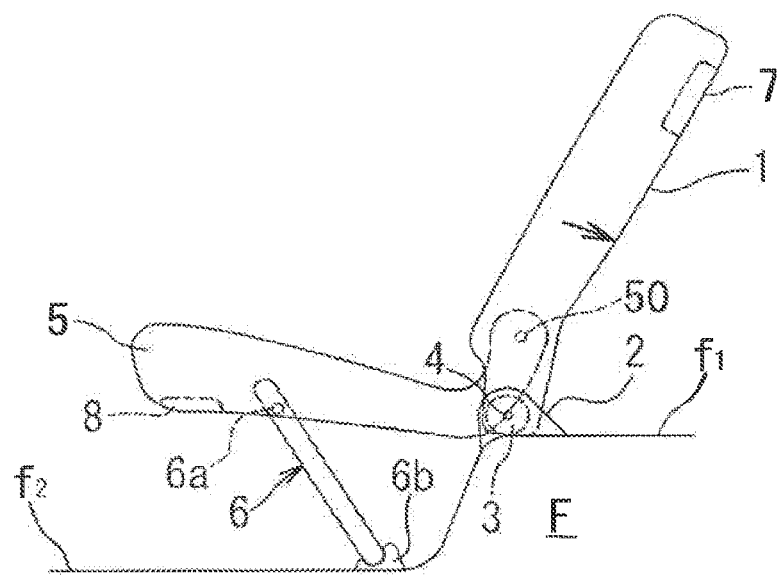

Referring to FIGS. 2 and 3, there is illustrated the first releasing means which is provided on one of both sides of the vehicle seat. The first releasing means includes a collapsible link bar member 70, a braking link 71 having a laterally projecting induction pin 72 provided at an upper end thereof, a first link plate 73, and a first operating lever 7 (see FIG. 1).

Figure 4:
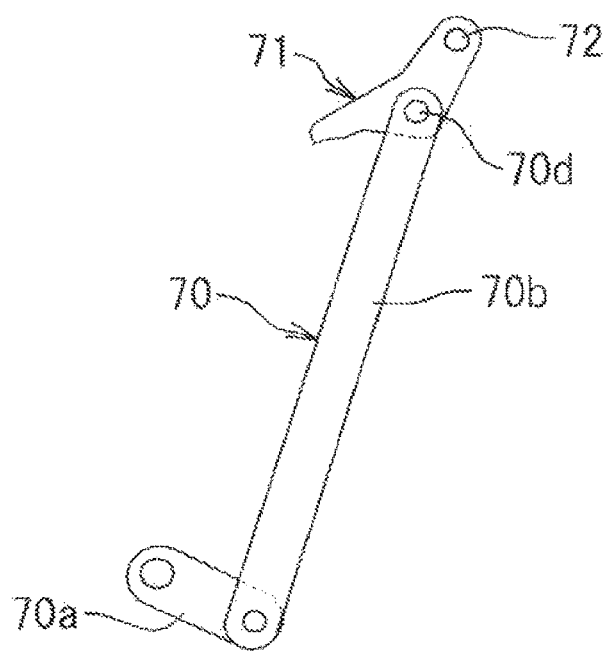
FIG. 4 is a schematic side view of a braking link provided with an induction pin, which is one element of the first releasing means.

The link bar member 70 includes a lower bar portion 70a coupled at a first end thereof to an actuating shaft 4 of the first reclining lock mechanism 3 which is provided on the one side of the vehicle seat, and an upper bar portion 70b connected at a first end thereof to a second end of the lower bar portion 70a by a support pin 70c and extending upward. As best shown in FIG. 4, the braking link 71 is swingably connected at a substantially middle portion thereof to a second end of the upper bar portion 70b by a support pin 70d. More particularly, the braking link 71 is swingably connected to the upper bar portion 70b with the lower end portion thereof being directed to a stopper pin 51 which is adapted to stoppingly engage the lower end portion of the braking link 71 from a downward direction. As shown in FIG. 2, the stopper pin 51 is provided on one 5' of the side brackets of the seat cushion which is arranged on the one side of the vehicle seat. More particularly, the stopper pin 51 is provided at a portion of the side bracket 5' of the seat cushion so as to be arranged upward of a support pin 50 coupling the side bracket 5' of the seat cushion and one 1' of the side brackets of the seat back which is arranged on the one side of the vehicle seat.

The first link plate 73 is formed into a substantially triangular shape having three lobes, and swingably supported at a rearward lobe thereof to the side bracket 1' of the seat back 1 by a support pin 77. The first link plate 73 has a circular arc-shaped guide hole 78 formed therein so as to extend about the support pin 70d of the braking link 71. The induction pin 72 of the braking link 71 is inserted through the guide hole 78 of the first link plate 73.

The first operating lever 7 of the first releasing means is provided in a recess portion formed in an upper region of a back of the seat back 1 as shown in FIG. 1, and coupled to a forward lobe of the first link plate 73 via a wire 7a of a first wire cable which is inserted through a tube 7b of the first wire cable. When a person pull-operates the first operating lever 7, the wire 7a is drawn upward and the first link plate 73 is swung upward while pulling up the collapsible link member 70 through the braking link 71, whereby the actuating shafts 4 of the reclining lock mechanisms are synchronously rotated. As a result, the reclining lock mechanisms 3 are synchronously brought to unlocked states. In this condition, the person can cause the seat back 1 to be pivoted forward or rearward in one motion and cause the angle of the seat back 1 relative to the vehicle body floor to be adjusted.

More particularly, the pulling operation of the first operating lever 7 causes the entire components including the first link plate 73, the braking link 71 and the link bar member 70 to be pulled up, whereby the actuating shaft 4 of the first reclining lock mechanism 3 is rotated, an actuating shaft of the second reclining lock mechanism is synchronously rotated and the reclining lock means is then unlocked. When the first operating lever 7 is released from the pulled condition, the entire components including the first link plate 73, the braking link 71 and the link bar member 70 come down by gravity and the actuating shafts of the reclining lock mechanisms are synchronously rotated back, whereby the reclining lock mechanisms are locked. Thus, the seat back is locked with respect to the vehicle body floor.

The tipping-up lock means is provided on the one side of the vehicle seat. As shown in FIG. 2, the rear portion of the side bracket 5' of the seat cushion has a substantially semicircular arc-shaped edge extending about the support pin 50 of the side bracket 5' of the seat cushion. The tipping-up lock means includes first and second cutout teeth 52a, 52b provided at the substantially semicircular arc-shaped edge of the side bracket 5' so as to be spaced apart from each other, and a latch 80 and a cam member 81 which are supported to side bracket 1' of the seat back 1. The first cutout tooth 52a serves as means to facilitate causing of the seat cushion 5 to be locked in the first used position at which the seat cushion becomes the substantially horizontal posture. The second cutout tooth 52b serves as means to facilitate causing of the seat cushion to be locked in a tipped-up position at which the seat cushion becomes opposed to the seat back located in a second used position at which the seat back becomes a substantially vertical posture.

Figure 5:
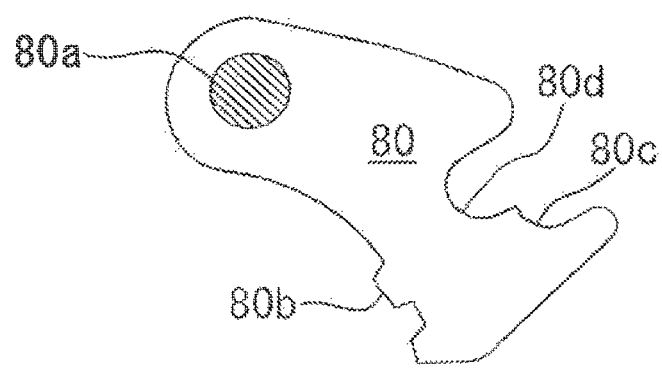
FIG. 5 is a schematic view illustrating a latch of the tipping-up lock means.

The latch 80 is pivotally supported at a forward portion thereof to the side bracket 1' of the seat back by a support pin 80a so as to be swingable to an upward direction from a rearward direction. As best shown in FIG. 5, the latch 80 is provided at a lower edge region of a rearward portion thereof with a projecting tooth 80b which is adapted to be selectively and releasably engaged with the first and second cutout teeth 52a, 52b of the side bracket 5' (FIG. 2). In order that the projecting tooth 80b of the latch 80 can be securely engaged with the second cutout tooth 52b of the side bracket 5' of the seat cushion 5, the projecting tooth 80b is configured to include two spaced apart projecting tooth-portions.

The first cutout tooth 52a is configured to include a recess portion which is adapted to receive the projecting tooth 80b of the latch 80 during returning of the seat cushion to the first used position from the tipped-up position and has a length sufficient to allow the seat back in the second used position to be angularly adjusted rearward in the condition where the seat cushion is locked in the first used position. In the illustrated example, a third cutout tooth (not shown) which serves as means to facilitate causing of the seat cushion to be locked in a middle position between the first used position and the tipped-up position of the seat cushion may be provided at the substantially semicircular arc-shaped edge of the side bracket 5' of the seat cushion so as to be arranged between the first and second cutout teeth 52a, 52b.

The cam member 81 includes a cam body and a lower portion extending downward from the cam body. The cam member 81 is swingably supported at the cam body to the side bracket 1' of the seat back 1 by the support pin 77 of the first link plate 73, with the lower portion thereof being directed to an upper region of the rearward portion of the latch 80.

As best shown in FIG. 5, the latch 80 is formed in the upper region of the rearward portion thereof with an engaging step portion 80c against which the lower portion of the cam member 81 is releasably abutted. The lower portion of the cam member 81 is abutted against the engaging step portion 80c of the latch 80, whereby the cam member 81 functions as a prop with respect to the latch 80, so that the engagement between the projecting tooth 80b of the latch 80 and each of the first and second cutout teeth 52a, 52b of the side bracket 5' of the seat cushion 5 can be positively maintained.

Figure 6:
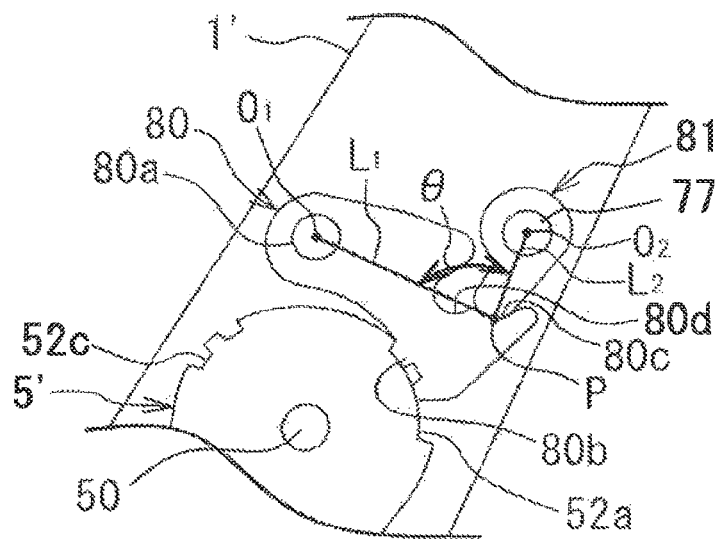
FIG. 6 is a schematic side view of the tipping-up lock means.

Referring to FIG. 6, an angle of the cam member 81 with respect to the latch 80 is set in such a manner that an angle 8 between a reference line $L_1$ connecting an axial center $O_1$ of the support pin 80a of the latch 80 and an abutment point P of the cam member 81 against the engaging step portion 80c of the latch 80, and a line $L_2$ connecting an axial center $O_2$ of the support pin 77 of the cam member 81 and the abutment point P is kept to be an acute angle. A bottom surface of the engaging step portion 80c of the latch 80 is formed so as to be adjacent the projecting tooth 80b of the latch 80, so that the reference line $L_1$ is set so as to descend rearward from the axial center $O_1$ of the support pin 80a of the latch 80.

In the illustrated example, the lower portion of the cam member 81 is formed into a substantially semielliptical shape. Correspondingly to such a shape of the lower portion of the cam member 81, the bottom surface of the engaging step portion 80c of the latch 80 is formed so as to have a substantially J-shape which allows the lower portion of the cam member 81 to be easily abutted against the engaging step portion 80c. Moreover, the substantially J-shaped bottom surface of the engaging step portion 80c is formed so as to have a curve which allows at least half or more region of the lower portion of the cam member 81 to be received by the engaging step portion 80c, so that the lower portion of the cam member 81 can be positively abutted against the engaging step portion 80c of the latch 80 and stably received by the engaging step portion 80c.

The second releasing means for unlocking the tipping-up lock means includes a recess portion 80d (FIG. 5) formed in the upper region of the rearward portion of the latch 80 for allowing of the cam member 81 to be swung up, a second link plate 82, and a second operating lever 8 (FIG. 1). The recess portion 80d formed in the latch 80 extends continuously from an edge of the engaging step portion 80c and may be formed so as to have a depth which is not less than a height of an engaged region between the projecting tooth 80b of the latch 80 and each of the cutout teeth 52a, 52b and allows the projecting tooth 80b of the latch 80 to be escapingly disengaged from each of the cutout teeth 52a, 52b.

In the illustrated example, as shown in FIG. 5, the recess portion 80d of the latch 80 is formed so as to have a substantially U-shape (see FIG. 5) which has a depth larger than the height of the engaged region between the projecting tooth 80d and each of the cutout teeth 52a, 52b and fits the lower portion of the cam 81.

The recess portion 80d of the latch 80 serves to allow the cam member 81 to be swung up in such a manner that the lower portion of the cam member 81 is disengaged from the engaging step portion 80c of the latch 80 and slips into the recess portion 80d. As the cam member 81 is swung up, the latch 80 is swung upwardly in such a manner that the projecting tooth 80b is positively disengaged from any one of the cutout teeth 52a, 52b of the side bracket 5' of the seat cushion.

The latch 80 is held so as to be stably swingable with resort to a holding plate 90 (see FIG. 3) which is supported by the support pin 50 of the side bracket 5' and the support pin 80a of the latch 80.

The second link plate 82 is supported to the side bracket 1' of the seat back by the support pin 77 of the first link plate 73 so as to be swingable together with the cam member 81. As the second link plate 82, there is employed a link plate which is formed so as to have a substantially sector-shape which becomes gradually wider radially from a base portion thereof which is supported by the support pin 77.

The first link plate 73, the cam member 81, and the second link plate 82 are mounted to the support pin 77 which is rotatably supported to the side bracket 1' of the seat back. More particularly, the cam member 81 and the second link plate 82 are fixed to the support pin 77, so that they are swingable together.

Figure 7:
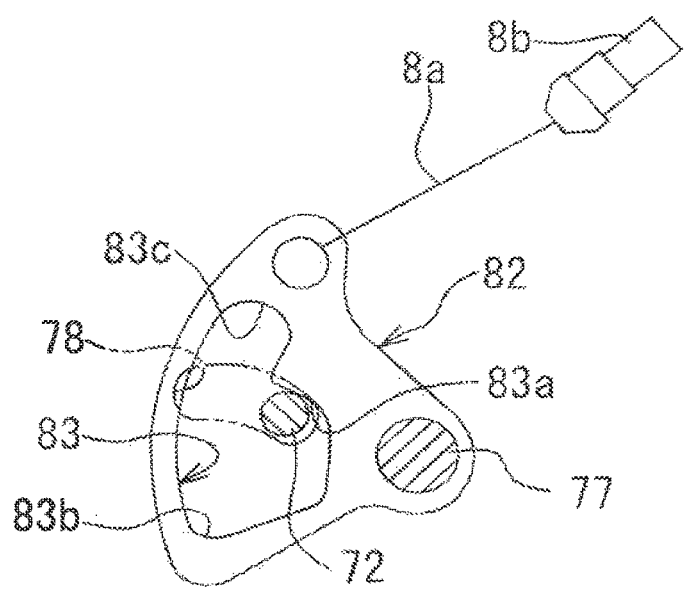
FIG. 7 is a schematic side view of a second link plate of the tipping-up lock means.

Referring to FIG. 7, the second link plate 82 is formed with an opening hole 83 which receives the induction pin 72 of the braking link 71. The opening hole 83 of the second link plate 82 has a middle hole edge region 83a against which the induction pin 72 of the braking link 71 is adapted to be engagingly abutted when the entire vehicle seat is located at a used position of the entire vehicle seat, a lower hole edge region 83b toward which the induction pin 72 of the braking link 71 is adapted to be escapingly moved from the middle hole edge region 83a when the seat cushion is tipped up, and an upper hole edge region 83c toward which the induction pin 72 of the braking link 71 is adapted to be escapingly moved when the seat cushion is in the tipped-up condition and the reclining lock means is unlocked. The term "used position of the entire vehicle seat" means a position at which the seat cushion becomes the substantially horizontal posture and the seat back becomes the substantially vertical posture.

The second link plate 82 is coupled to the second operating lever 8 via a wire 8a of a second wire cable which is inserted through a tube 8b of the second wire cable. As shown in FIG. 1, the second operating lever 8 is provided in a recess portion formed in a bottom region of a forward section of the seat cushion 5. When the second operating lever 8 is pulled by the person, to thereby cause the second link plate 82 to be drawn up, the seat cushion can be brought to a condition where it is allowed to be tipped up in one motion by the person, as will be discussed in detail hereinafter.

The pulling operation of the second operating lever 8 causes the second link plate 82 and the cam member 81 to be swung, whereby the latch 80 is pulled upward and consequently the tipping-up lock means is brought to an unlocked state. Moreover, when the second operating lever 8 is released from the pulled-state, the entire components which include the second link plate 82, the cam member 81 and the latch 80 come down by gravity, whereby the tipping-up lock mean is brought to a locked-state.

Figure 8:
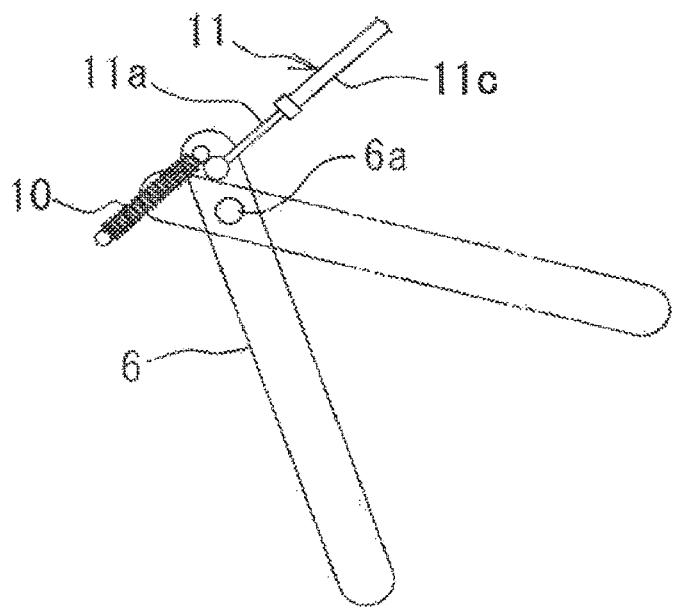
FIG. 8 is a schematic side view of a stand leg portion provided at each of the first and second embodiments.

Referring to FIG. 8, the stand leg portion 6 is typically urged toward a stored position under the seat cushion by a tension spring 10 which is a coil spring or a helical torsion spring and retained at one end thereof to an upper end region of one of the spaced apart vertical portions of the U-shaped stand leg portion 6 and retained at the other end thereof to the one of the side brackets of the seat cushion (not shown). Moreover, a wire of a third wire cable 11 which is inserted through a tube 11c of the third wire cable 11 is coupled at one end portion 11a thereof to the upper end region of the vertical portion of the stand leg portion 6 and coupled at the other end portion thereof (not shown) to the seat back.

Figure 9:
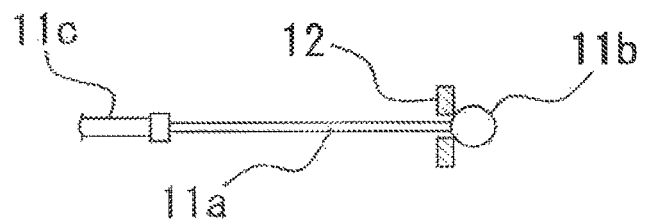
FIGS. 9a to 9c are each an explanatory view of a condition of a wire coupled to the stand leg portion, during pivotal movement of a seat cushion of the vehicle seat according to each of the first and second embodiments.
Figure 9:
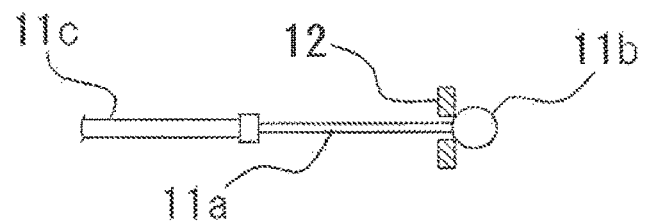
Figure 9:
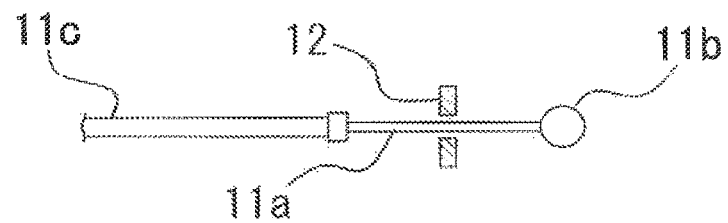

Referring now to FIGS. 9a to 9c, the other end portion 11b of the wire of the third wire cable 11 is supported to a retaining piece 12 which is provided at a suitable portion of the seat back frame. The other end portion 11b of the wire of the third wire cable 11 is provided with a spherical end stop 11d and penetrated through a slit of the retaining piece 12 so as to be movable relative to the retaining piece 12. Incidentally, any suitable compensator (not shown) for compensating a pulling force exerted on the wire of the third wire cable 11 and adjusting a total length of the wire of the third wire cable 11 is provided at a suitable portion of the wire of the third wire cable 11.

When the seat cushion is located at the first used position, the wire of the third wire cable 11 is in a condition shown in FIG. 9a. In this condition, when the person causes the tipping-up lock means to be unlocked by pulling the second operating lever 8 and then causes the seat cushion to be tipped up while allowing the stand leg portion 6 to be disengaged from the receiving base 6b (FIG. 1), the wire of the third wire cable 11 is pushed so as to overcome an action of the tension spring 10 (as shown in FIG. 9b) and allow the stand leg portion 6 to be pivoted toward a developed position thereof until the seat cushion reaches a position just before the tipped-up position. On the other hand, as the seat cushion is pivoted toward the tipped-up position from the position just before the tipped-up position, the action of the tension spring 10 (FIG. 8) is exerted on the wire of the third wire cable 11, whereby the wire of the third wire cable 11 is moved in such a manner that the wire end portion 11b is moved relative to the retaining piece 12 so as to project from the retaining piece 12 as shown in FIG. 9c. Thus, the stand leg portion 6 is moved to the stored position by the action of the tension spring 10.

By the wire of the third wire cable 11, the stand leg portion 6 can be pivoted toward the stored position synchronously with the tipping-up movement of the seat cushion and diving-down movement of the entire vehicle seat, and can be pivoted toward the developed position synchronously with returning of the entire seat toward the used position of the entire vehicle seat or returning of the seat cushion toward the first used position.

In the tip-up/dive down type reclining vehicle seat of the first embodiment which is constructed as discussed above, in a condition where the entire vehicle seat is located at the used position thereof (see FIG. 1) and the reclining lock means and the tipping-up lock means are in the locked states (see FIG. 2), the lower end portion of the braking link 71 is stoppingly engaged with the stopper pin 51 provided on the side bracket 5' of the seat cushion 5 and the induction pin 72 of the braking link 71 is located at a rearward end of the guide hole 78 formed in the first link plate 73, whereby the used position of the entire vehicle seat is determined.

Figure 10:
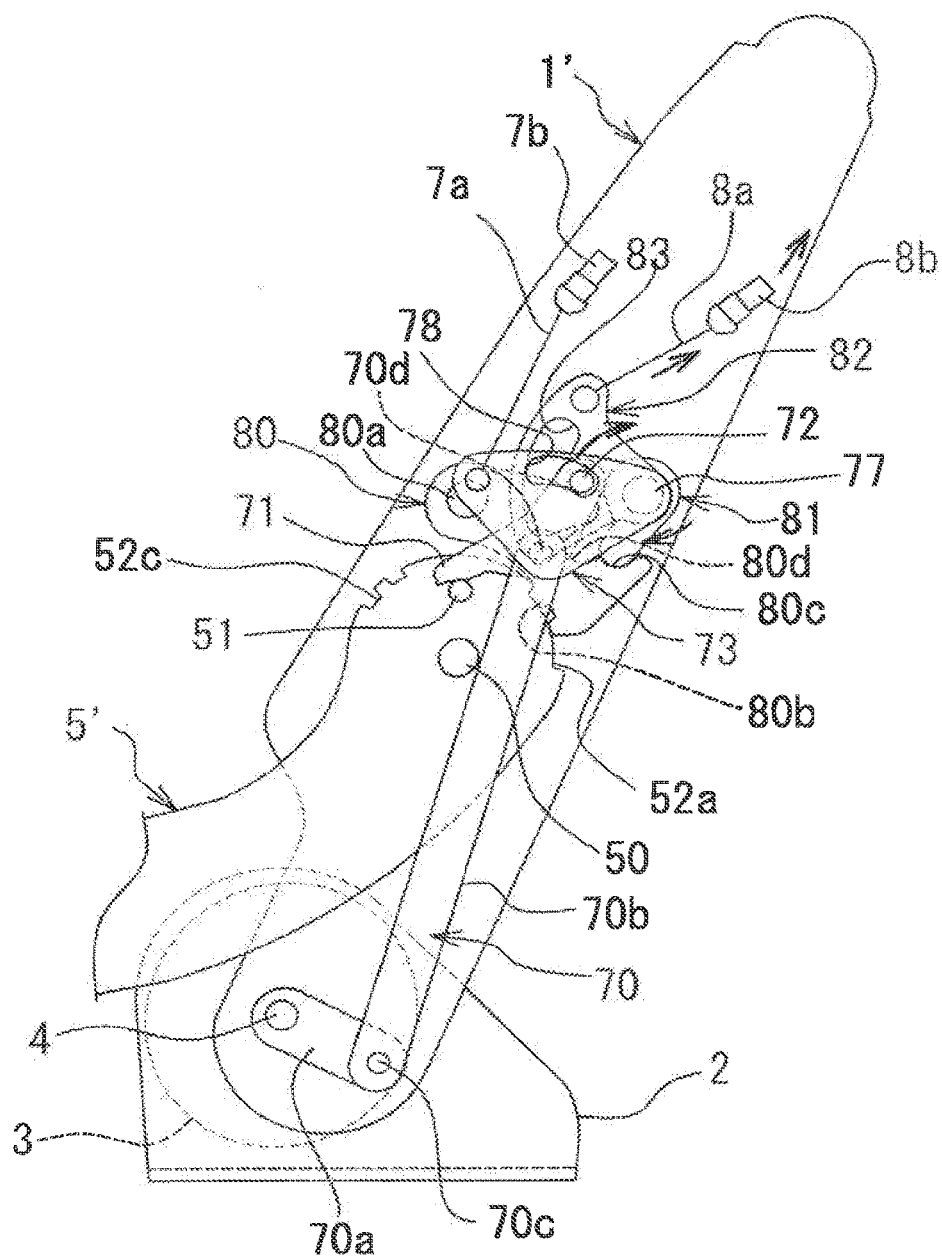
FIG. 10 is a schematic side view which is of assistance in explaining an unlocking operation of the tipping-up lock means.

In a case where the seat cushion 1 is to be tipped up from the first used position in a condition where the entire vehicle seat is located at the used position thereof, when the second operating lever 8 is pull-operated by the person, an upward pulling force is applied to the second link plate 82 through the wire 8a of the second wire cable as shown in FIG. 10. By the upward pulling force, the second link plate 82 is upwardly swung about the support pin 77 and the cam member 81 is also swung together with the second link plate 82 in such a manner that the lower portion of the cam member 81 is disengaged from the engaging step portion 80c of the latch 80 and slips into the recess portion 80d of the latch 80.

Figure 11:
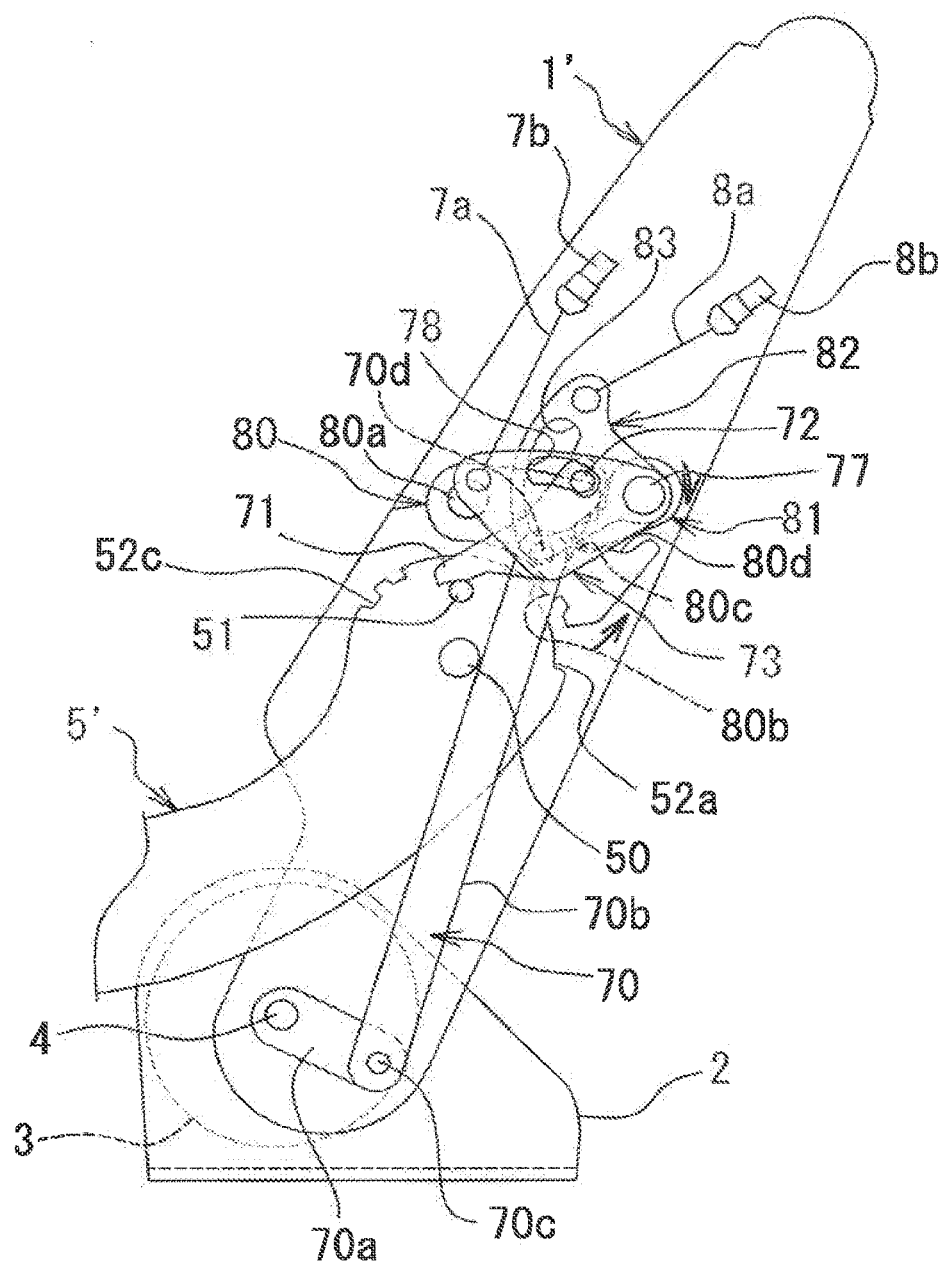
FIG. 11 is a schematic side view showing an unlocked condition of the tipping-up lock means.

As the lower portion of the cam member 81 slips into the recess portion 80d of the latch 80, the latch 80 is swung up, whereby the projecting tooth 80b of the latch 80 is disengaged from the first cutout tooth 52a of the side bracket 5' of the seat cushion as shown in FIG. 11. The recess portion 801 of the latch 80 is configured to have the depth larger than the height of the engaged region between the projecting tooth 80b of the latch 80 and the cutout tooth 52a of the side bracket 5' of the seat cushion 5 as discussed above, so that as the lower portion of the cam 81 slips into the recess portion 80d, the latch 80 is considerably swung up, whereby the projecting tooth 80b can be positively disengaged from the first cutout tooth 52a of the side bracket 5' of the seat cushion. Thus, the tipping-up lock means is brought to the unlocked state, that is, the seat cushion is brought to a condition where it is allowed to be tipped up.

Figure 12A:
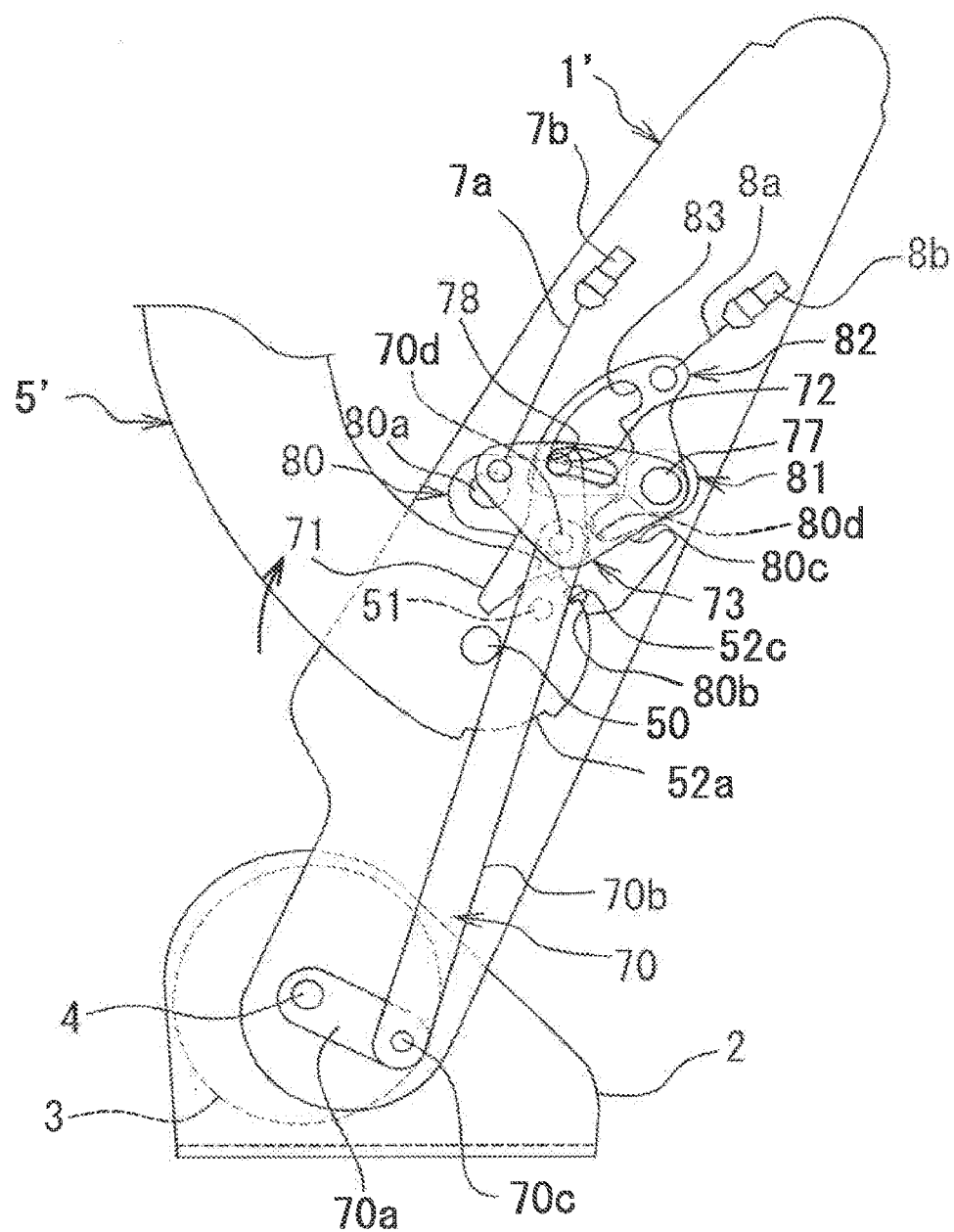
FIGS. 12a to 12c are each a schematic side view which is of assistance in explaining tipping-up movement of the seat cushion.
Figure 12B:
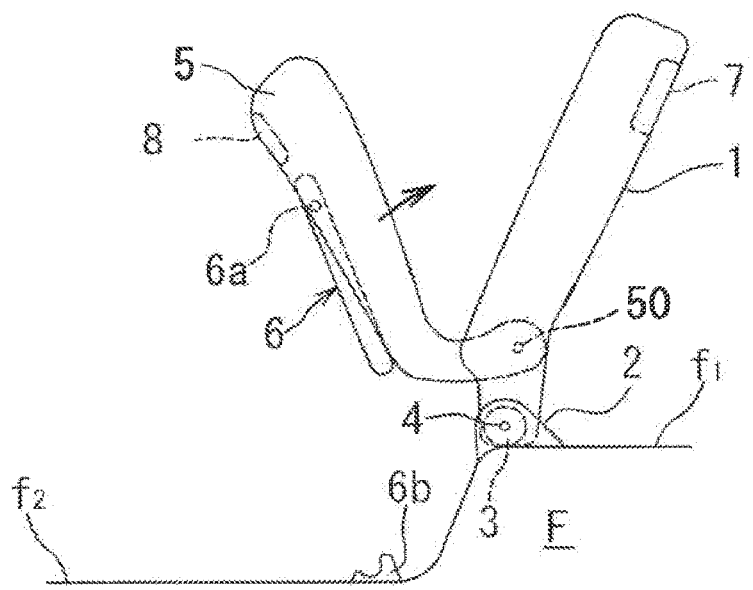

In the condition where the tipping-up lock means is unlocked, namely, the projecting tooth 80b of the latch 80 is disengaged from the cutout tooth 52a of the side bracket 5', when the person lifts the seat cushion up from the forward direction while leaving the second operating lever pulled and holding the seat cushion with his/her hand, the cutout tooth 52a of the side bracket 5' of the seat cushion is moved away from the first cutout tooth 80b of the latch 80 as shown in FIG. 12a. Thus, the seat cushion 5 is tipped up from the first used position to the tipped-up position around the support pins 50 as shown in FIGS. 12b and 12c.

When the second operating lever 80 is pull-operated at the time of causing the tipping-up lock means to be unlocked, the second link plate 82 is swung upward and the induction pin 72 of the braking link 71 is escapingly moved toward the lower hole edge region 83b from the middle hole edge region 83a of the second link plate 82 (FIG. 7) relative to the second link plate 82 as shown in FIG. 12a, so that the induction pin 72 of the braking link 71 is not drawn up by the second link 82 and the reclining lock mechanisms are not unlocked.

Figure 12C:
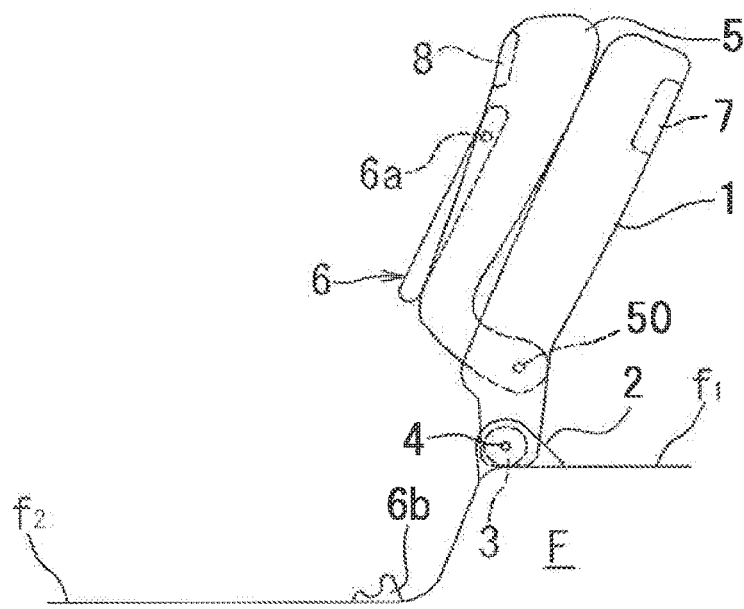
Figure 13:
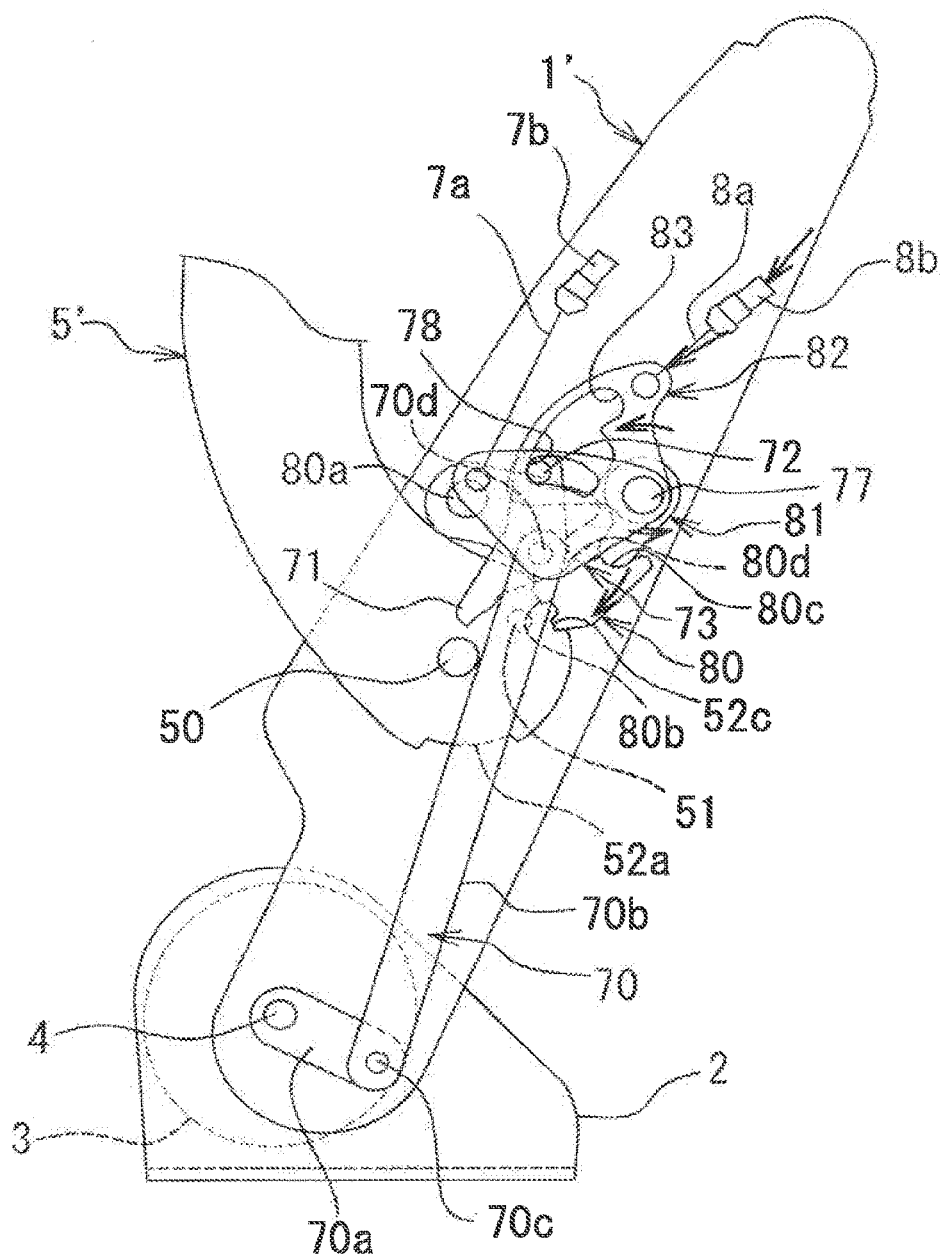
FIG. 13 is a schematic side view which is of assistance in explaining locking operation of the tipping-up lock means.

In the condition where the seat cushion is tipped-up as shown in FIG. 12c, when the second operating lever 8 is released from the pulled-state, the components which include the second link plate 82, the cam member 81 and the latch 80 come down by gravity while pulling the wire 8a of the second wire cable down as shown in FIG. 13 and are returned to their original positions. In the condition where the components are returned to the original positions, the lower portion of the cam member 81 is engagingly abutted against the engaging step portion 80c of the latch 80 and the projecting tooth 80b of the latch 80 is engaged with the second cutout tooth 52b of the side bracket 5' of the seat cushion 5. Thus, the seat cushion 5 is maintained in the tipped-up posture.

Returning of the seat cushion 5 maintained in the tipped-up posture to the first used position can be performed by pulling the second operating lever 8 in the same manner as discussed above. Namely, when the second operating lever 8 is pulled, the tipping-up lock means is unlocked. In this condition, the seat cushion can be pivoted to the first used position by the person.

Figure 14:
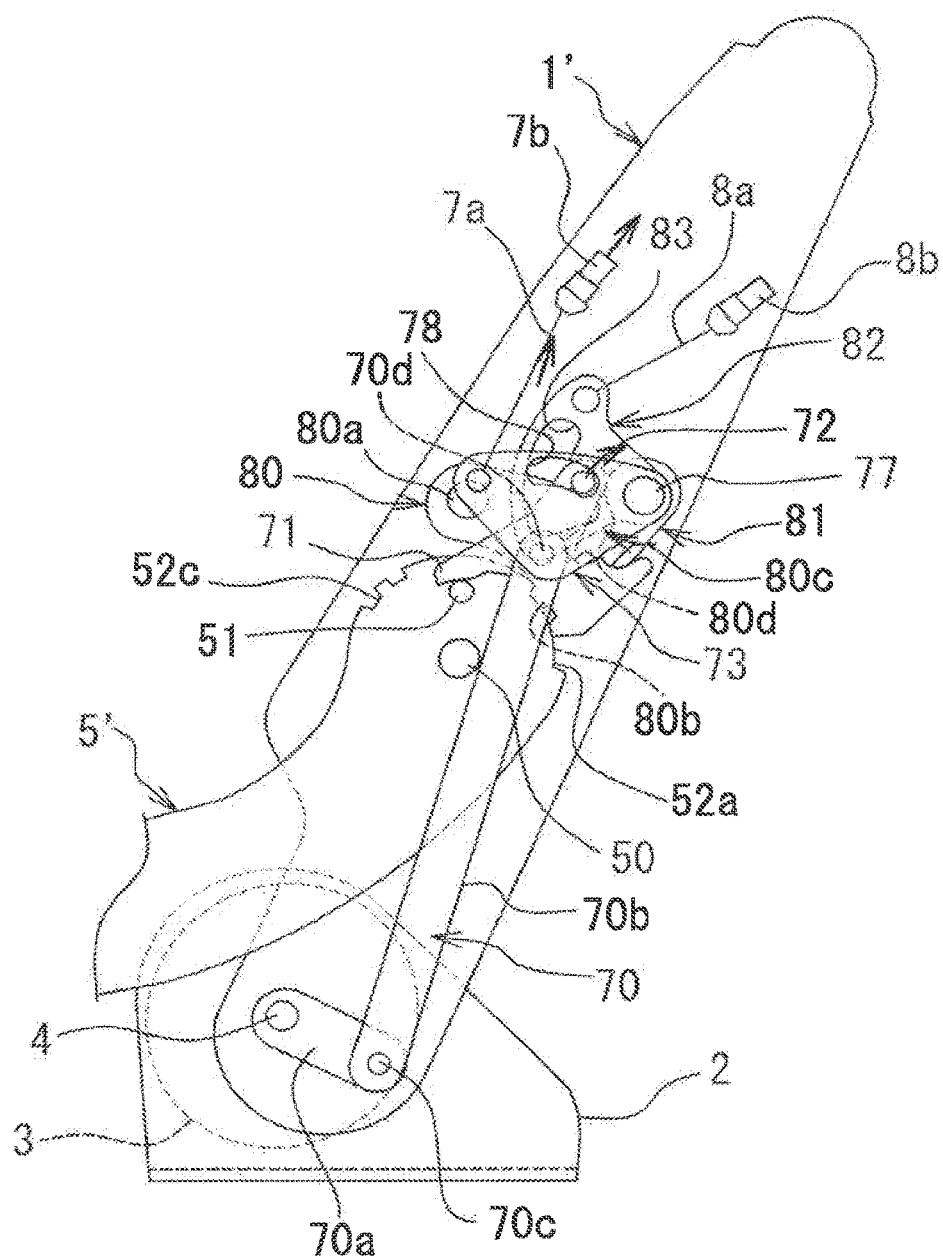
FIG. 14 is an explanatory view which is of assistance in explaining an unlocking operation of the reclining lock means.

In a case where the reclining lock means is to be unlocked in the condition where the entire vehicle seat is located at the used position thereof and both the reclining lock means and the tipping-up lock means are locked (FIG. 1), when the person pulls the first operating lever 7, the wire 7a of the first wire cable of the first operating lever 7 is drawn up as shown in FIG. 14 and the first link plate 73 is swung upward around the support pin 77. At this time, the induction pin 72 of the braking link 71 is located at the rearward end of the guide hole 78 of the first link plate 73 and engagingly abutted against the middle hole edge portion 83a of the second link plate 82 (see FIG. 7), so that the second link plate 82 is also swung upward synchronously with the upward swinging of the first link plate 73.

Figure 15:
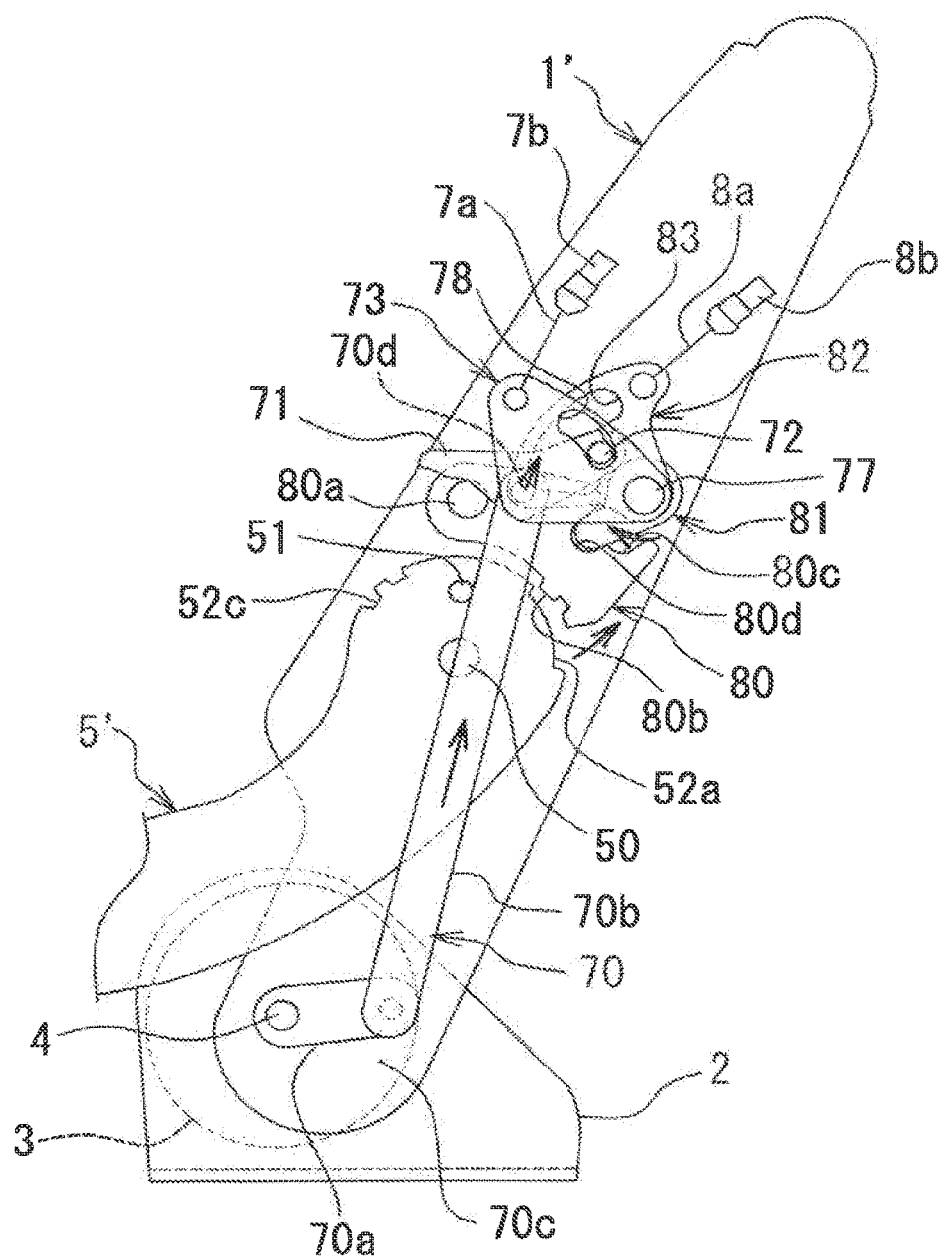
FIG. 15 is an explanatory view which is of assistance in explaining an unlocked-state of the reclining lock means.

When the first link plate 73 is swung upward, the braking link 71 coupled via the induction pin 72 to the first link plate 73 is pulled up and the collapsible link bar member 70 coupled between the braking link 71 and the actuating shaft 4 of the first reclining lock mechanism 3 is pulled upward as shown in FIG. 15, whereby the actuating shafts of the first and second reclining lock mechanisms are synchronously rotated. Thereby, the reclining lock mechanisms are unlocked and the tipping-up lock means is also unlocked since the second link plate 82 is swung upward as discussed above.

Figure 16:
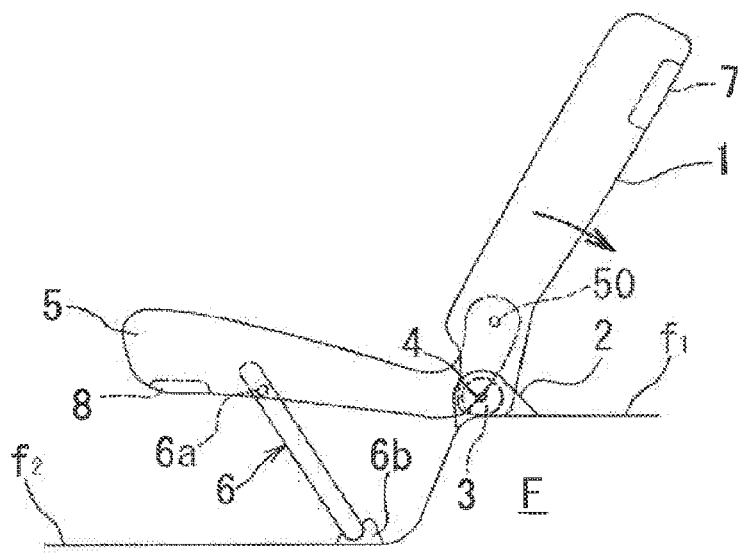
FIG. 16 is a schematic side view of the reclining seat which is of assistance in explaining an angularly rearward adjusting operation of a seat back of the vehicle seat according to the first embodiment.

In the condition where the reclining lock means and the tipping-up lock means are unlocked, the person can cause the seat back 1 to be pivoted rearward so as to be angularly adjusted as shown in FIG. 16. When the first operating lever 7 is released from the pulled-state after the seat back 1 is angularly adjusted rearward, the components which include the first link plate 73, the braking link 71, the link bar member 70, the second link plate 82, the cam member 81 and the latch 80 come down by gravity and are returned to their original positions, whereby the reclining lock means and the tipping-up lock means are locked and the entire seat is maintained in a used position thereof at which the seat back is angularly adjusted rearward.

Figure 17A:
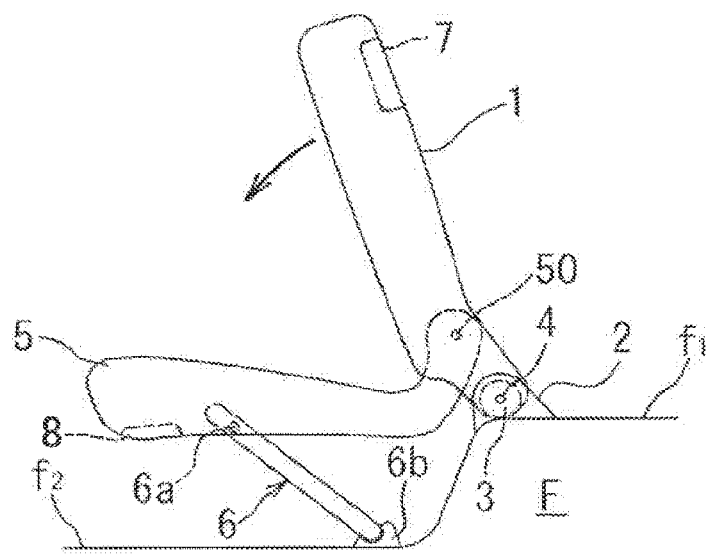
FIG. 17a is a schematic side view of the vehicle seat according to the first embodiment, which is of assistance in explaining diving-down movement of the vehicle seat.
Figure 17B:
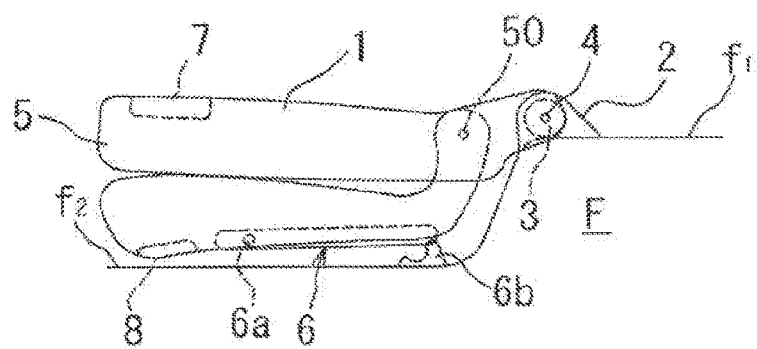
FIG. 17b is a schematic side view of the vehicle seat, which is of assistance in explaining a stored-condition of the vehicle seat.
Figure 18A:
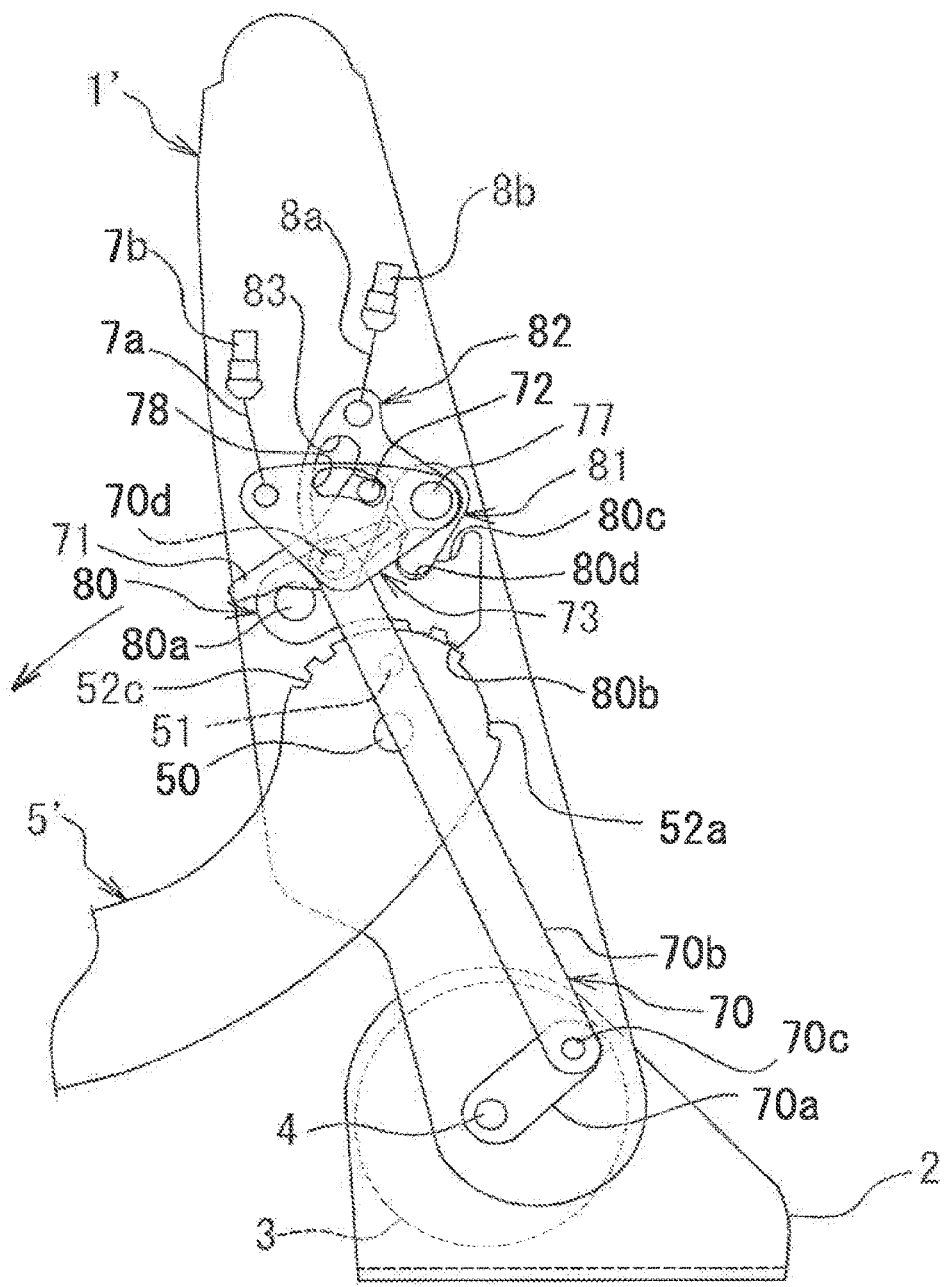
FIG. 18a is a schematic side view of the first and second releasing means at the time of the diving-down movement of the vehicle seat.
Figure 18B:
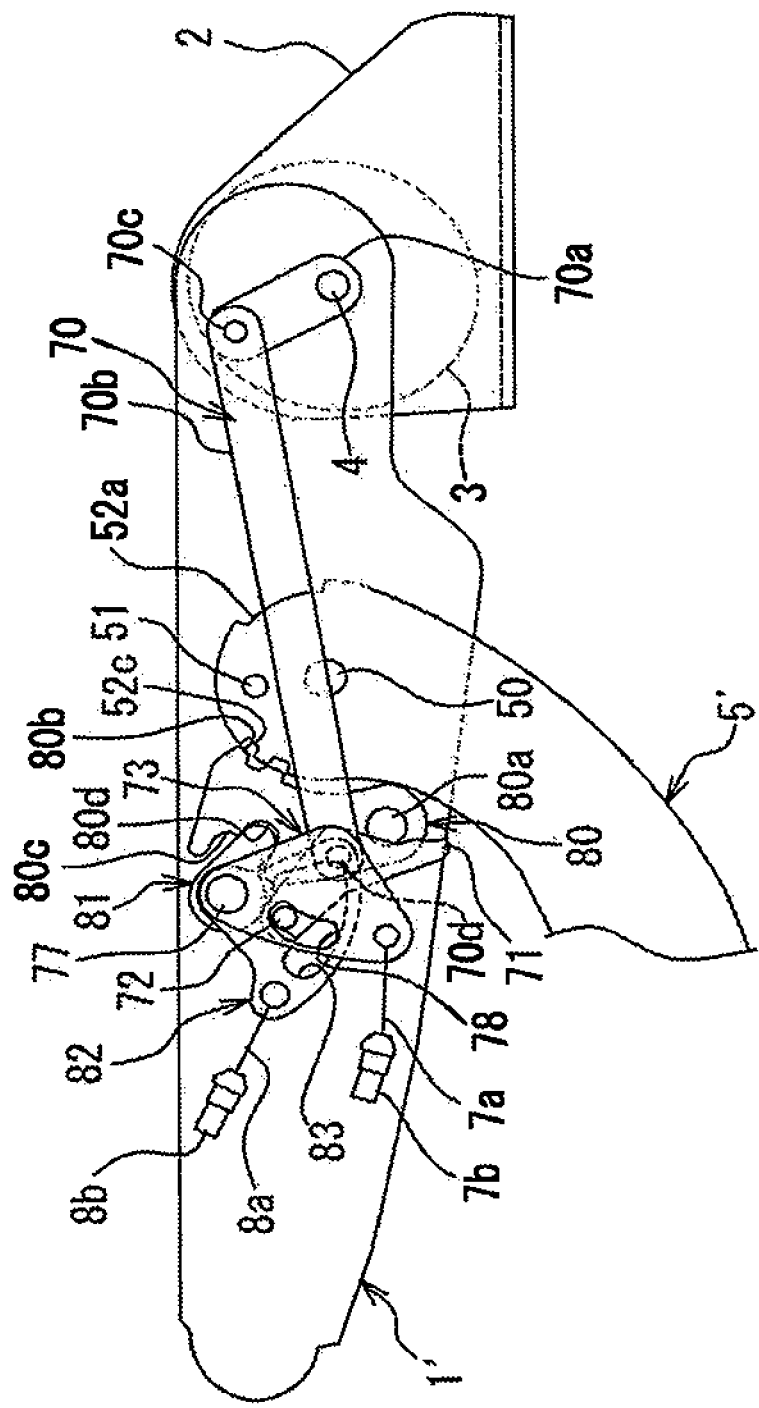
FIG. 18b is a schematic side view of the first and second releasing means at the time of storing of the vehicle seat.

Moreover, in the condition where the reclining lock means and the tipping-up lock mean are unlocked, the seat back is pivoted forward and the entire vehicle seat can be dived down and stored in a space on the lower step portion $f_2$ of the vehicle body floor F as shown in FIGS. 17a and 17b. In this case, the components which include the first link plate 73, the braking plate 71, the link bar member 70, the second link plate 82, the cam member 81 and the latch 80 cannot come down by gravity as shown in FIGS. 18a and 18b during the forward pivotal movement of the seat back from the substantially vertical position, so that the reclining lock means and the tipping-up lock means are maintained in the unlocked states.

In the condition which the reclining lock means and the tipping-up lock means are maintained in the unlocked states, the person causes the entire seat to be forward pivoted to a certain extent while holding the seat back with his/her hand. Then, the person causes his/her hand to be removed from the recess portion of the seat back to the recess portion of the seat cushion and causes the seat cushion to be lifted down while holding the seat cushion with his/her hand. Thus, the entire vehicle seat can be dived down and stored in the space on the lower step portion $f_2$ of the vehicle body floor F.

In the dived-down state of the entire vehicle seat, the reclining lock means and the tipping-up lock means are still maintained in the unlocked states, so that when the vehicle seat in the dived-down sate is to be returned to the used position of the entire vehicle seat, the person inserts his/her hand into the recess portion of the seat back, and can easily lift the entire vehicle seat up from the dived-down position shown in FIG. 19a to a position shown in FIG. 19b and then return the vehicle seat to the used position of the entire vehicle seat (FIG. 1), while holding the seat back with his/her hand.

Figure 20:
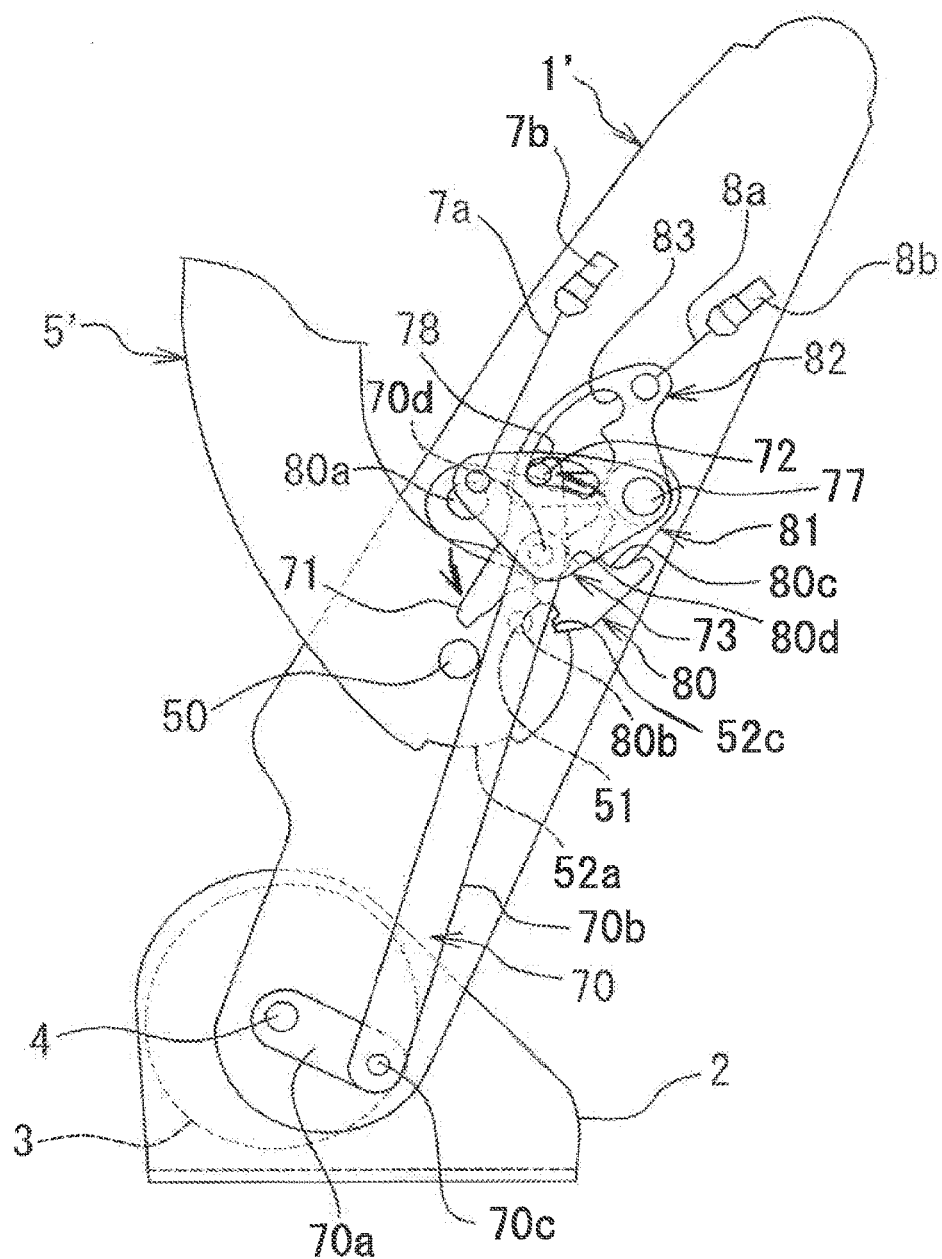
FIG. 20 is a schematic side view of the tipping-up lock means in a locked-condition.

In the condition where the seat cushion is locked in the tipped-up position by the tipping-up lock means, the stopper pin 51 projecting from the side bracket 5' of the seat cushion 5 is separated from the lower portion of the braking link 71 and the braking link 71 comes down by gravity as shown in FIG. 20, so that the induction pin 72 of the braking link 71 is located at a forward end of the guide hole 78 formed in the first link plate 73.

Figure 21:
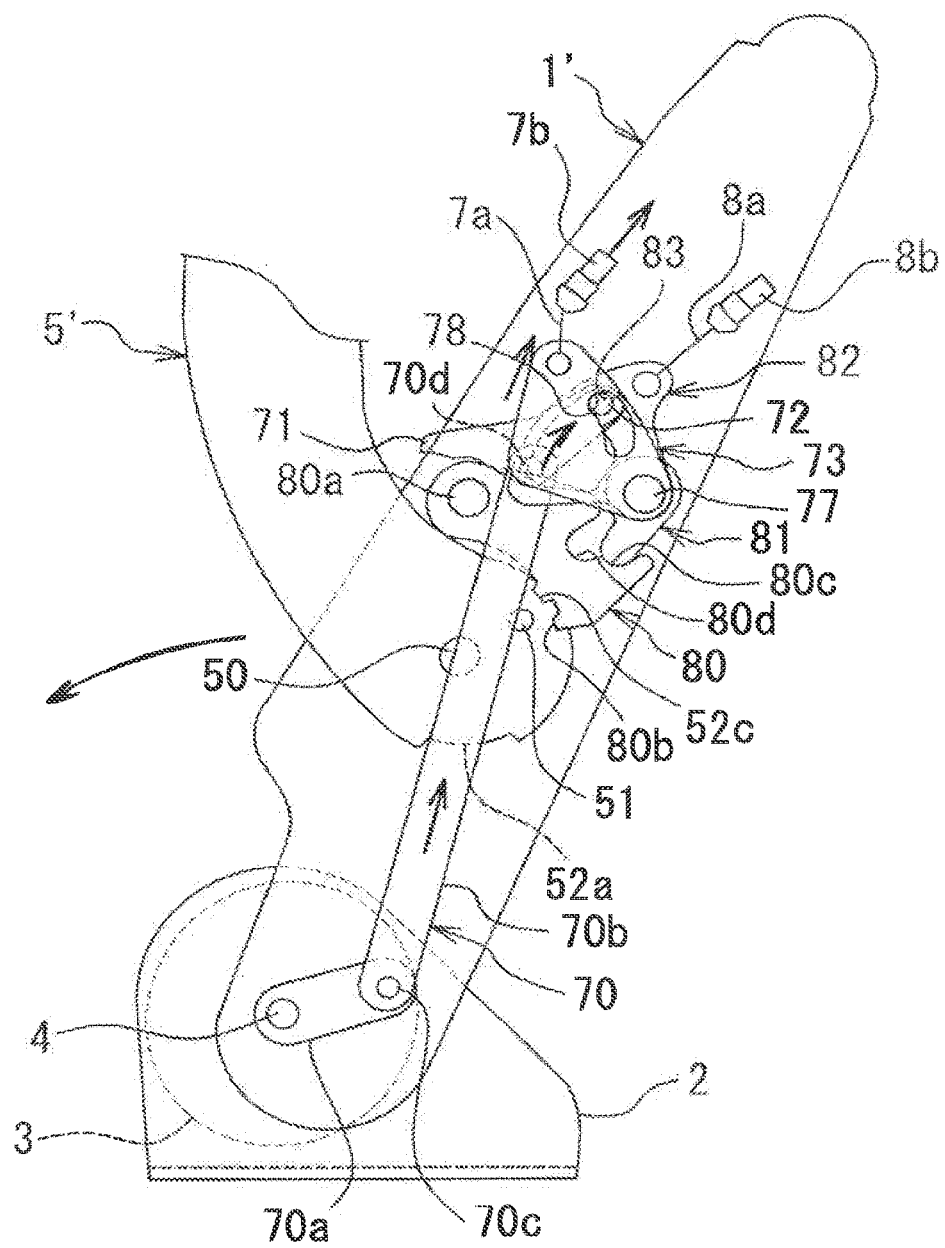
FIG. 21 is a schematic side view which is of assistance in explaining an unlocking operation of the reclining lock means.

When the first operating lever 7 is pull-operated in order that the seat cushion 5 maintained in the tipped-up position is pivoted forward together with the seat back and then dived down, the first link plate 73 is swung upward as shown in FIG. 21, whereby the induction pin 72 of the breaking link 71 which is located at the forward end of the guide hole 78 of the first link plate 73 is pulled upward, so that the reclining lock means is unlocked as discussed above.

Even if the reclining lock means is unlocked, the induction pin 72 of the braking link 71 is escapingly moved from the middle hole edge portion 83a of the second link plate 82 toward the upper hole edge portion 83c of the second link plate 82 (FIG. 7) with respect to the second link plate 82 according to the unlocking operation of the reclining lock means, so that the tipping-up lock means is maintained in the locked state.

Figure 22B:
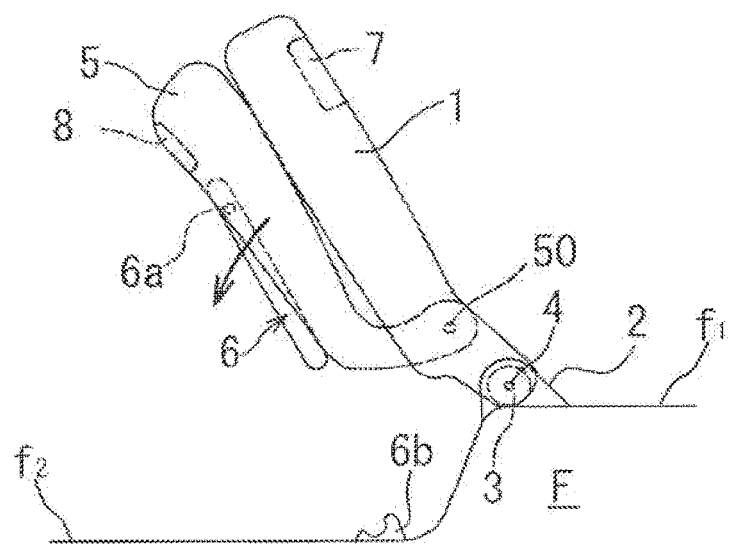
FIG. 22b is a schematic side view which is of assistance in explaining the diving-down movement of the vehicle seat.
Figure 23:
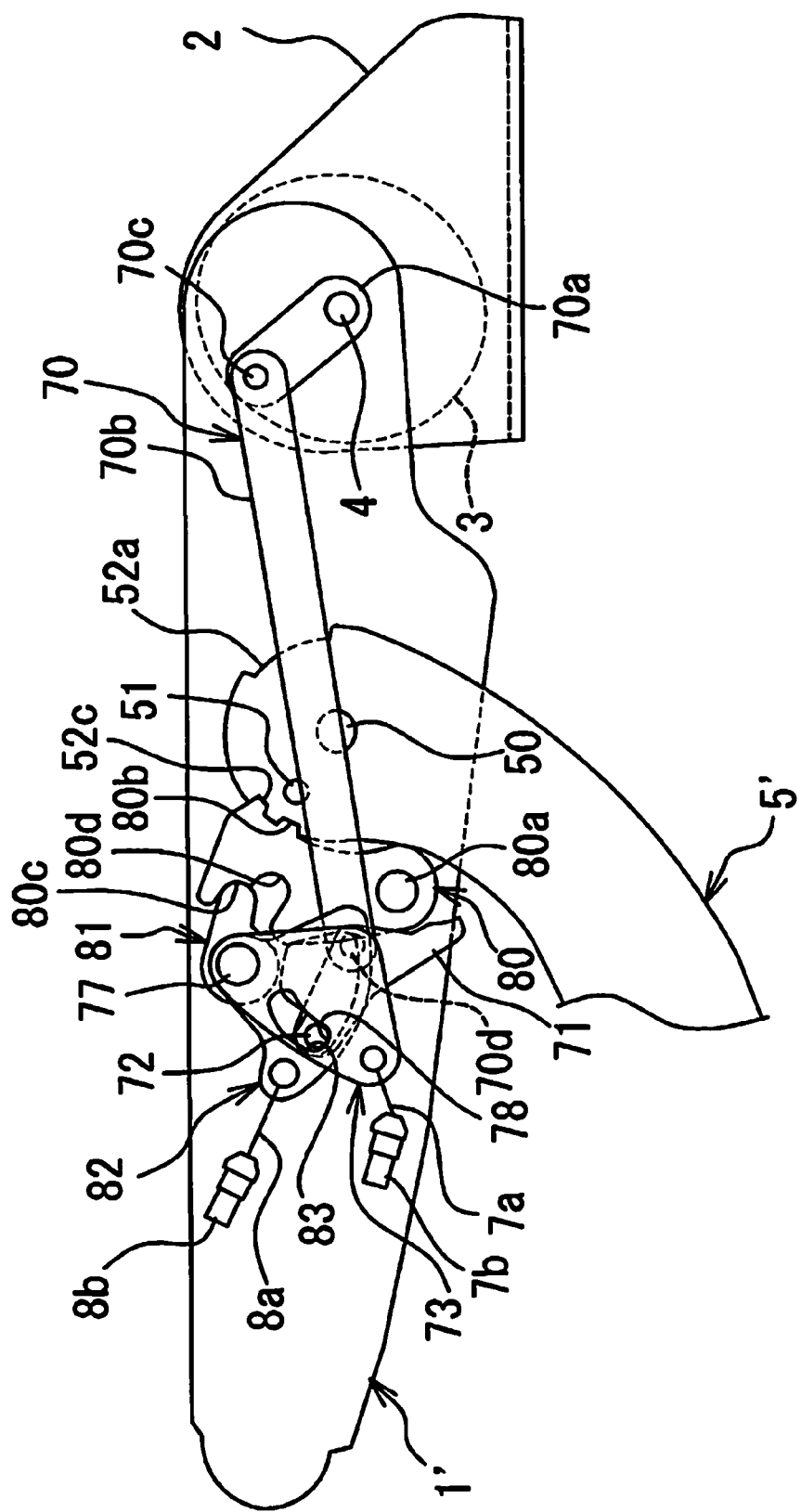
FIG. 23 is a schematic side view of the tipping-up lock means just before the diving-down movement of the vehicle seat.

In the condition where the tipping-up lock means is maintained in the locked state, the seat cushion 5 is prevented from being pivoted with respect to the seat back 1 as shown in FIGS. 22a and 22b, so that the seat cushion 5 can be forward pivoted together with the seat back 1 and the entire vehicle seat can be dived down as shown in FIG. 23 and then stored in the space on the lower step portion of the vehicle body floor.

The diving-down movement of the entire vehicle seat can be performed by the person in the same manner as discussed above. That is, the person inserts his/her hand into the recess portion of the seat back, causes the entire seat to be forward pivoted to the certain extent while holding the seat back with his/her hand. Then, the person causes his/her hand to be removed from the recess portion of the seat back to the recess portion of the seat cushion, and causes the seat cushion to be lifted down while holding the seat cushion with his/her hand. Thus, the entire vehicle seat can be dived down and stored in the space on the lower step portion $f_2$ of the vehicle body floor F.

Figure 24:
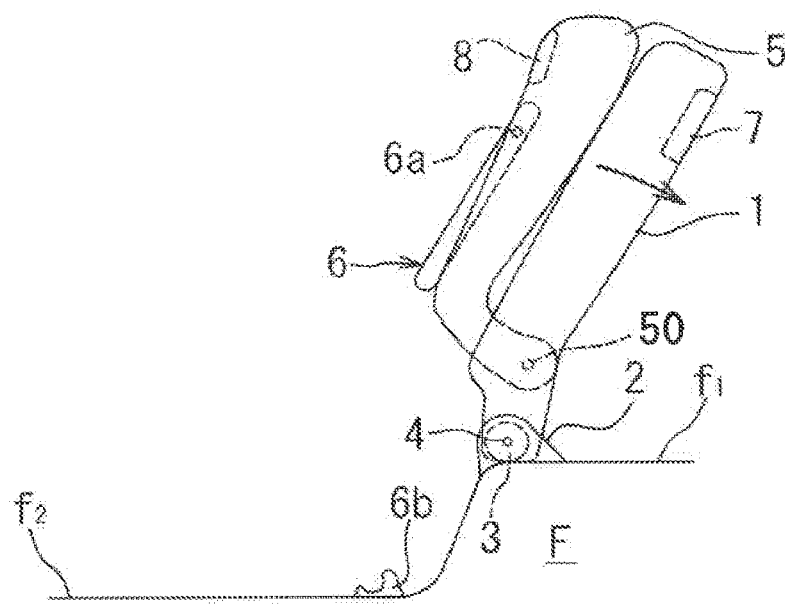
FIG. 24 is a schematic side view of the vehicle seat, which is of assistance in explaining an angularly rearward adjusting operation of the vehicle seat in the tipped-up condition.

As discussed above, in the condition where the seat cushion 5 is tipped up, even if the reclining lock means is unlocked by operating the first operating lever 7, the tipping-up lock means is kept in the locked state, so that the entire vehicle seat can be angularly adjusted rearward as shown in FIG. 24.

During changing of the posture of the entire vehicle seat which has been discussed above, namely, during the tipping-up movement of the seat cushion 5 (FIGS. 12b and 12c) or the diving-down movement of the entire vehicle seat (FIGS. 17a and 17b), the stand leg portion 6 can be pivoted toward the stored position synchronously with such movement of the seat cushion or the entire vehicle seat. Moreover, during the returning movement of the entire vehicle seat to the used position thereof (FIGS. 19a and 19b) or the returning movement of the seat cushion in the tipped-up sate to the first used position, the stand leg portion 6 can be pivoted toward the developed position synchronously with such movement of the entire vehicle seat or the seat cushion.

Incidentally, while the case where the tipping-up lock means and the first and second releasing means are provided on the one side of the vehicle seat has been discussed with respect to the embodiment of the present invention, second tipping-up lock means, third releasing means and fourth releasing means which are constructed in the same manner as the first tipping-up lock means, the first releasing means and the second releasing means are done, respectively, except that the third and fourth releasing means do not include any operating levers, may be provided on the other of the both sides of the vehicle seat. In this case, a fourth wire cable is connected between the first operating lever 7 and a link plate of the third releasing means and a fifth wire cable is connected between the second operating lever 8 and a link plate of the fourth releasing means, so that when the first operating lever is pull-operated, the first releasing means and the third releasing means can be synchronously actuated and, when the second operating lever is pull-operated, the second releasing means and the fourth releasing means can be synchronously actuated.

Referring to FIGS. 25 to 45b, a tip-up/dive down type vehicle seat according to a second embodiment of the present invention will be discussed hereinafter. The second embodiment is constructed in a substantially same manner as the first embodiment is done, except for following points. In FIGS. 25 to 45b, components that are substantially similar to those of the vehicle seat shown in FIGS. 1 to 24 are designated by the same reference numerals. Like the vehicle seat according to the first embodiment of the present invention, the vehicle seat according to the second embodiment of includes the seat back 1 (see FIG. 33) adapted to be pivotally movable and having the spaced apart side brackets serving as the side frame sections of the seat back frame for the seat back 1, the seat cushion 5 pivotally supported to the seat back 1 so as to be capable of being tipped up (see FIG. 33), the reclining lock means including the first and second reclining lock mechanisms 3 for releasably locking the seat back 1 and preventing the pivotal movement of the seat back 1 (only first reclining mechanism 3 is shown in FIG. 33), the first releasing means for unlocking the first and second reclining lock mechanisms 3 and allowing the seat back to be brought to the condition where the seat back is allowed to be pivoted forward and rearward (see FIG. 33), the tipping-up lock means for releasably locking the seat cushion 5 and preventing the tipping-up movement of the seat cushion (see FIG. 33), and the second releasing means for unlocking the tipping-up means and allowing the seat cushion to be brought to the condition where the seat cushion is allowed to be tipped up (see FIG. 33). The reclining lock mechanisms 3 are provided between the lower end portions of the spaced apart side brackets of the seat back 1 and the spaced apart base brackets 2 mounted on the upper step portion $f_1$ of the vehicle body floor F so as to stand up from the upper step portion f1, so that the seat back 1 is allowed to be releasably locked with respect to the upper step portion f1 of the vehicle body floor F by the reclining lock mechanisms 3.

Like the seat cushion of the first embodiment, the seat cushion 5 of the second embodiment includes the spaced apart side brackets serving as the side frame sections of the seat cushion frame for the seat cushion 5. The spaced apart side brackets of the seat cushion 5 are coupled at the rear end portions thereof to the portions of the side brackets of the seat back 1, which are adjacent the lower end portions of the spaced apart side brackets of the seat back 1, by the support pins 50, whereby the seat cushion 5 is pivotally supported to the seat back 1 so as to be allowed to be tipped up. Like the vehicle seat of the first embodiment, the vehicle seat of the second embodiment further includes the substantially U-shaped stand leg portion 6 in outline which is pivotally connected at the upper end regions of the spaced apart vertical portions thereof to the side brackets of the seat cushion 5 by the support pins 6a. As shown in FIG. 33, the receiving base 6b for receiving and engaging the lower horizontal portion of the stand leg portion 6 is mounted on the lower step portion $f_2$ of the vehicle body floor F. The stand leg portion 6 is adapted to be engaged at the lower horizontal portion thereof with the receiving base 6b so as to obliquely stand up from the lower step portion $f_2$ of the vehicle body floor F, whereby when the seat cushion is located at the first used position, the seat cushion is horizontally supported by the stand leg portion 6 which is releasably engaged with the receiving base 6b.

Like the reclining lock means of the first embodiment, the reclining lock means of the second embodiment is adapted to be unlocked by pull-operating the first operating lever 7 which is provided in the recess portion of the back of the seat back 1. In the condition where the reclining lock means is unlocked, the person can cause the seat back 1 to be pivoted forward or rearward in one motion while holding the seat back with his/her hand.

Like the tipping-up lock means of the first embodiment, the tipping-up lock means of the second embodiment is adapted to be unlocked by pull-operating the second operating lever 8 which is provided in the recess portion formed in the bottom region of the forward section of the seat cushion 5. In the condition where the tipping-up lock means is unlocked, the person can cause the seat cushion 5 to be tipped up in one motion while holding the seat cushion with his/her hand.

Like the side bracket 5' of the seat cushion 5 of the first embodiment, the side bracket 5' of the seat cushion 5 of the second embodiment is provided at the rear portion thereof with the substantially semicircular-arc shaped edge which extends about the support pin 50 of the side bracket 5' of the seat cushion. The stopper pin 51 is provided on the side bracket 5' so as to be arranged upward of the support pin 50 of the side bracket 5' of the seat cushion 5.

Figure 25:
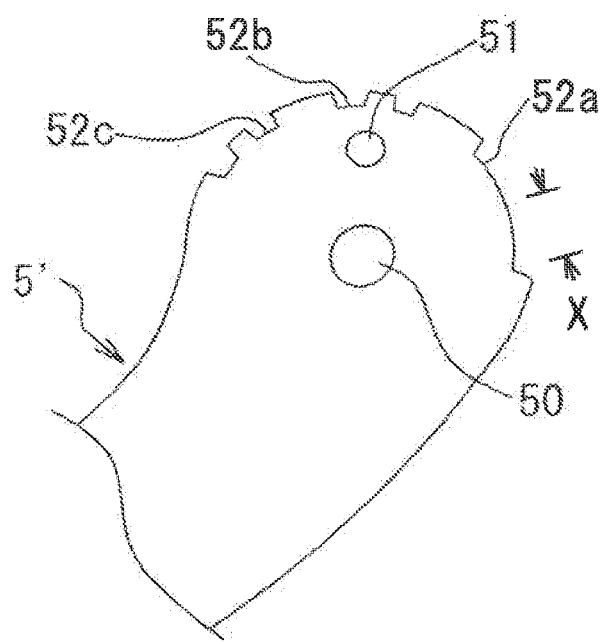
FIG. 25 is a schematic fragmentary side view of a side bracket of a seat cushion of a reclining vehicle seat according to the second embodiment of the present invention.

Referring to FIG. 25, the vehicle seat according to the second embodiment of the present invention is different from the vehicle seat of the first embodiment in that in addition to the first and second cutout teeth 52a, 52b, the tipping-up lock means includes a third cutout tooth 52c provided at the substantially semicircular-arc shaped edge of the side bracket 5' so as to be arranged between the first and second cutout teeth 52a, 52b and serving as means to facilitate causing of the seat cushion to be locked in a middle position between the first used position and the tipped-up position of the seat cushion. Like the first cutout tooth 52a of the first embodiment, the first cutout tooth 52a of the second embodiment is configured to include the recess portion which is adapted to receive the projecting tooth 80b of the latch 80 during the returning of the seat cushion to the first used position from the tipped-up position and has a length X sufficient to allow the seat back in the second used position to be angularly adjusted rearward in the condition where the seat cushion is located in the first used position.

Figure 26:
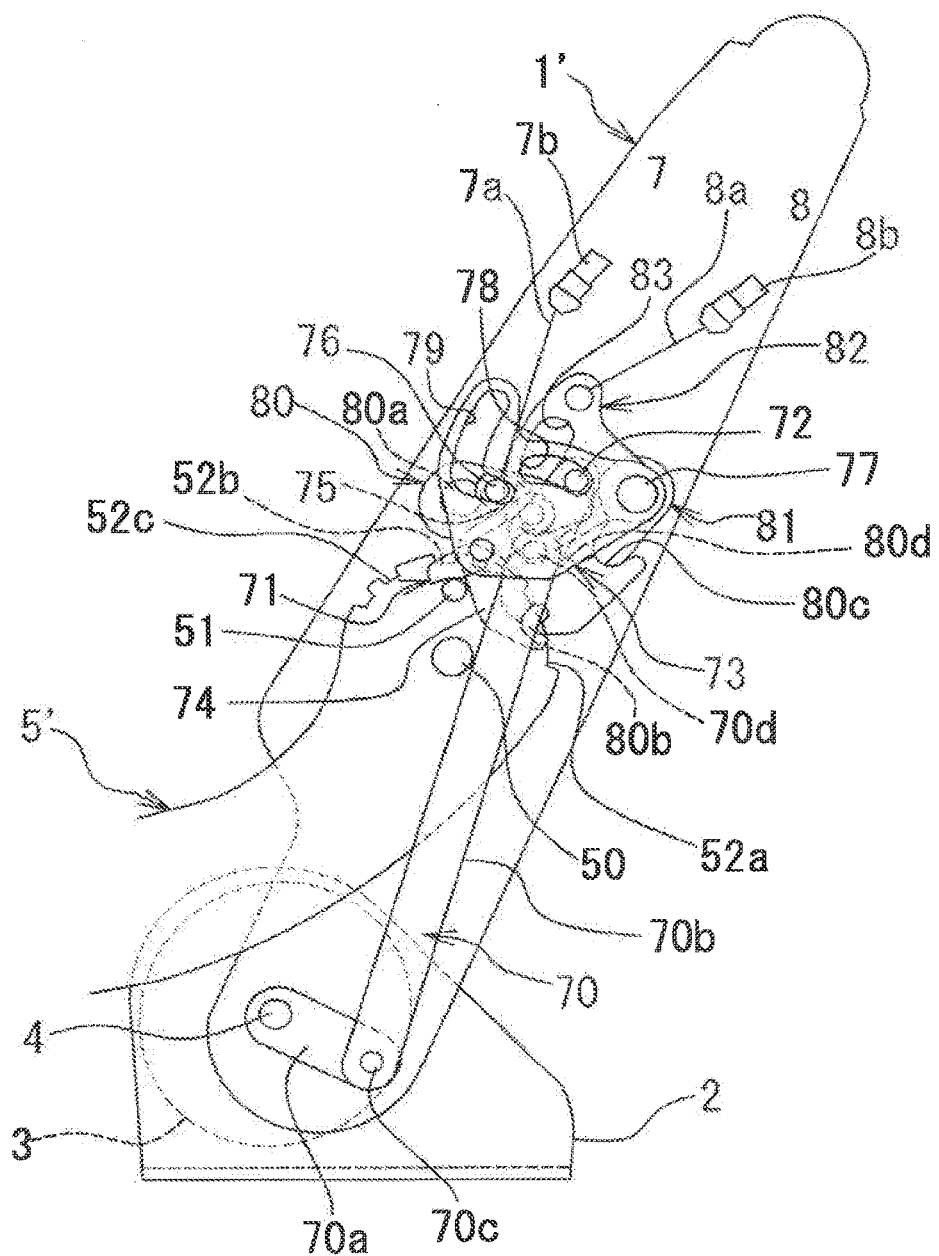
FIG. 26 is a schematic side view of reclining lock means, tipping-up lock means, and first and second releasing means which are provided at the vehicle seat according to the second embodiment.
Figure 27:
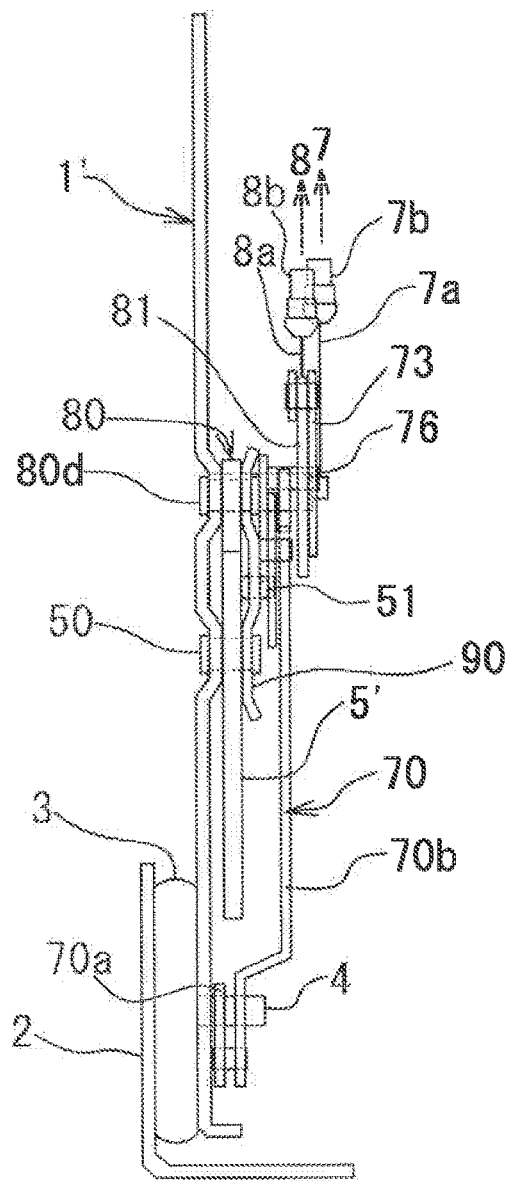
FIG. 27 is a schematic front view of the reclining lock means, the tipping-up lock means, and the first and second releasing means of the second embodiment.
Figure 28:
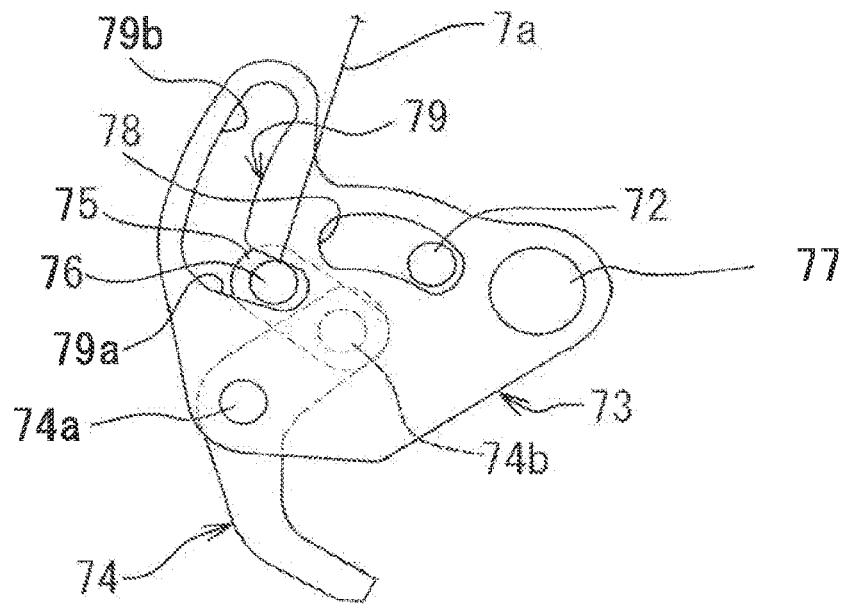
FIG. 28 is a schematic side view illustrating a first link plate, a second braking link, an elongated bar and a wire retaining pin which are provided at the vehicle seat of the second embodiment.

Referring to FIGS. 26 to 28, the first releasing means of the second embodiment is different from the first releasing means of the first embodiment in that, in addition to the collapsible link bar member 70, the first braking link 71 coupled to the collapsible link bar member 70 and having the induction pin 72, the first link plate 73, and the first operating lever 7, the first releasing means of the second embodiment includes a second braking link 74 provided at the first link plate 73 and an elongated bar 75 collapsibly supported to an upper end portion of the second braking link 74 and having a wire retaining pin 76 projecting laterally from the elongated bar 75 at a free end thereof.

Like the collapsible link bar member 70 of the first embodiment, the collapsible link bar member 70 of the second embodiment includes the lower bar portion 70a coupled at the first end thereof to the actuating shaft 4 of the first reclining lock mechanism 3 and the upper bar portion 70b connected at the first end thereof to the second end of the lower bar portion 70a by the support pin 70c and extending upward.

Like the braking link 71 of the first embodiment which is shown in FIG. 4, the first braking link 71 of the second embodiment is swingably connected at the substantially middle portion thereof to the second end of the upper bar portion 70b by the support pin 70d.

The first link plate 73 of the second embodiment is formed into a substantially triangular shape having three lobes as shown in FIG. 28, and swingably supported at a rearward lobe thereof to the side bracket 1' of the seat back 1 by the support pin 77 as shown in FIGS. 26 and 27. Like the first link plate 73 of the first embodiment, the first link plate 73 of the second embodiment has the circular arc-shaped guide hole 78 formed therein so as to extend about the support pin 70d of the first braking link 71. The induction pin 72 of the first braking link 71 is inserted through the guide hole 78 of the first link plate 73. The first link plate 73 of the second embodiment is different from the first link plate 73 of the first embodiment in that it has a substantially L-shaped control hole 79 formed therein. The control hole 79 includes a horizontal engaging hole portion 79a located at a position lower than the forward end of the guide hole 78, and a vertical hole portion 79b vertically extending so as to continue from the horizontal engaging hole portion 79a. The wire retaining pin 76 of the elongated bar 75 is inserted through the control hole 79 of the first link plate 73.

The second braking link 74 is mounted at a middle portion thereof to the first link plate 73 by a support pin 74a in such a manner that a lower portion of the second braking link 74 is adapted to be abutted against the stopper pin 51 from the direction opposite to the direction from which the lower portion of the first braking link 71 is abutted against the stopper pin 51. The elongated bar 75 is connected to the upper end portion of the second braking link 74 by a support pin 74b. The vehicle seat of the second embodiment is further different from the vehicle seat of the first embodiment in that the wire 7a of the first wire cable of the first operating lever 7 is connected to the wire retaining pin 76 projecting laterally from the upper end of the elongated bar 75.

In the vehicle seat of the second embodiment, when the first operating lever 7 is pull-operated, the wire retaining pin 76 of the elongated bar 75 which is engaged with the horizontal engaging hole portion 79a of the control hole 79 is drawn upward and the first link plate 73, the first braking link 71, and the link bar member 70 are drawn up, whereby the actuating shafts 4 of the first and second reclining mechanisms are synchronously rotated and the reclining lock means is brought to the unlocked state. Moreover, when the first operating lever 7 is released from the pulled-state, the components including the first link plate 73, the first braking link 71 and the link bar member 70 come down by gravity, whereby the actuating shafts 4 of the reclining mechanisms are rotated back and the reclining lock means is brought to the locked state.

As shown in FIGS. 26 and 27, the tipping-up lock means of the second embodiment includes the first, second and third cutout teeth 52a, 52b, 52c provided at the substantially semi-circular arc-shaped edge of the side bracket 5', the latch 80 swingably supported at the forward portion thereof to the side bracket 1' of the seat back by the support pin 80a, and the cam member 81 supported to the support pin 77 of the first link plate 73.

Figure 29:
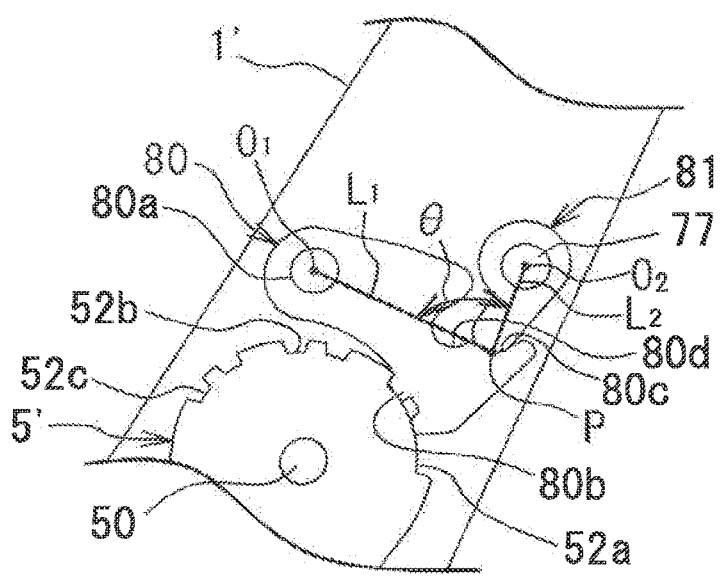
FIG. 29 is a schematic view which is of assistance in explaining a locked condition of the tipping-up lock means.

Like the latch 80 of the first embodiment which is shown in FIG. 5, the latch 80 of the second embodiment is provided at the lower edge region of the rearward portion thereof with the projecting tooth 80b as shown in FIG. 29. The projecting tooth 80b is adapted to be selectively and releasably engaged with the first, second and third cutout teeth 52a, 52b, 52c of the side bracket 5' of the seat cushion 5. In order that the projecting tooth 80b of the latch 80 can be securely engaged with the second and third teeth 52b, 52c, the projecting tooth 80b is configured to include the two spaced apart projecting tooth-portions.

As shown in FIGS. 26 and 27, the cam member 81 is swingably supported at the cam body thereof to the side bracket 1' of the seat back 1 by the support pin 77 of the first link plate 73 with the lower portion thereof being directed to the upper region of the rearward portion of the latch 80.

Like the latch 80 of the first embodiment, the latch 80 of the second embodiment has the engaging step portion 80c formed in the upper region of the rearward portion thereof. The lower portion of the cam member 81 is releasably abutted against the engaging step portion 80c of the latch 80, whereby the cam member 81 functions as the prop with respect to the latch 80, so that the engagement between the projecting tooth 80b of the latch 80 and each of the cutout teeth 52a, 52b, 52c of the side bracket 5' of the seat cushion 5 can be positively maintained.

Like the cam member 81 of the first embodiment, the angle of the cam member 81 relative to the latch 80 is set in such a manner that the angle θ between the reference line $L_1$ connecting the axial center $O_1$ of the support pin 80a of the latch 80 and the abutment point P of the cam member 81 against the engaging step portion 80c of the latch 80, and the line $L_2$ connecting the axial center $O_2$ of the support pin 77 of the cam member 81 and the abutment point P is kept to be an acute angle, as shown in FIG. 29.

Like the cam member 81 of the first embodiment, the lower portion of the cam member 81 of the second embodiment is formed into the substantially semielliptical shape. Correspondingly to such a shape of the lower portion of the cam member 81, the bottom surface of the engaging step portion 80c of the latch 80 is formed so as to have the substantially J-shape which allows the lower portion of the cam member 81 to be easily abutted against the engaging step portion 80c. Moreover, the substantially J-shaped bottom surface of the engaging step portion 80c is formed so as to have a curve which allows at least half or more region of the lower longitudinal portion of the cam member 81 to be received by the engaging step portion 80c, so that the lower longitudinal portion of the cam member 81 can be positively abutted against the engaging step portion 80c of the latch 80 and stably received by the engaging step portion 80c.

Like the second releasing means of the first embodiment, the second releasing means of the second embodiment includes the recess portion 80d formed in the upper region of the rearward portion of the latch 80 for allowing the swinging movement of the cam member 81, the second link plate 82 supported to the side bracket 1' of the seat back 1 by the support pin 77 of the first link plate 73, and the second operating lever 8. The second operating lever 8 is coupled to the second link plate 82 via the wire 8a of the second wire cable that is inserted through the tube 8b of the second wire cable.

The recess portion 80d of the latch 80 extends continuously from the edge of the engaging step portion 80c and is formed so as to have the depth which is not less than the height of the engaged region between the projecting tooth 80b of the latch 80 and each of the cutout teeth 52a, 52b, 52c and allows the projecting tooth 80b of the latch 80 to be escapingly disengaged from each of the cutout teeth 52a, 52b, 52c. In the illustrated example, the recess portion 80d of the latch 80 is formed so as to have the substantially U-shape which has the depth larger than the height of the engaged region between the projecting tooth 80d and each of the cutout teeth 52a, 52b, 52c and fits the lower portion of the cam member 81.

The recess portion 80d of the latch 80 serves to allow the cam member 81 to be swung up in such a manner that the lower portion of the cam member 81 is disengaged from the engaging step portion 80c of the latch 80 and slips into the recess portion 80d. As the cam member 81 is swung up, the latch 80 is swung up in such a manner the projecting tooth 80b is positively disengaged from any one of the cutout teeth 52a, 52b, 52c of the side bracket 5' of the seat cushion. Incidentally, like the latch of the first embodiment, the latch 80 of the second embodiment is held so as to be stably swingable with respect to the holding plate 90 (FIG. 27) which is supported by the support pin 50 of the side bracket 5' and the support pin 80a of the latch 80.

As discussed above, the first link plate 73, the second link plate 82 and the cam member 81 are supported to the support pin 77 which is rotatably supported to the side bracket 1' of the seat back 1. The cam member 81 and the second link plate 82 are fixed to the support pin 77, so that they are swingable together.

Like the second link plate 82 of the first embodiment which is shown in FIG. 7, the second link plate 82 of the second embodiment is formed with the opening hole 83 which receives the induction pin 72 of the first braking link 71 and has the middle hole edge region 83a against which the induction pin 72 of the first braking link 71 is adapted to be engagingly abutted when the entire vehicle seat is located at the used position of the entire vehicle seat, the lower hole edge region 83b toward which the induction pin 72 of the first braking link 71 is adapted to be escaping moved from the middle hole edge region 83a when the seat cushion is tipped up, and the upper hole edge region 83c toward which the induction pin 72 is adapted to be escapingly moved when the seat cushion is in the tipped-up condition and the reclining lock means is unlocked.

When the second operating lever 8 is pull-operated by the person, the second link plate 82 and the cam member 81 are swung upward together and the latch 80 is swung upward by the upward movement of the cam member 81, whereby the tipping-up means is unlocked. Moreover, when the second operating lever 8 is released from the pulled-state, the entire components which include the second link plate 82, the cam member 81 and the latch 80 come down by gravity, whereby the tipping-up lock means is brought to the locked state.

Like the stand leg portion 6 of the first embodiment which is shown in FIG. 8, the stand leg portion 6 of the second embodiment is typically urged toward the stored position under the seat cushion by the tension spring 10 which is retained at the one end thereof to the upper end region of the one of the spaced apart vertical portions of the U-shaped stand leg portion 6 and retained at the other end thereof to the one of the side brackets of the seat cushion. Moreover, the wire of the third wire cable 11 which is inserted through the tube 11c of the third wire cable 11 is coupled at the one end portion 11a thereof to the upper end region of the vertical portion of the stand leg portion 6 and coupled at the other end portion thereof to the seat back.

Like the third wire cable 11 of the first embodiment which is shown in FIGS. 9a to 9c, the other end portion 11b of the wire of the third wire cable 11 of the second embodiment is supported to the retaining piece 12 which is provided at the suitable portion of the seat back frame. The other end portion 11b of the wire of the third wire cable 11 is provided with the spherical end stop 11d and penetrated through the slit of the retaining piece 12 so as to be movable relative to the retaining piece 12. Like the first embodiment, any suitable compensator for compensating the pulling force exerted on the wire of the third wire cable 11 and adjusting the total length of the wire of the third wire cable 11 is provided at the suitable portion of the wire of the third wire cable 11.

When the seat cushion is located at the first used position, the wire of the third wire cable 11 is in the condition shown in FIG. 9a. In this condition, when the person causes the tipped-up lock means to be unlocked by pulling the second operating lever 8 and then causes the seat cushion to be tipped up while allowing the stand leg portion 6 to be disengaged from the receiving base 6b (FIG. 33), the wire of the third wire cable 11 is pushed so as to overcome the action of the tension spring 10 (as shown in FIG. 9b) and allow the stand leg portion 6 to be pivoted toward the developed position thereof until the seat cushion reaches a position just before the tipped-up position. On the other hand, as the seat cushion is pivoted toward the tipped-up position from the position just before the tipped-up position, the action of the tension spring (FIG. 8) is exerted on the wire of the third wire cable 11, whereby the wire of the third wire cable 11 is moved in such a manner that the wire end portion 11b is moved relative to the retaining piece 12 so as to project from the retaining piece as shown in FIG. 9c. Thus, the stand leg portion 6 is moved to the stored position by the action of the tension spring 10.

By the wire of the third wire cable 11, the stand leg portion 6 can be pivoted toward the stored position synchronously with the tipping-up movement of the seat cushion and the diving-down movement of the entire vehicle seat, and can be pivoted toward the developed position synchronously with returning of the entire seat toward the used position of the entire vehicle seat or returning of the seat cushion to the first used position.

In the tip-up/dive down type reclining vehicle-seat of the second embodiment which is constructed as discussed above, in a condition where the entire seat is located at the used position thereof (FIG. 1) and the reclining lock means and the tipping-up lock means are in the locked states (FIG. 26), the lower end portion of the first braking link 71 is stoppingly engaged with the stopper pin 51 provided on the side bracket 5' of the seat cushion 5, so that the induction pin 72 of the first braking link 71 is located at the rear end portion of the guide hole 78 of the first link plate 73, whereby the used position of the entire vehicle seat is determined.

In the condition where the entire seat is located at the used position thereof, the second braking link 74 is hanged down from the first link plate 73 by gravity and assumes a posture in which a lower portion of the second braking link 74 is located close to the stopper pin 51 but is not contacted with the stopper pin 51. Therefore, the elongated bar 75 is in a condition where it becomes collapsed relative to the second braking link 74, and the wire retaining pin 76 is located in the engaging hole portion 79a of the control hole 79 formed in the first link plate 73.

Figure 30:
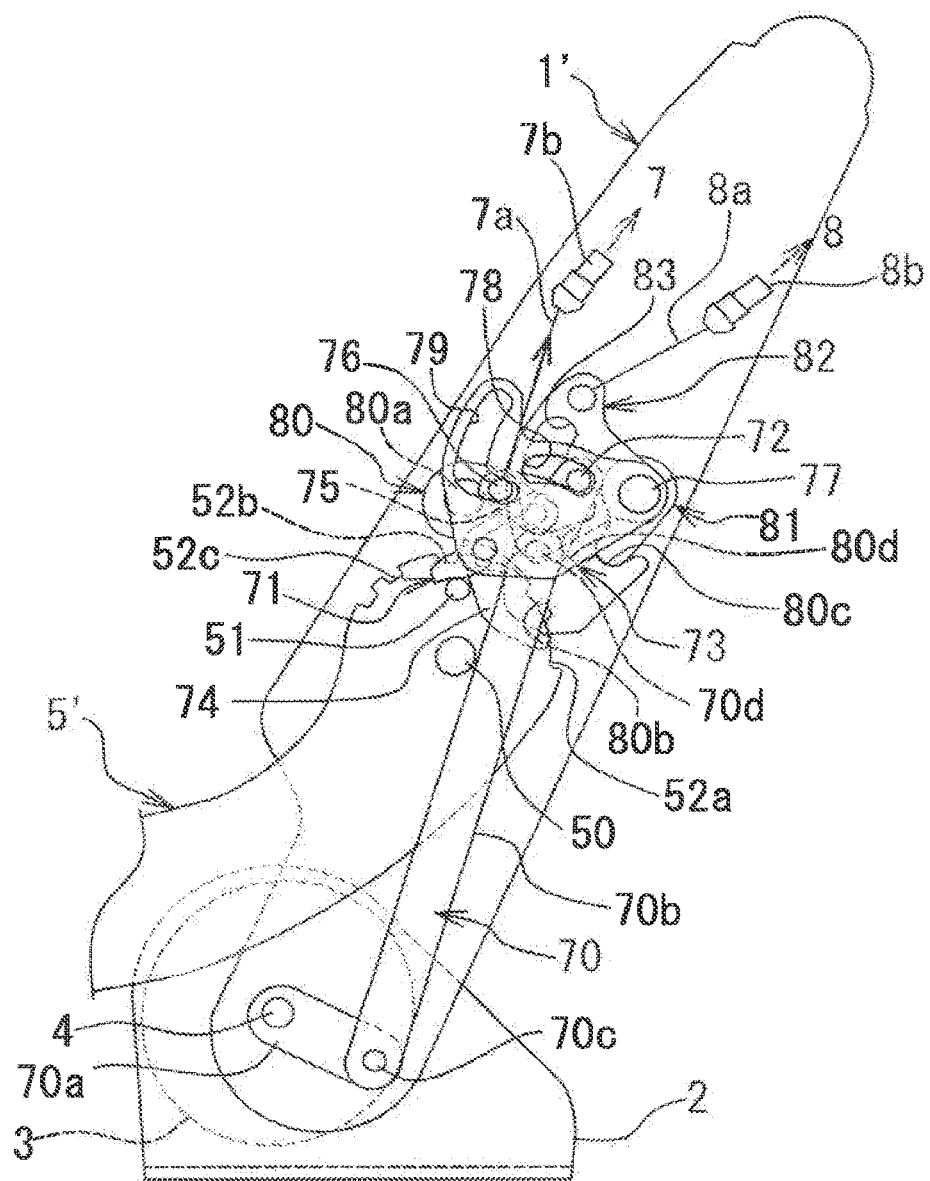
FIG. 30 is a schematic side view which is of assistance in explaining an unlocking operation of the reclining lock means.

In the condition where the entire seat is located at the used position thereof, when the person pulls the first operating lever 7 in order to cause the reclining lock means to be unlocked, the wire 7a of the first wire cable is pulled up so as to drawn up the wire retaining pin 76 located at the horizontal engaging hole portion 79a of the control hole 79 as shown in FIG. 30, whereby the first link plate 73 is swung up about the support pin 77. Moreover, the induction pin 72 of the first braking link 71 is located at the rearward end of the guide hole 78 of the first link plate 73 and engaged with the middle hole edge 83a of the opening hole 83 formed in the second link plate 82, so that the second link plate 82 is also pulled up by the drawing-up of the wire retaining pin 76.

Figure 31:
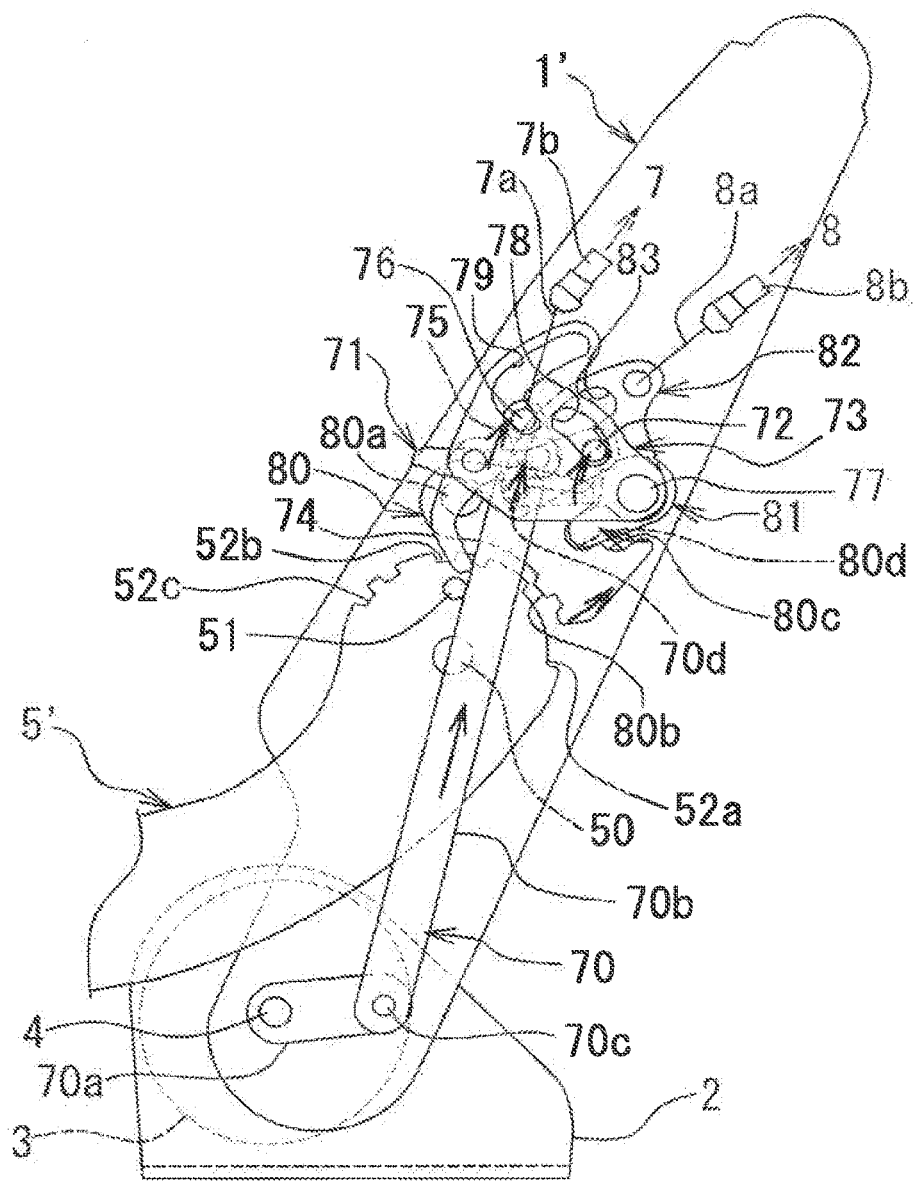
FIG. 31 is a schematic side view illustrating unlocked-conditions of the reclining lock means and the tipping-up lock means.

When the first link plate 73 is swung up about the support pin 77, the induction pin 72 is drawn up and the first braking link 71 coupled via the induction pin 72 to the first link plate 73 is pulled upwardly, to thereby cause the collapsible link bar member 70 to be pulled upwardly as shown in FIG. 31. Thus, the reclining lock means is brought to the unlocked state.

Moreover, when the first link plate 73 is swung upward, the second link plate 82 is also swung upward as discussed above, whereby the cam member 81 is swung upward in such a manner that the lower portion of the cam member 81 is disengaged from the engaging step portion 80c of the latch 80 and slips into the recess portion 80d of the latch 80. As the lower portion of the cam member 81 slips into the recess portion 80d of the latch 80, the latch 80 is swung up in such a manner that the projecting tooth 80b is disengaged from the first cutout tooth 52a of the side bracket 5', whereby the tipping-up lock means is also unlocked.

The recess portion 80d of the latch 80 is configured to have the depth larger than the height of the engaged region between the projecting tooth 80b of the latch 80 and the cutout tooth 52a of the side bracket 5' as discussed above, so that as the lower portion of the cam member 81 slips into the recess portion 80d, the latch is considerably swung up, whereby the projecting tooth 80b can be positively disengaged from the first cutout tooth 52a of the side bracket 5'.

In the condition where the reclining lock means and the tipping-up lock means are unlocked, the seat back can be angularly adjusted rearward by an extent corresponding to the length X of the recess portion of the first cutout tooth 52a (FIG. 25), as shown in FIG. 33. When the first operating lever 7 is released from the pulled-state after the seat back is angularly adjusted rearward, the components which include the first link plate 73, the first braking link 71, the link bar member 70, the second link plate 82, the cam member 81, and the latch 80 come down by gravity, whereby the reclining lock means and the tipping-up lock means are locked. Thus, the entire vehicle seat is maintained in the used position thereof.

Figure 34A:
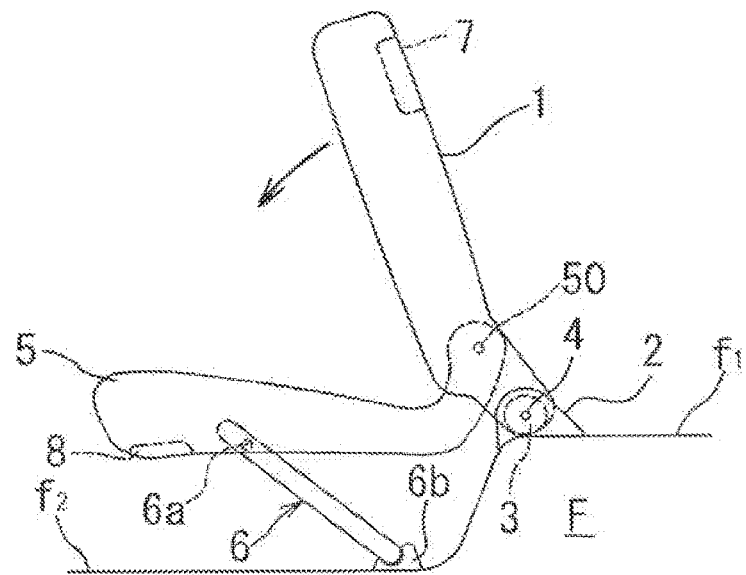
FIG. 34a is a schematic side view which is of assistance in explaining a diving-down movement of the vehicle seat according to the second embodiment.
Figure 34B:
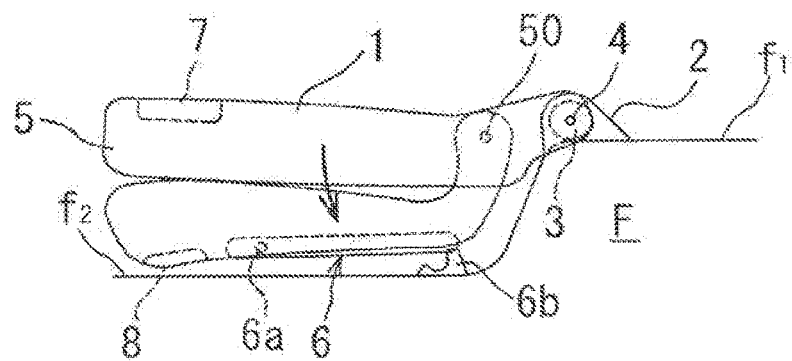
FIG. 34b is a schematic side view which is of assistance in explaining storing of the vehicle seat according to the second embodiment.
Figure 35A:
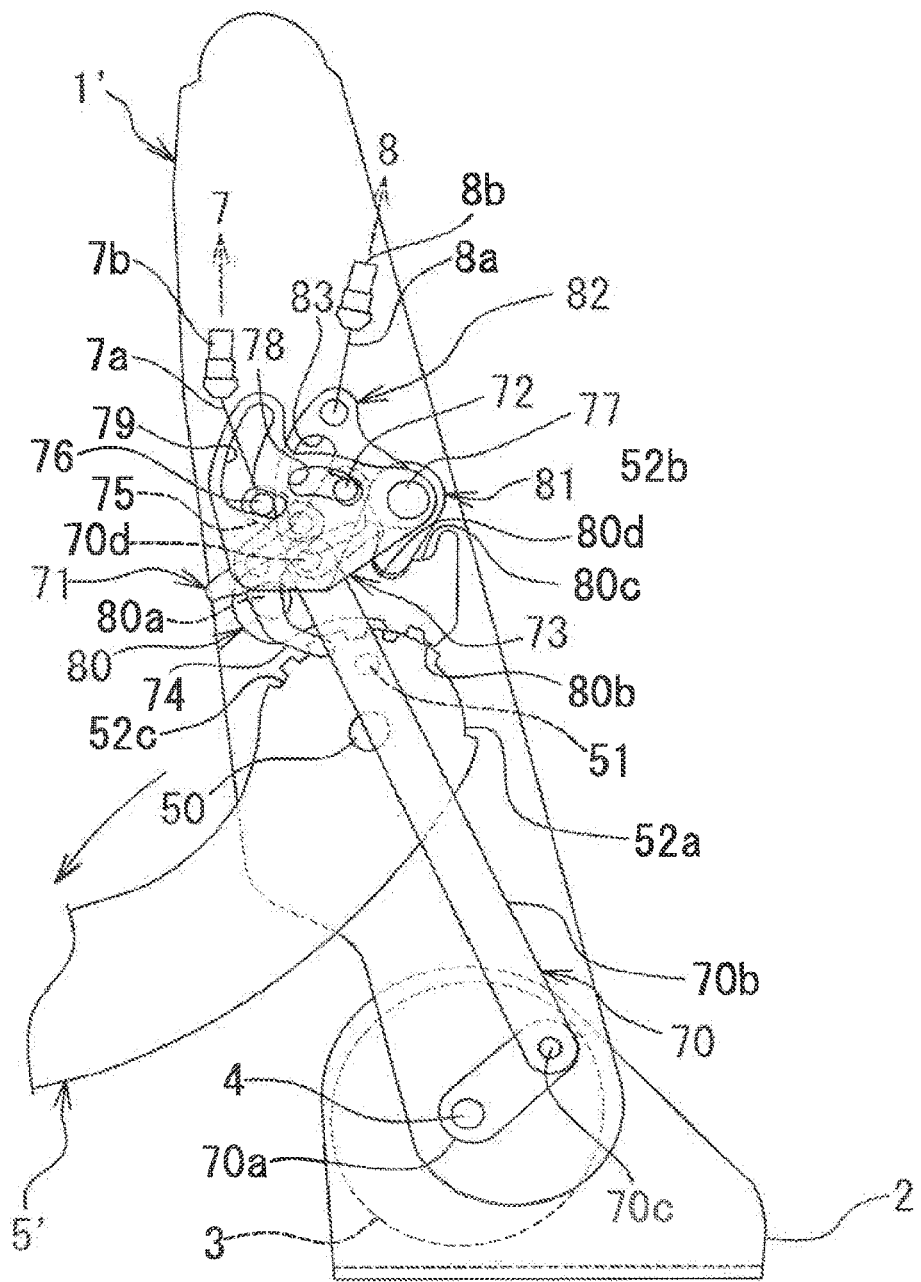
FIG. 35a is a schematic side view illustrating the first and second releasing means at the time of the diving-down movement of the vehicle seat.
Figure 35B:
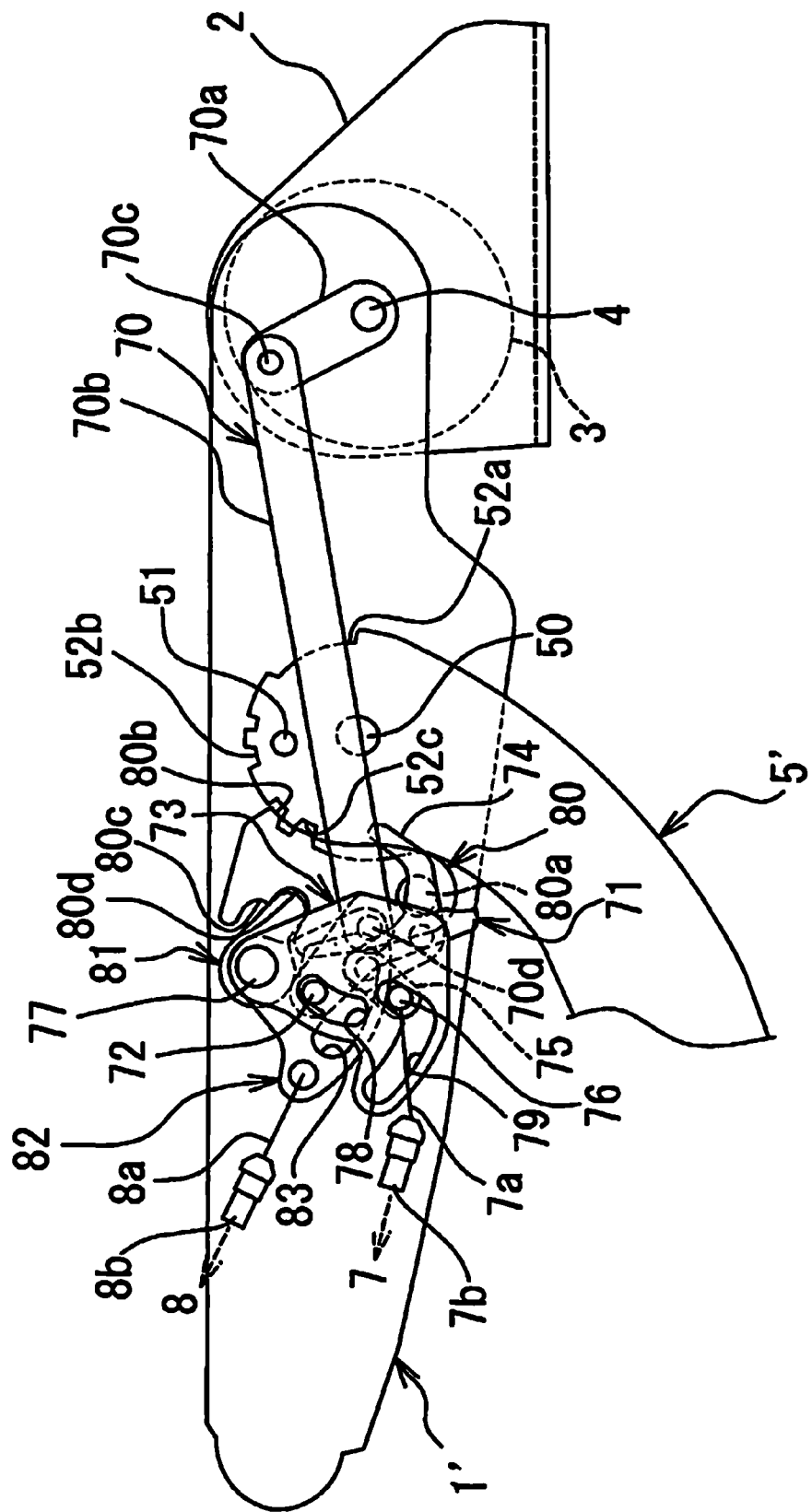
FIG. 35b is a schematic side view illustrating the first and second releasing means at the time of storing of the vehicle seat.
Figure 36:
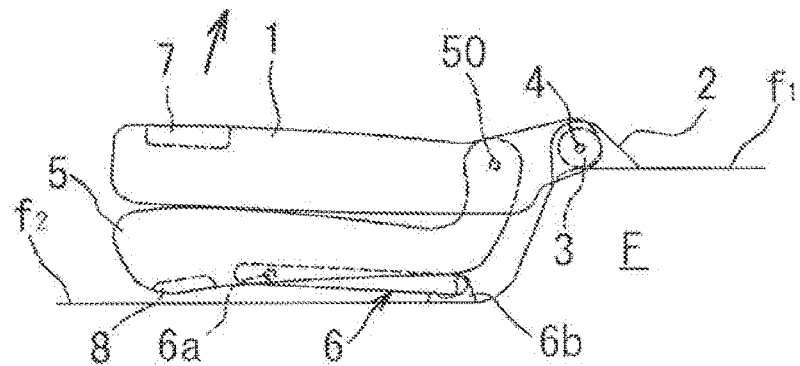
FIG. 36a is a schematic side view of the vehicle seat in the stored-condition.
FIG. 36b is a schematic side view which is of assistance in explaining returning of the vehicle seat in the stored-condition to a used position.
Figure 36:
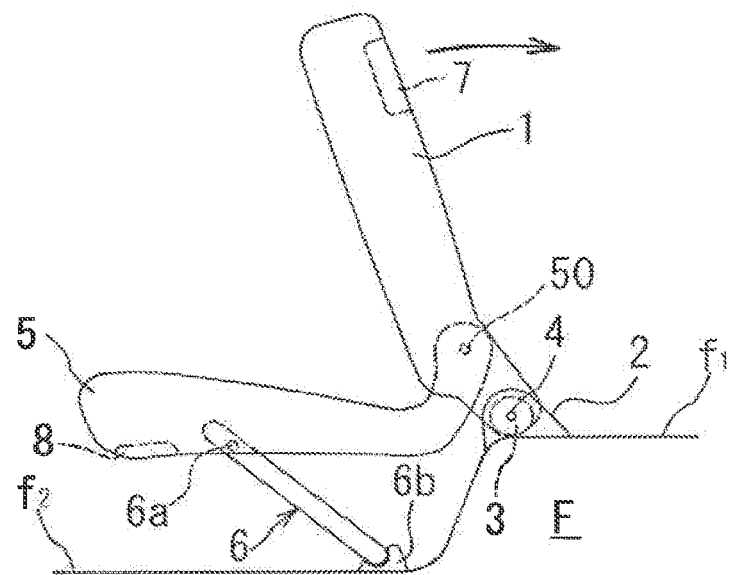

In the condition where the reclining lock means and the tipping-up lock means are unlocked, the seat back 1 is pivoted forward and the entire vehicle seat can be dived down and stored in the space on the lower step portion $f_2$ of the vehicle body floor F, as shown in FIGS. 34a and 34b. In this case, the components which include the first link plate 73, the first braking plate 71, the link bar member 70, the second link plate 82, the cam member 81 and the latch 80 cannot come down by gravity as shown in FIGS. 35a and 35b during the forward pivotal movement of the seat back from the substantially vertical position, so that the reclining lock means and the tipping-up lock means are maintained in the unlocked states.

In the condition which the reclining lock means and the tipping-up lock means are maintained in the unlocked states, the person causes the entire seat to be forward pivoted to a certain extent while holding the seat back with his/her hand. Then, the person causes his/her hand to be removed from the recess portion of the seat back to the recess portion of the seat cushion and causes the seat cushion to be lifted down while holding the seat cushion with his/her hand. Thus, the entire vehicle seat can be dived down and stored in the space on the lower step portion $f_2$ of the vehicle body floor F.

In the dived-down state of the entire vehicle seat, the reclining lock means and the tipping-up lock means are still maintained in the unlocked states, so that when the vehicle seat in the dived-down sate is to be returned to the used position of the entire vehicle seat, the person inserts his/her hand into the recess portion of the seat back, and can easily lift the entire vehicle seat up from the dived-down position shown in FIG. 36a to a position shown in FIG. 36b and then return the vehicle seat to the used position of the entire vehicle seat (FIG. 1), while holding the seat back with his/her hand.

Figure 37:
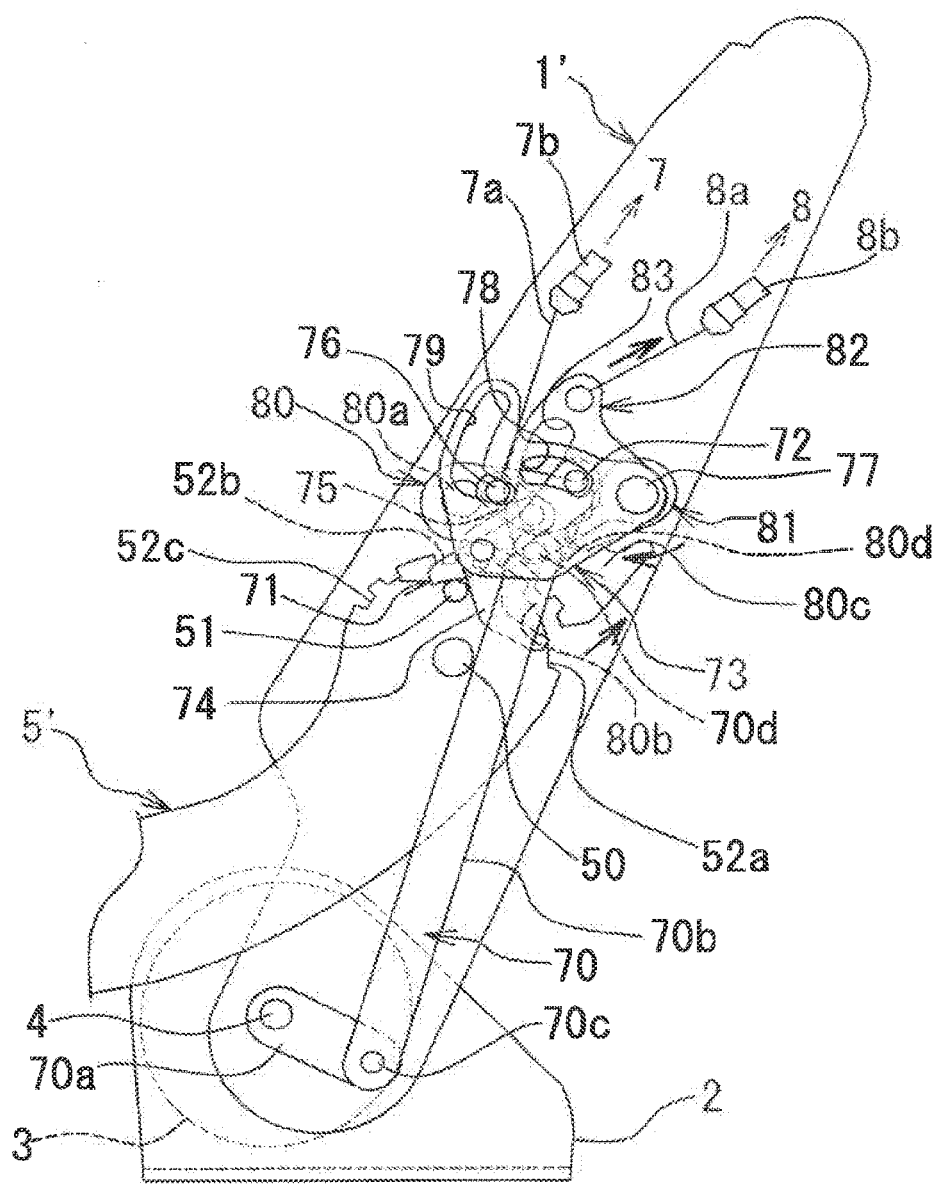
FIG. 37 is a schematic side view which is of assistance in explaining an unlocking operation of the tipping-up lock means.
Figure 38:
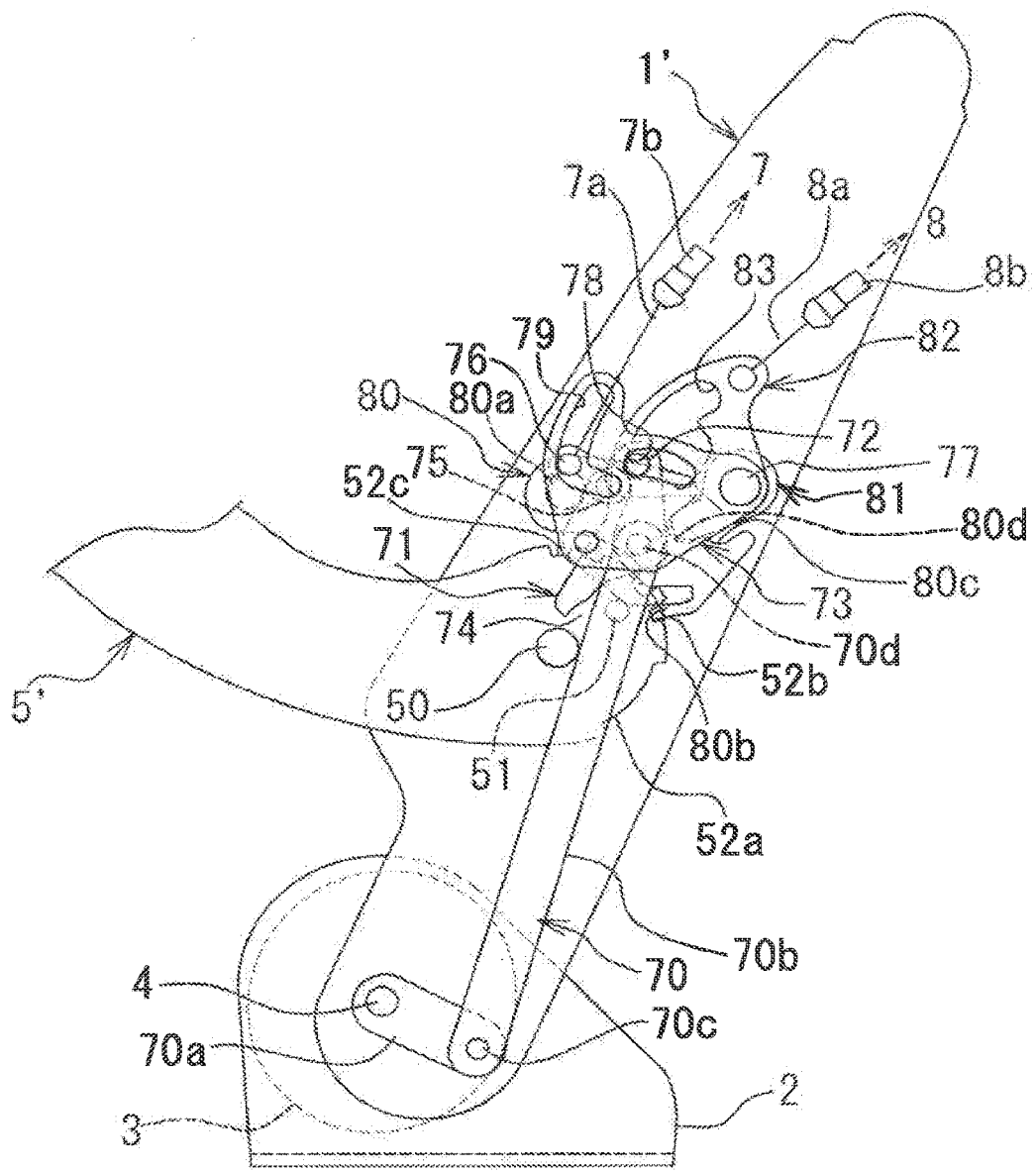
FIG. 38 is a schematic side view which is of assistance in explaining an tipping-up movement of a seat cushion of the vehicle seat.
Figure 39:
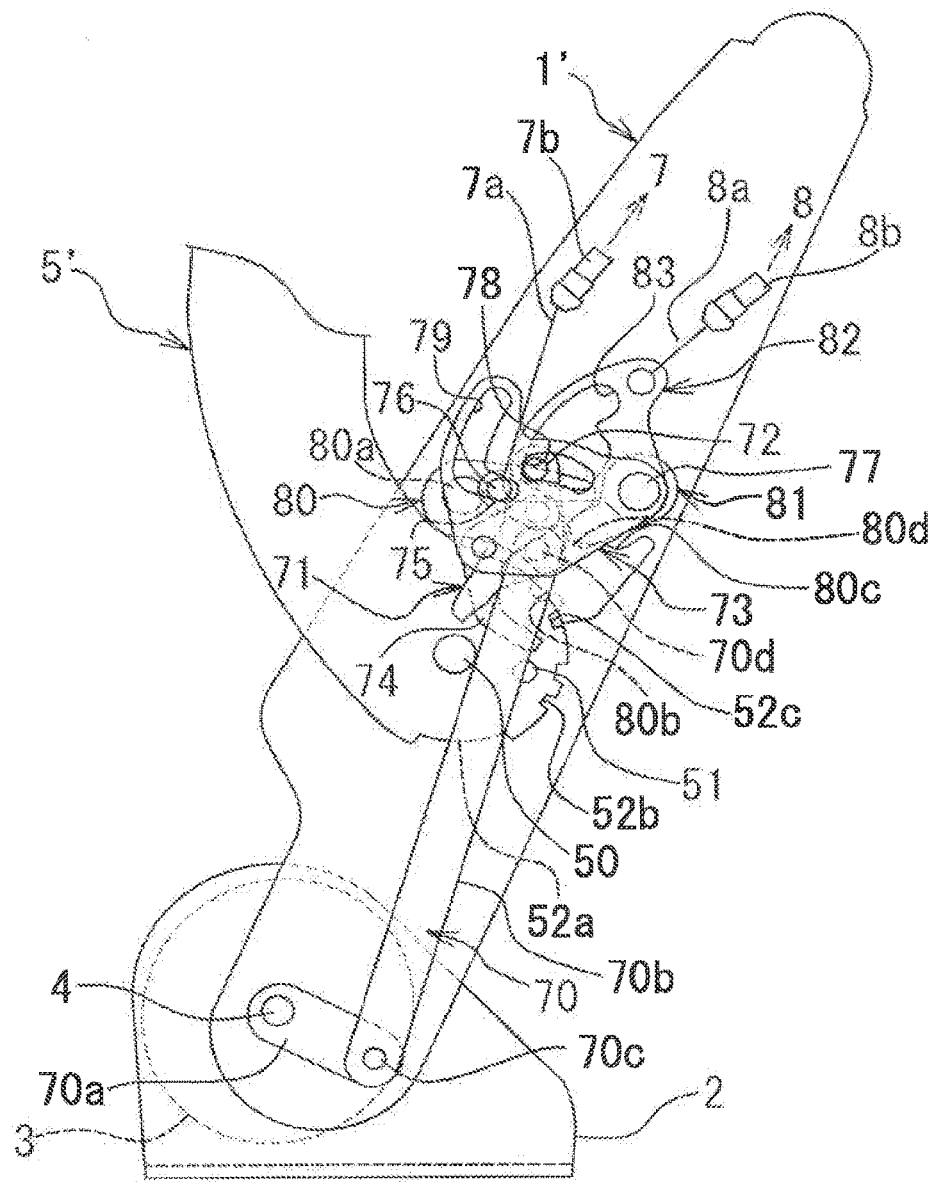
FIG. 39 is a schematic side view which is of assistance in explaining a tipped-up condition of the seat cushion.

In a case where the seat cushion is to be tipped up in the condition where the entire vehicle seat is located at the used position thereof, when the second operating lever is pull-operated as shown in FIG. 37, as discussed above, the second link plate 82 is swung up about the support pin 77 and the cam member 81 is also swung up together with the second link plate 81 in such a manner that the lower portion of the cam member 81 is disengaged from the engaging step portion of the latch 80 and slips into the recess portion 80d of the latch 80, whereby the latch 80 is swung up in such a manner that the projecting tooth 80b of the latch 80 is disengaged from the cutout tooth 52a of the side bracket 5'. Thus, the tipping-up lock means is brought to the unlocked-state (FIG. 32).

When the tipping-up lock means is unlocked, the induction pin 72 is escapingly moved toward the lower hole edge region 83b of the opening hole 83 relative to the second link plate 82. Therefore, the induction pin 72 is not drawn up by the second link plate 82, so that the reclining lock means is not unlocked.

In the condition where the tippling-up lock means is unlocked, namely, the projecting tooth 80b of the latch 80 is disengaged from the cutout tooth 52a of the side bracket 5', when the person lifts the seat cushion up from the forward direction while leaving the second operating lever pulled and holding the seat cushion with his/her hand, the cutout tooth 52a of the side bracket 5' of the seat cushion is moved away from the first cutout tooth 80b of the latch 80. Thus, the seat cushion 5 is tipped up from the first used position to a middle position between the first used position and the tipped-up position (see FIG. 38) or tipped up from the first used position to the tipped-up position (see FIG. 39).

Figure 40:
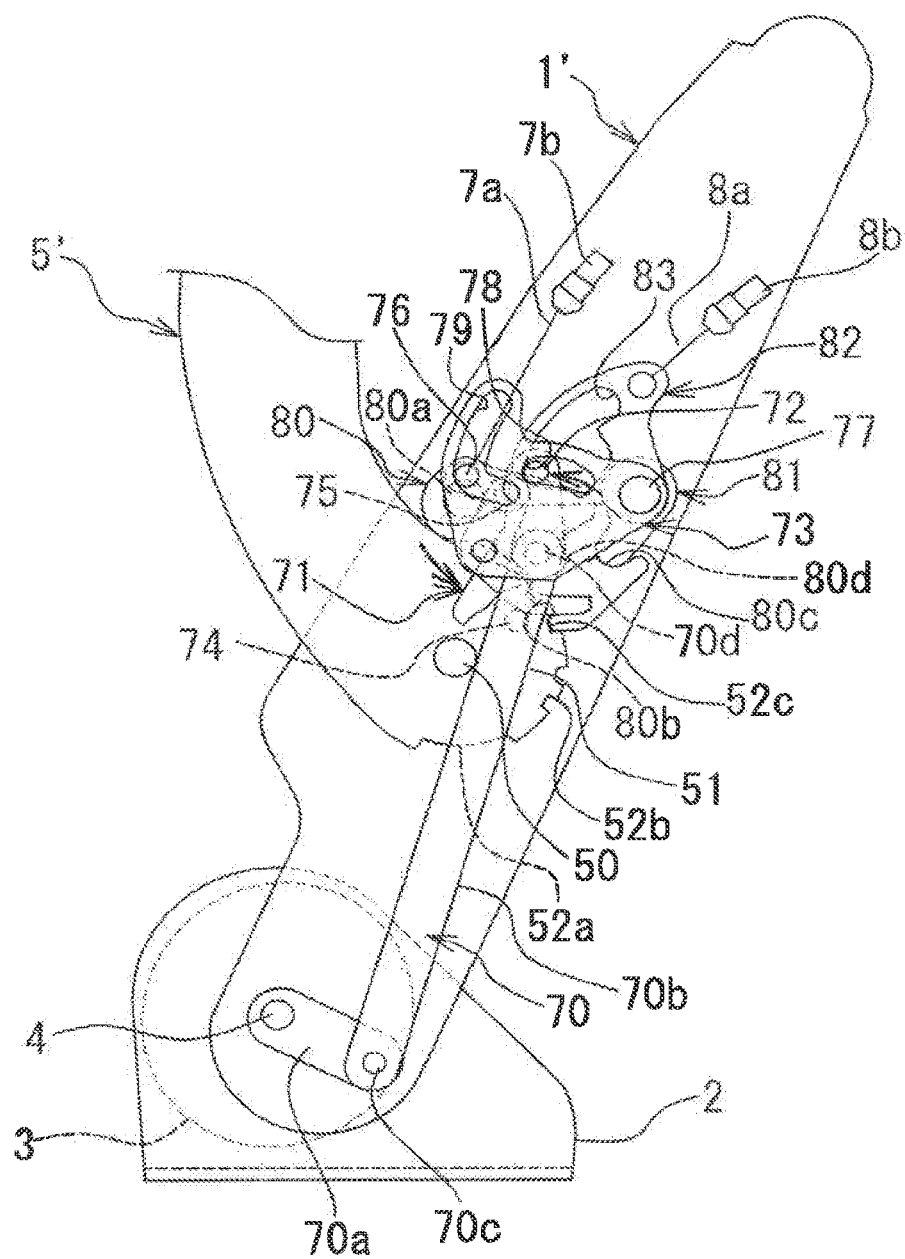
FIG. 40 is a schematic side view which is of assistance in explaining a locking operation of the tipping-up lock means in the condition shown in FIG. 39.

In the condition where the seat cushion is tipped up to the tipped-up position for example, when the second operating lever is released from the pulled-state, the components including the second link plate 82, the cam member 81, and the latch 80 come down by gravity as shown in FIG. 40. At this time, the lower portion of the cam member 81 is engagingly abutted against the engaging step portion 80c of the latch 80 and the projecting tooth 80b of the latch 80 is engaged with the second cutout tooth 52c, whereby the seat cushion is maintained in the tipped-up condition.

In a case where the seat cushion 5 is to be returned to the first used position from the tipped-up position or the middle position, when the second operating lever is pull-operated, the tipping-up lock means is unlocked. In this condition, the seat cushion can be returned to the first used position.

When the seat cushion is locked in the tipped-up position (FIG. 40), the stopper pin 51 of the side bracket 5' is separated from the lower portion of the first and second braking links 71, 74 and the first and second braking links 71, 74 come down by gravity. Thereby, the induction pin 72 of the first braking link 71 is moved to the forward end of the guide hole 78 formed in the first link plate 73. On the other hand, the wire retaining pin 76 provided at the elongated bar 75 which is connected to the second braking link 74 is moved toward the horizontal engaging hole portion 79a of the control hole 79 formed in the first link plate 73.

Figure 41:
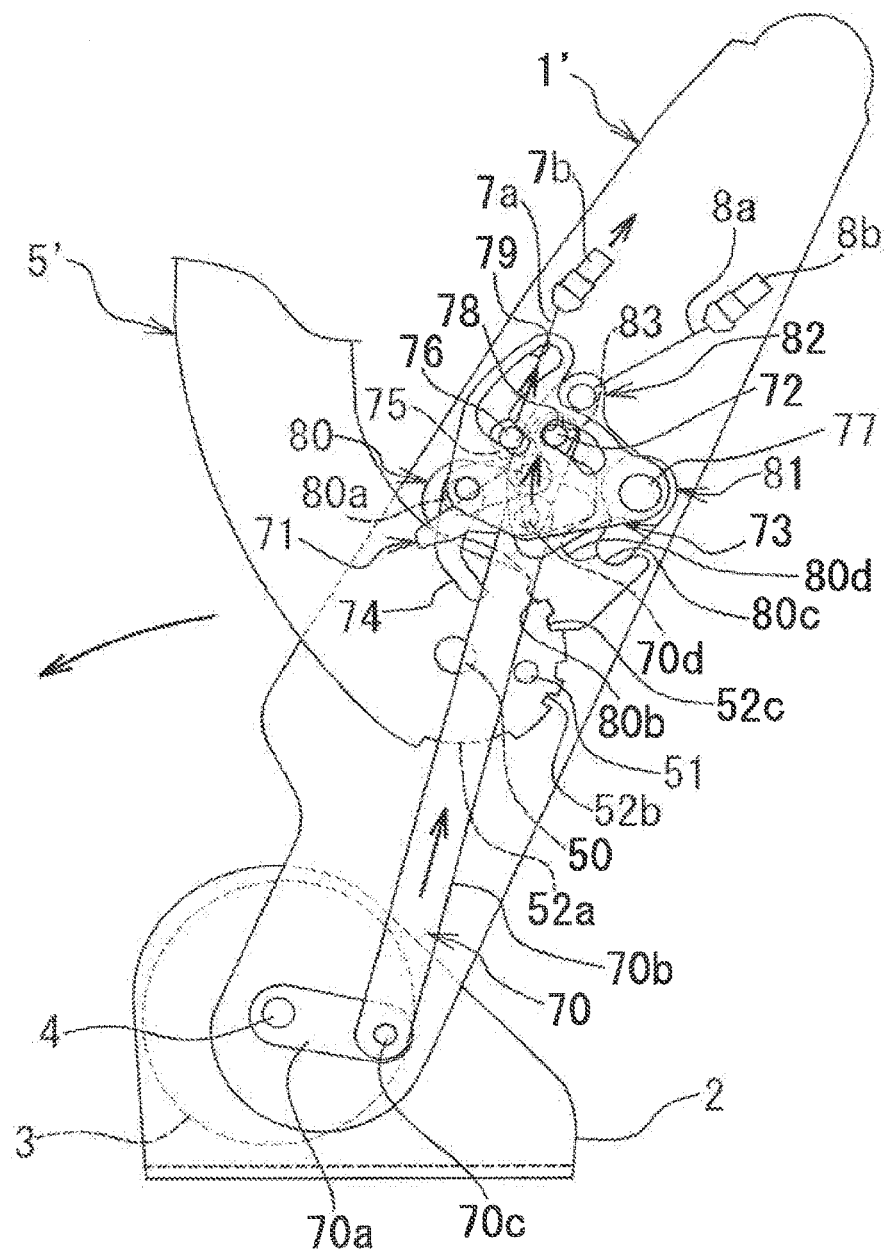
FIG. 41 is a schematic side view which is of assistance in explaining an unlocking operation of the reclining lock means at the time of diving-down of the vehicle seat in the tipped-up condition.

When the first operating lever 7 is pull-operated in order that the seat cushion is pivoted forward together with the seat back from the tipped-up position, dived down and stored in the space on the lower step portion of the vehicle body floor, the first link plate 73 is swung up as shown in FIG. 41 and the induction pin 72 of the first braking link 71 which is located at the forward end of the guide hole 78 of the first link plate 73 is drawn up, whereby the reclining lock means is unlocked as discussed above.

When the reclining lock means is unlocked, the induction pin 72 of the first braking link 71 is located at the forward end of the guide hole 78 of the first link plate 73 and escapingly moved toward the upper hole edge region 83c of the opening hole 83 formed in the second link plate 82, so that the second link plate 82 is not swung and the tipping-up lock means is maintained in the locked-state.

Figure 42A:
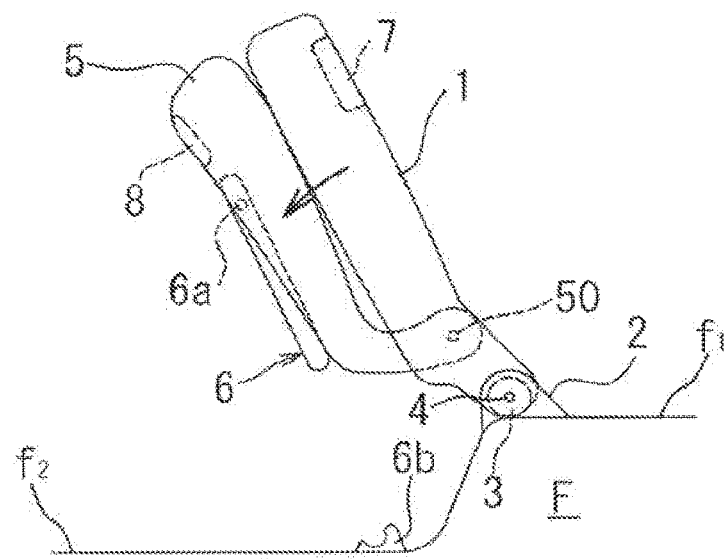
FIG. 42a is a schematic side view of the vehicle seat during the diving-down movement of the vehicle seat.
Figure 42B:
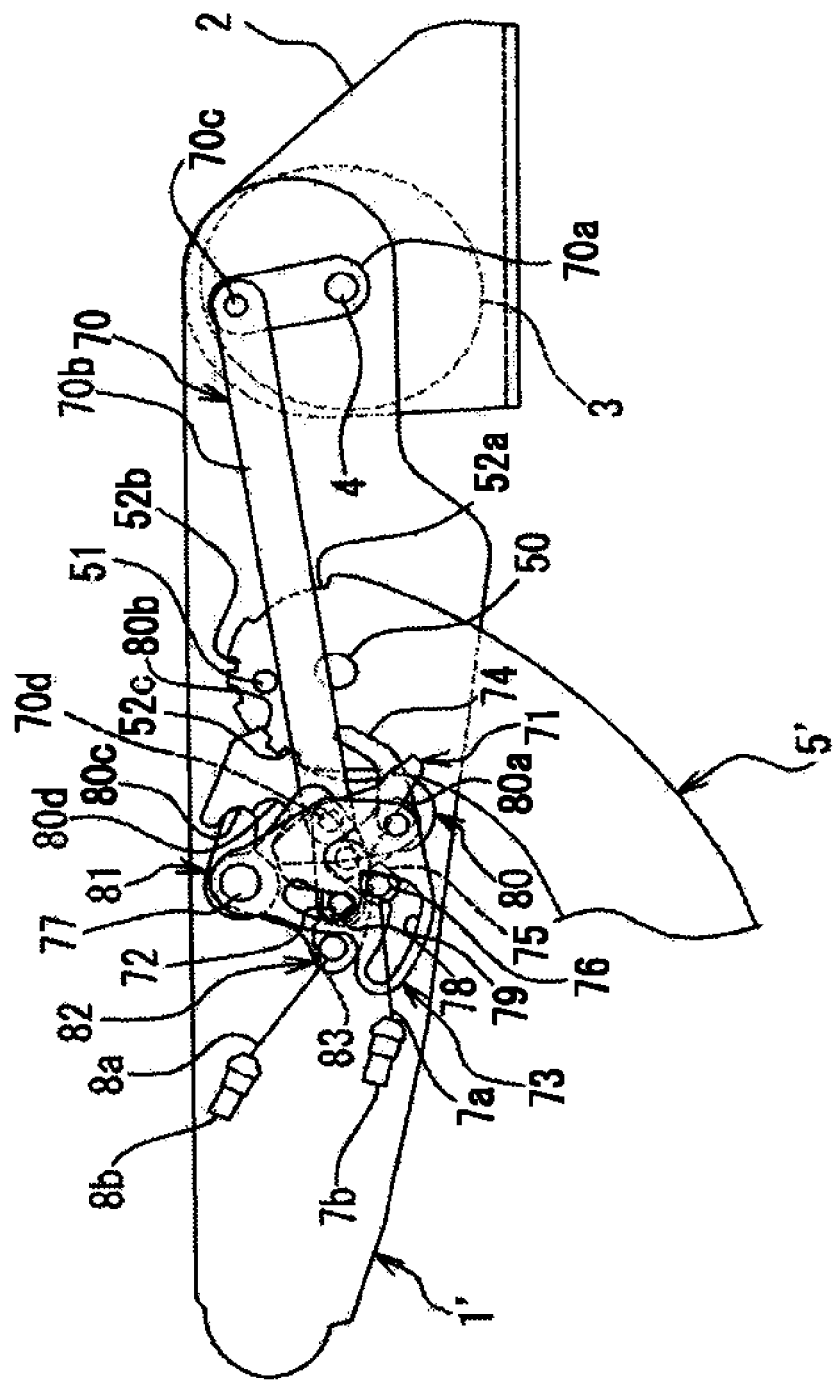
FIG. 42b is a schematic side view which is of assistance in explaining an unlocked-condition of the reclining lock means during the diving-down of the vehicle seat.

The tipping-up lock means is maintained in the locked-state, so that the seat cushion can be pivoted forward together with the seat back without pivoting with respect to the seat back as shown in FIG. 42a, and the entire vehicle seat can be dived down in the condition where the tipping-up lock means is maintained in the locked-state as shown in FIG. 42b.

When the entire seat is to be dived down and stored in the space on the lower step portion of the vehicle body floor, the person causes the vehicle seat to be pivoted forward by the certain extent, while holding the seat back with his/her hand, causes his/her hand to be removed from the seat back to the seat cushion and can cause the vehicle seat to be dived down while lifting the seat cushion down with his/her hand.

Figure 43:
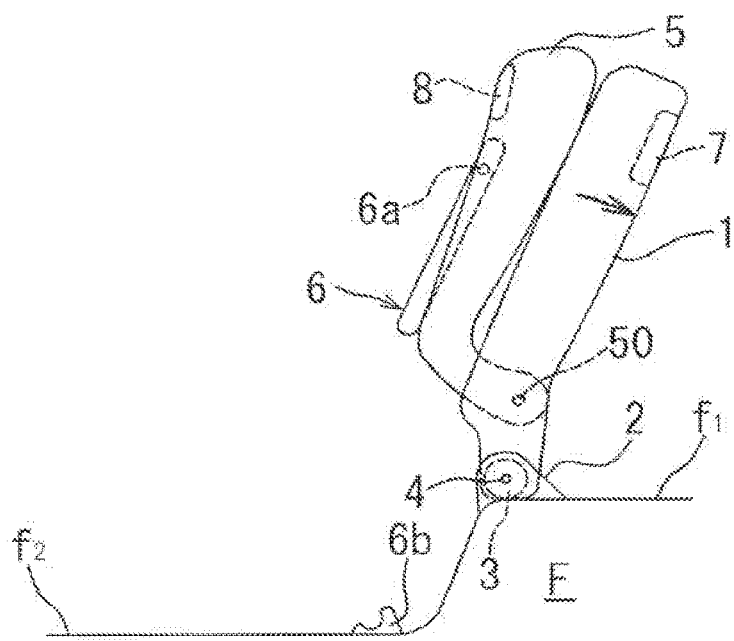
FIG. 43 is a schematic side view of the vehicle seat in an angularly rearward adjusted-condition.

Even if the reclining lock means is unlocked by pull-operating of the first operating lever 7, the tipping-up lock means is maintained in the locked-state, so that the entire vehicle seat in the condition where the seat cushion 5 is tipped up can be angularly adjusted rearward by the extent corresponding to the length X of the recess portion of the first cutout tooth 52a of the side bracket 5' (FIG. 25), as shown in FIG. 43.

Figure 44:
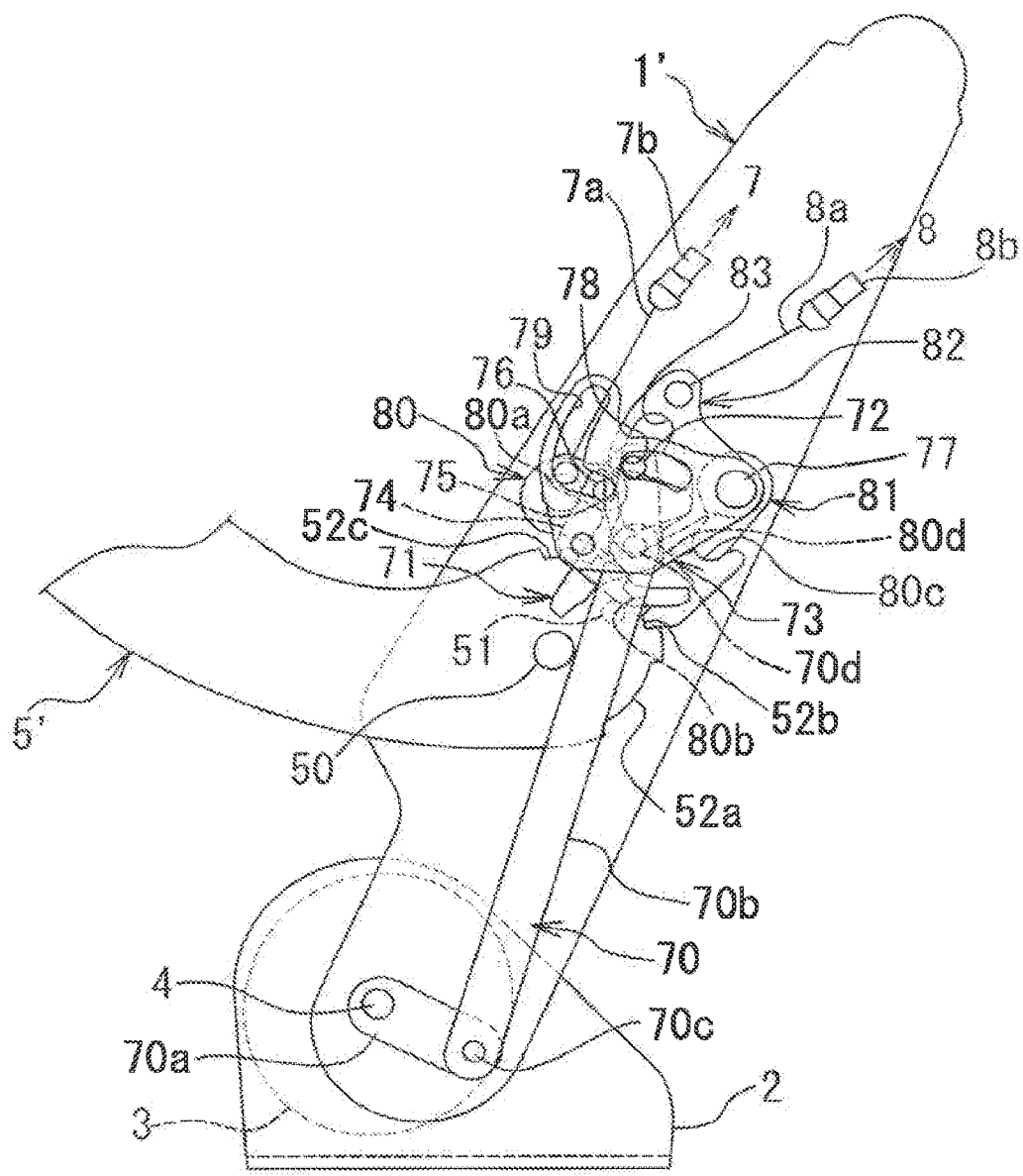
FIG. 44 is a schematic side view of the reclining lock means, the tipping-up lock means and the first and second releasing means at the time when the seat cushion is located at a tipped-up position.

When the seat cushion 5 is locked in the middle position, the second braking link 74 is kicked up by the stopper pin 51 as shown in FIG. 44. At this time, the elongated bar 75 is pushed by the second braking link 74, whereby the wire retaining pin 76 is moved to a connecting hole portion between the horizontal engaging hole portion 79a and the vertical hole portion 79b of the control hole 79.

Figure 45A:
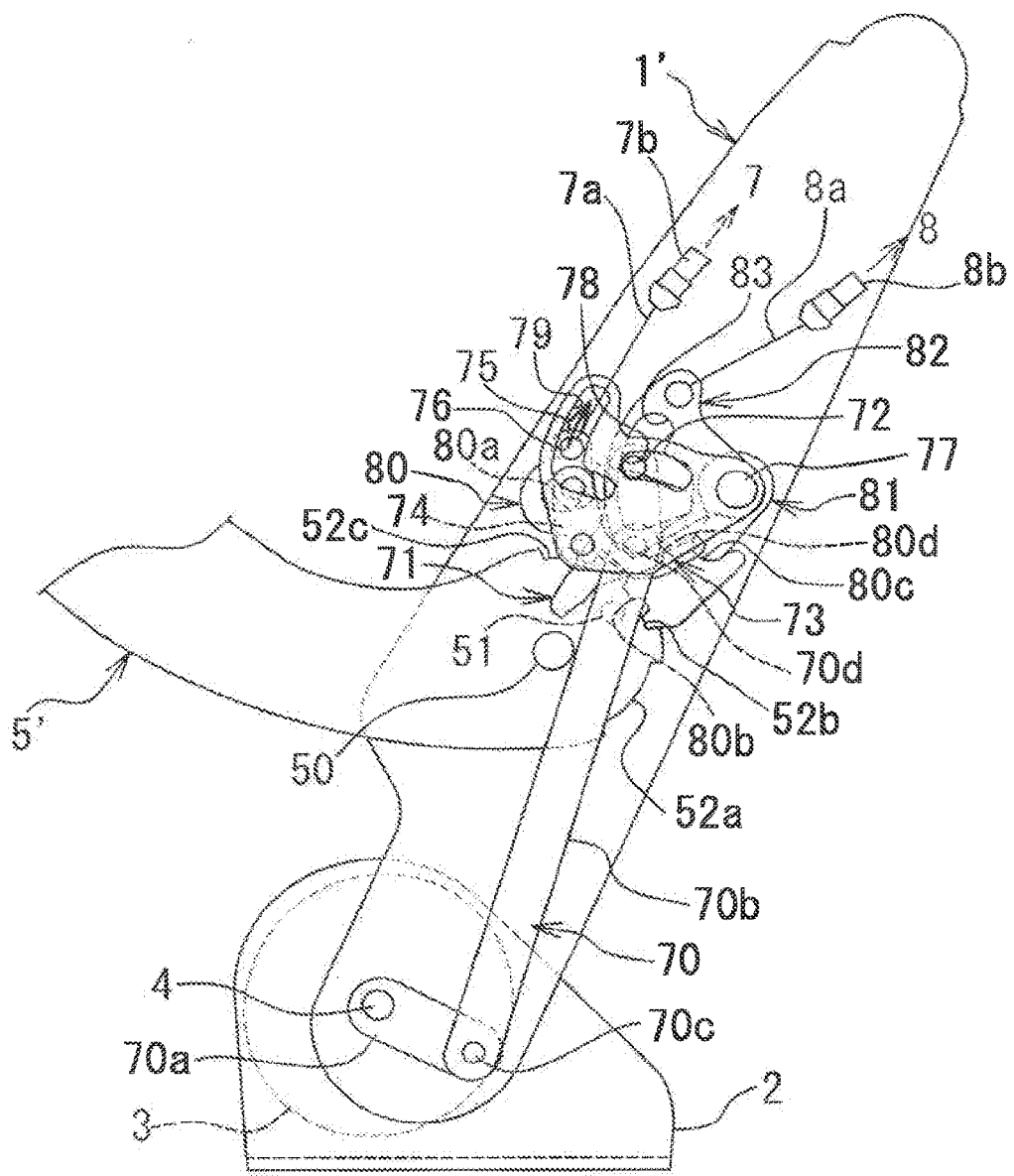
FIG. 45a is a schematic side view which is of assistance in explaining the reclining lock means when erroneously operated.
Figure 45B:
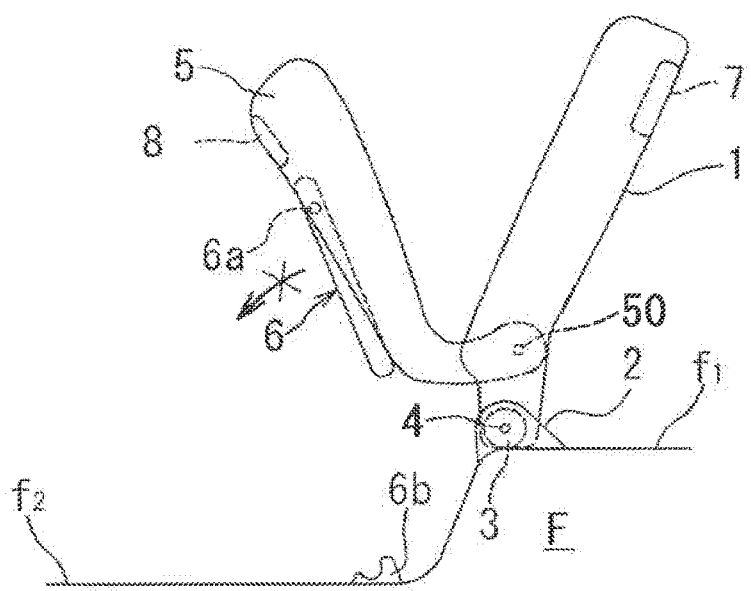
FIG. 45b is a schematic side view of the vehicle seat at the time when the reclining lock means is erroneously operated.

In the condition where the seat cushion 5 is located at the middle position, even if the first operating lever 7 is erroneously pull-operated, the wire retaining pin 76 is moved toward the vertical hole portion 79b from the connecting hole portion of the control hole 79 (FIG. 28) at this time as shown in FIG. 45a, so that the reclining lock means is idly operated so as not to be unlocked. Thus, the seat cushion is not allowed to be pivoted with respect to the seat back and maintained in the condition where it is locked with respect to the seat back as shown in FIG. 45b.

During changing of the posture of the entire vehicle seat which has been discussed above, namely, during the tipping-up movement of the seat cushion 5 or the diving-down movement of the entire vehicle seat, the stand leg portion 6 can be pivoted toward the stored position synchronously with such movement of the seat cushion or the entire vehicle seat. Moreover, during the returning movement of the entire vehicle seat to the used position thereof or the returning movement of the seat cushion in the tipped-up sate to the first used position, the stand leg portion 6 can be pivoted toward the developed position synchronously with such movement of the entire vehicle seat or the seat cushion.

Incidentally, while the case where the tipping-up lock means and the first and second releasing means are provided on the one side of the vehicle seat has been discussed with respect to the second embodiment of the present invention, second tipping-up lock means, third releasing means and fourth releasing means which are constructed in the same manner as the first tipping-up lock means, the first releasing means and the second releasing means are done, respectively, except that the third and fourth releasing means do not include any operating levers, may be provided on the other of the both sides of the vehicle seat. In this case, a fourth wire cable is connected between the first operating lever 7 and a link plate of the third releasing means and a fifth wire cable is connected between the second operating lever 8 and a link plate of the fourth releasing means, so that when the first operating lever is pull-operated, the first releasing means and the third releasing means can be synchronously actuated and, when the second operating lever is pull-operated, the second releasing means and the fourth releasing means can be synchronously actuated.

The terms and expressions which have been employed are used as terms of description and not of limitation, and there is no intention in the use of such terms and expressions of excluding any equivalents of the features shown and description, or portions thereof, but it is recognized that various modifications are possible with the scope of the invention claimed.

The invention claimed is:
1. A vehicle seat comprising:
a seat cushion; and
a seat back,
wherein:
  a state of the vehicle seat is switchable among:
    a seating state in which a seat occupant can be seated on the seat,
    a tipped-up state in which the seat cushion is tipped up, and
    a dived-down state in which the seat back and the seat cushion are stacked with each other and stored on a vehicle body floor,
  the vehicle seat further comprising:
    a pair of spaced apart base brackets;
    a reclining lock mechanism that comprises an actuating shaft and allows an angle of the seat back relative to the vehicle body floor to be adjusted; and
    a stand leg portion that supports the seat cushion,
  wherein:
    the seat back is rotatably attached to the pair of spaced apart base brackets by the actuating shaft of the reclining lock mechanism and connected to the vehicle body floor by the pair of spaced apart base brackets;
    the seat cushion is rotatably attached to the seat back at a support pin; and
    at least a portion of the reclining lock mechanism overlaps with the pair of spaced apart base brackets in a seat right-to-left direction.
2. The vehicle seat according to claim 1, wherein:
at least a portion of the reclining lock mechanism is disposed at a lower position than the support pin.

3. The vehicle seat according to claim 1, wherein:
the support pin and at least a portion of the reclining lock mechanism are located on a same level when the vehicle seat is in the dived-down state.

4. The vehicle seat according to claim 1, further comprising:
an operating lever provided in the seat back;
wherein:
the operating lever and at least a portion of the reclining lock mechanism are located on a same level when the vehicle seat is in the dived-down state.

5. The vehicle seat according to claim 1, wherein the support pin is located in a rear side of a front end of the reclining lock mechanism when the vehicle seat is in the tipped-up state.

6. The vehicle seat according to claim 1, wherein a lower end of the reclining lock mechanism is located at a lower position than an upper end of the stand leg portion when the vehicle seat is in the seating state.

7. The vehicle seat according to claim 1, wherein the reclining lock mechanism is disposed such that a first imaginary line connecting a lower end of the stand leg portion and the actuating shaft of the reclining lock mechanism is shorter than a second imaginary line connecting an upper end of the stand leg portion and the actuating shaft of the reclining lock mechanism.

8. The vehicle seat according to claim 1, wherein:
the each of the pair of spaced apart base brackets has an L-shape in cross section and is directly connected to the vehicle body floor; and
a width of each of the spaced apart base brackets in a side view narrows towards its top end.

* * * * *